(12) United States Patent
Langen

(10) Patent No.: US 11,136,153 B2
(45) Date of Patent: Oct. 5, 2021

(54) METHOD AND SYSTEM FOR ORDER FULFILMENT

(71) Applicant: H. J. Paul Langen, Brampton (CA)

(72) Inventor: H. J. Paul Langen, Brampton (CA)

(*) Notice: Subject to any disclaimer, the term of this patent is extended or adjusted under 35 U.S.C. 154(b) by 178 days.

(21) Appl. No.: 16/444,673

(22) Filed: Jun. 18, 2019

(65) Prior Publication Data

US 2019/0337656 A1 Nov. 7, 2019

Related U.S. Application Data

(63) Continuation of application No. 16/230,979, filed on Dec. 21, 2018, now Pat. No. 10,556,713, which is a
(Continued)

(51) Int. Cl.
*B65B 43/14* (2006.01)
*B65B 43/26* (2006.01)
(Continued)

(52) U.S. Cl.
CPC .......... *B65B 43/145* (2013.01); *B65B 43/265* (2013.01); *B65B 61/26* (2013.01); *B65G 57/22* (2013.01); *G05B 15/02* (2013.01); *G05B 19/418* (2013.01); *G05B 19/41865* (2013.01); *G06Q 10/08* (2013.01); *G06Q 10/087* (2013.01); *G06Q 30/0635* (2013.01); *G06Q 50/28* (2013.01)

(58) Field of Classification Search
CPC .................................................. B65B 43/145
See application file for complete search history.

(56) References Cited

U.S. PATENT DOCUMENTS 3,461,642 A 8/1969 Langen et al.
4,061,081 A 12/1977 Pinto et al.
(Continued)

FOREIGN PATENT DOCUMENTS

CA 2712878 C 2/2011
CA 3023959 A1 11/2017
(Continued)

OTHER PUBLICATIONS

Robotics Case Erector and Installation Archive—obtained online from https://swspackaging.com/installations/robotic-case-erector-tote-tender-32217/.
(Continued)

*Primary Examiner* — Thomas Randazzo

(57) ABSTRACT

A method of fulfilling an order comprising at least one product is provided. The method includes receiving an order comprising at least one product, determining a suitable case from a plurality of available cases for holding the at least one product, said determining being a function of one or more characteristics of each product of the at least one product and one or more characteristics of the plurality of available cases; forwarding information identifying the suitable case to a case former; providing a case blank corresponding to said suitable case to said case former; erecting a suitable case from said case blank corresponding to said suitable case with said case former; and prior to the loading said suitable case with said at least one product, labelling said suitable case with at least one label.

20 Claims, 70 Drawing Sheets

Related U.S. Application Data continuation of application No. 14/644,842, filed on Mar. 11, 2015, now abandoned.

(60) Provisional application No. 61/951,263, filed on Mar. 11, 2014.

(51) Int. Cl.
*B65G 57/22* (2006.01)
*G05B 15/02* (2006.01)
*G05B 19/418* (2006.01)
*G06Q 30/06* (2012.01)
*B65B 61/26* (2006.01)
*G06Q 10/08* (2012.01)
*G06Q 50/28* (2012.01)

(56) References Cited

U.S. PATENT DOCUMENTS

| | | | |
|---|---|---|---|
| 4,414,789 A | | 11/1983 | Pattarozzi |
| 4,553,954 A | | 11/1985 | Sewell et al. |
| 4,569,182 A | | 2/1986 | Leuvering |
| 4,823,539 A | * | 4/1989 | Kuckhermann ...... B65B 59/003 |
| | | | 53/579 |
| 4,915,678 A | | 4/1990 | Morita |
| 5,061,231 A | | 10/1991 | Dietrich et al. |
| 5,106,359 A | | 4/1992 | Lott |
| 5,145,070 A | | 9/1992 | Pallett et al. |
| 5,207,630 A | | 5/1993 | Decker et al. |
| 5,341,626 A | * | 8/1994 | Beckmann ............. B65B 5/024 |
| | | | 53/566 |
| 5,352,178 A | | 10/1994 | Pazdernik |
| 5,393,291 A | | 2/1995 | Wingerter |
| 5,411,464 A | | 5/1995 | Calvert et al. |
| 5,456,570 A | | 10/1995 | Davis et al. |
| 5,624,368 A | | 4/1997 | Cromwell |
| 5,997,458 A | | 12/1999 | Guttinger et al. |
| 6,032,853 A | | 3/2000 | Chevalier |
| 6,226,965 B1 | | 5/2001 | Lam |
| 6,378,275 B1 | | 4/2002 | Andersson |
| 6,688,075 B2 | | 2/2004 | Cristina |
| 6,721,762 B1 | | 4/2004 | Levine et al. |
| 6,764,436 B1 | | 7/2004 | Mazurek |
| 6,876,958 B1 | | 4/2005 | Chowdhury et al. |
| 6,913,568 B2 | | 7/2005 | Frank et al. |
| 7,131,941 B2 | | 11/2006 | Makar et al. |
| 7,243,481 B2 | | 7/2007 | Draghetti |
| 7,326,165 B2 | | 2/2008 | Baclija et al. |
| 7,404,788 B2 | | 7/2008 | Monti |
| 7,510,517 B2 | | 3/2009 | Goodman |
| 7,682,122 B2 | | 3/2010 | Maynard et al. |
| 7,788,881 B2 | | 9/2010 | Johnson et al. |
| 7,828,708 B2 | | 11/2010 | Huang et al. |
| 7,988,406 B2 | | 8/2011 | Schafer |
| 7,991,505 B2 | | 8/2011 | Lert, Jr. et al. |
| 8,156,013 B2 | | 4/2012 | Dearlove et al. |
| 8,340,812 B1 | | 12/2012 | Tian et al. |
| 8,622,883 B2 | | 1/2014 | Flynn |
| 8,671,654 B2 | | 3/2014 | Langen |
| 8,961,380 B2 | | 2/2015 | Langen |
| 9,061,477 B2 | | 6/2015 | Chandaria |
| 9,090,400 B2 | | 7/2015 | Wurman et al. |
| 9,114,897 B2 | | 8/2015 | Kim et al. |
| 9,126,380 B2 | | 9/2015 | Dittmer et al. |
| 9,315,344 B1 | | 4/2016 | Lehmann |
| 9,336,509 B1 | | 5/2016 | Arun Singhal et al. |
| 9,714,145 B1 | | 7/2017 | Lehmann |
| 9,796,080 B2 | | 10/2017 | Lindbo et al. |
| 9,927,815 B2 | | 3/2018 | Nusser et al. |
| 9,975,699 B2 | | 5/2018 | Yamashita |
| 10,074,073 B2 | | 5/2018 | Stevens et al. |
| 10,233,019 B2 | | 3/2019 | Lert |
| 10,248,112 B2 | | 4/2019 | Zhu et al. |
| 10,489,870 B2 | | 11/2019 | Asaria et al. |
| 10,618,736 B2 | | 4/2020 | Khodl et al. |

| | | | |
|---|---|---|---|
| 2003/0200111 A1 | | 10/2003 | Damji |
| 2004/0112520 A1 | | 6/2004 | Hanschen et al. |
| 2004/0168408 A1 | | 9/2004 | Spatafora |
| 2005/0079966 A1 | * | 4/2005 | Moshier ................. B31B 50/00 |
| | | | 493/123 |
| 2006/0096712 A1 | | 5/2006 | Makar et al. |
| 2006/0277269 A1 | | 12/2006 | Dent et al. |
| 2007/0038673 A1 | | 2/2007 | Broussard et al. |
| 2007/0072755 A1 | | 3/2007 | Monti |
| 2007/0197364 A1 | | 8/2007 | Monti |
| 2008/0067225 A1 | | 3/2008 | Moore |
| 2008/0141632 A1 | * | 6/2008 | Monti .................... B65B 5/024 |
| | | | 53/566 |
| 2009/0239726 A1 | | 9/2009 | Huang |
| 2009/0319395 A1 | | 12/2009 | Chandaria |
| 2011/0111939 A1 | * | 5/2011 | Bassi ..................... B31B 50/00 |
| | | | 493/297 |
| 2011/0297559 A1 | | 12/2011 | Davis |
| 2013/0218799 A1 | * | 8/2013 | Lehmann ............. G06Q 10/083 |
| | | | 705/337 |
| 2013/0247519 A1 | * | 9/2013 | Clark ........................ B65B 5/00 |
| | | | 53/452 |
| 2015/0072847 A1 | * | 3/2015 | Graham ................. B31B 50/30 |
| | | | 493/130 |
| 2015/0072848 A1 | * | 3/2015 | Graham ................. B31B 50/00 |
| | | | 493/147 |
| 2015/0073587 A1 | | 3/2015 | Vliet et al. |
| 2015/0225104 A1 | | 8/2015 | Reed |
| 2015/0324893 A1 | | 11/2015 | Langen |
| 2016/0304281 A1 | | 10/2016 | Elazary et al. |
| 2018/0065807 A1 | | 3/2018 | Lert, Jr. |
| 2018/0150793 A1 | | 5/2018 | Lert, Jr. et al. |
| 2019/0152703 A1 | | 5/2019 | Sellner et al. |
| 2020/0039744 A1 | | 2/2020 | Len et al. |
| 2020/0087010 A1 | | 3/2020 | Almogy et al. |

FOREIGN PATENT DOCUMENTS

| | | |
|---|---|---|
| CA | 3044850 A1 | 6/2018 |
| CN | 108891698 A | 11/2018 |
| DE | 2250667 C3 | 9/1980 |
| EP | 1177980 A2 | 2/2002 |
| EP | 3337739 B1 | 2/2020 |
| WO | 2013/142106 A1 | 9/2013 |
| WO | 201897400 A1 | 11/2018 |
| WO | 2019/021281 A2 | 1/2019 |

OTHER PUBLICATIONS

"I went undercover as an Amazon delivery driver. Here's what I learned about the hidden costs of free shipping", Title retrieved at: https://www.thestar.com/news/investigations/2019/12/19/i-went-undercover-as-an-amazon-delivery-driver-heres-what-i-learned-about-the-hidden-costs-of-free-shipping.html, Dec. 19, 2019.

International Search Report issued by the Canadian Intellectual Property Office dated Jun. 27, 2013 in connection with International PCT Patent Application No. PCT/CA2013/000245 filed on Mar. 15, 2013, 5 pages.

Written Opinion of the International Searching Authority issued by the Canadian Intellectual Property Office dated Jun. 27, 2013 in connection with International PCT Patent Application No. PCT/CA2013/000245 filed on Mar. 15, 2013, 6 pages.

International Preliminary Report on Patentability issued by the International Bureau of WIPO dated Oct. 28, 2014 in connection with International PCT Patent Application No. PCT/CA2013/000245 filed on Mar. 15, 2013, 7 pages.

Xpak USA, LLC, Xpak Robox™—Robotic Random-Size Box Erector Brochure, http://www.xpakusa.com/pdf/XPAX%20-%20ROBOX%20Robotic%20Case%20Erector%20Model%20XP-E3000R.pdf (last printed Mar. 22, 2016).

International Search Report issued by the Canadian Intellectual Property Office dated Feb. 12, 2021 in connection with International Patent Application No. PCT/CA2020/051502, 6 pages.

(56) References Cited

OTHER PUBLICATIONS

Written Opinion of the International Searching Authority issued by the Canadian Intellectual Property Office dated Feb. 12, 2021 in connection with International Patent Application No. PCT/CA2020/051502, 9 pages.

* cited by examiner

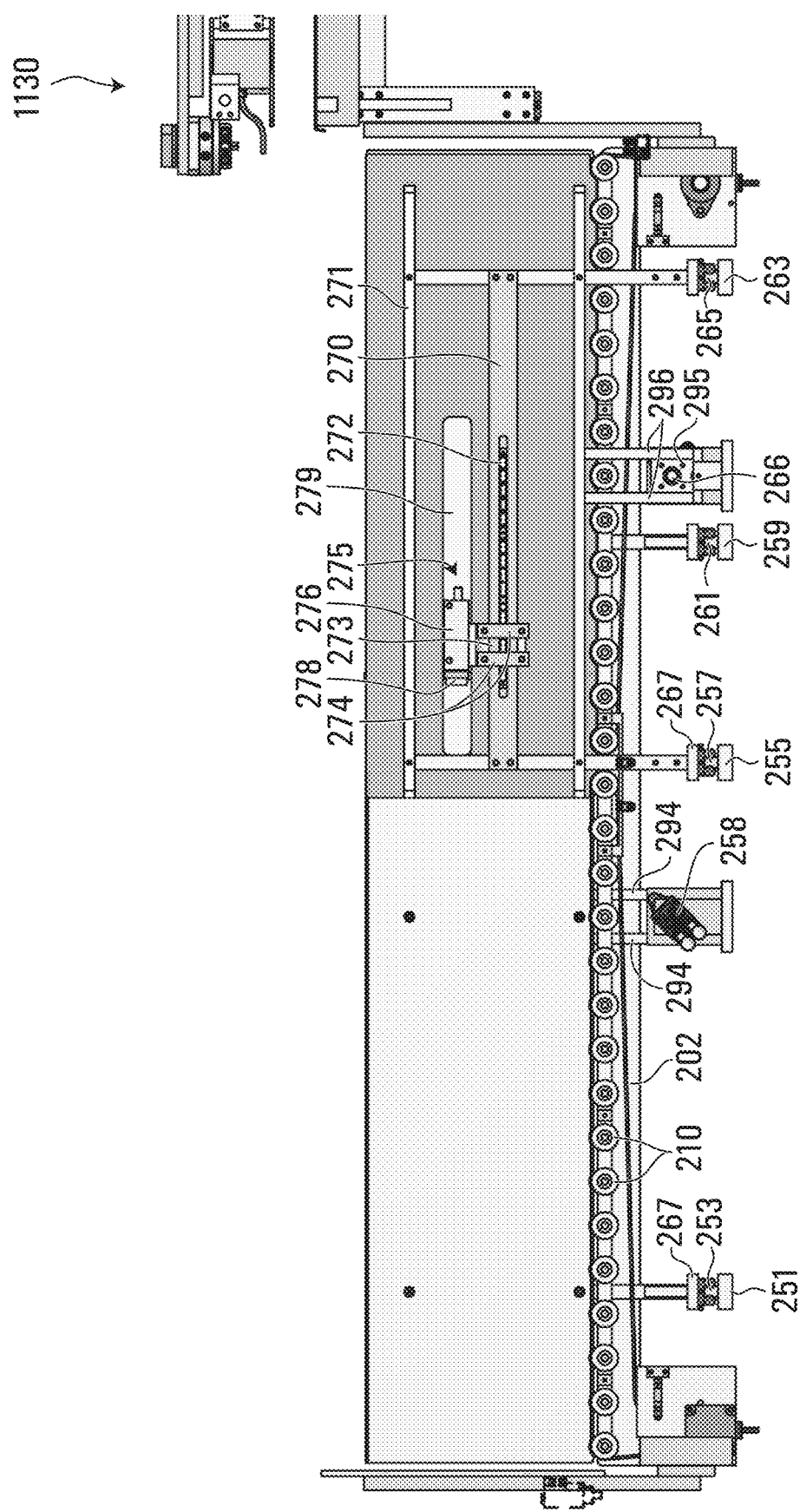

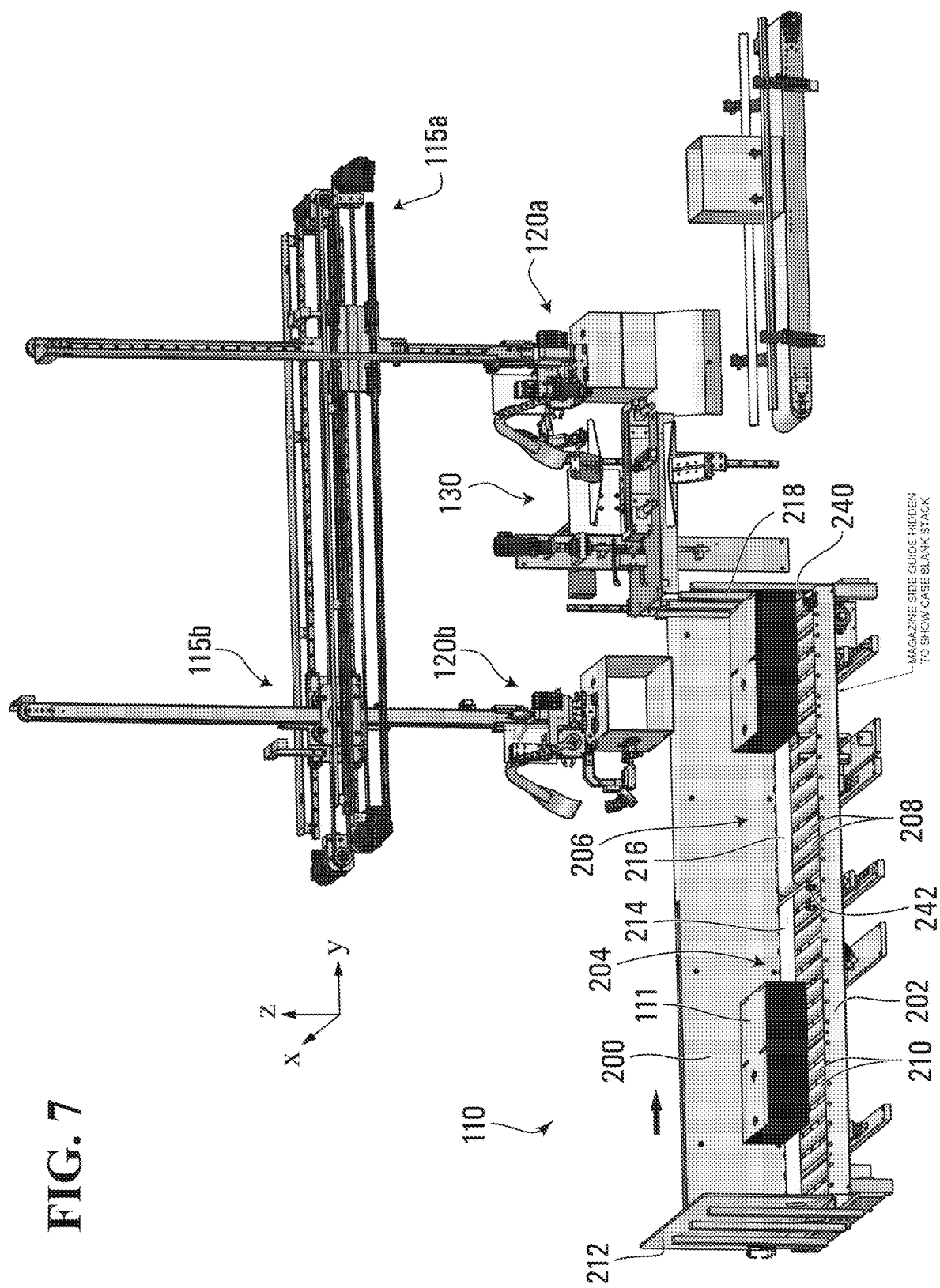

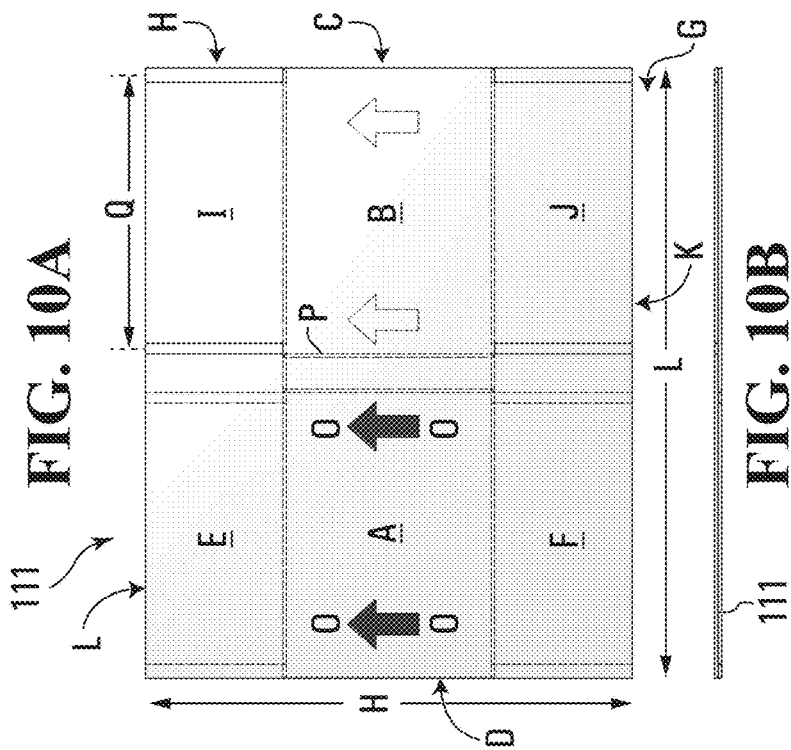
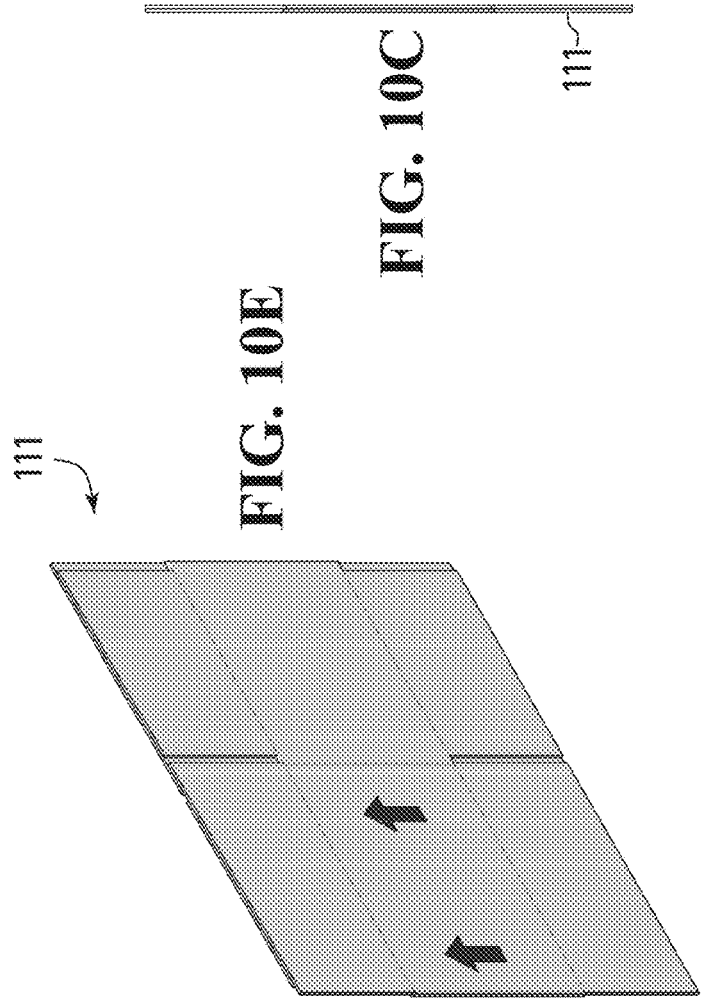
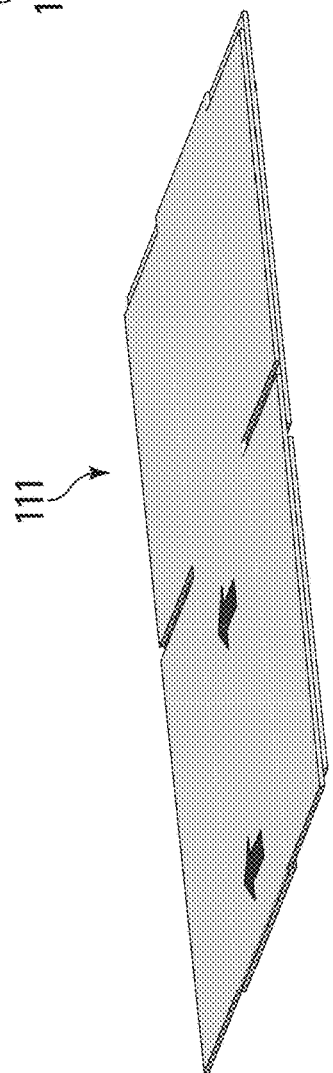
FIG. 10A   FIG. 10B   FIG. 10C   FIG. 10D   FIG. 10E

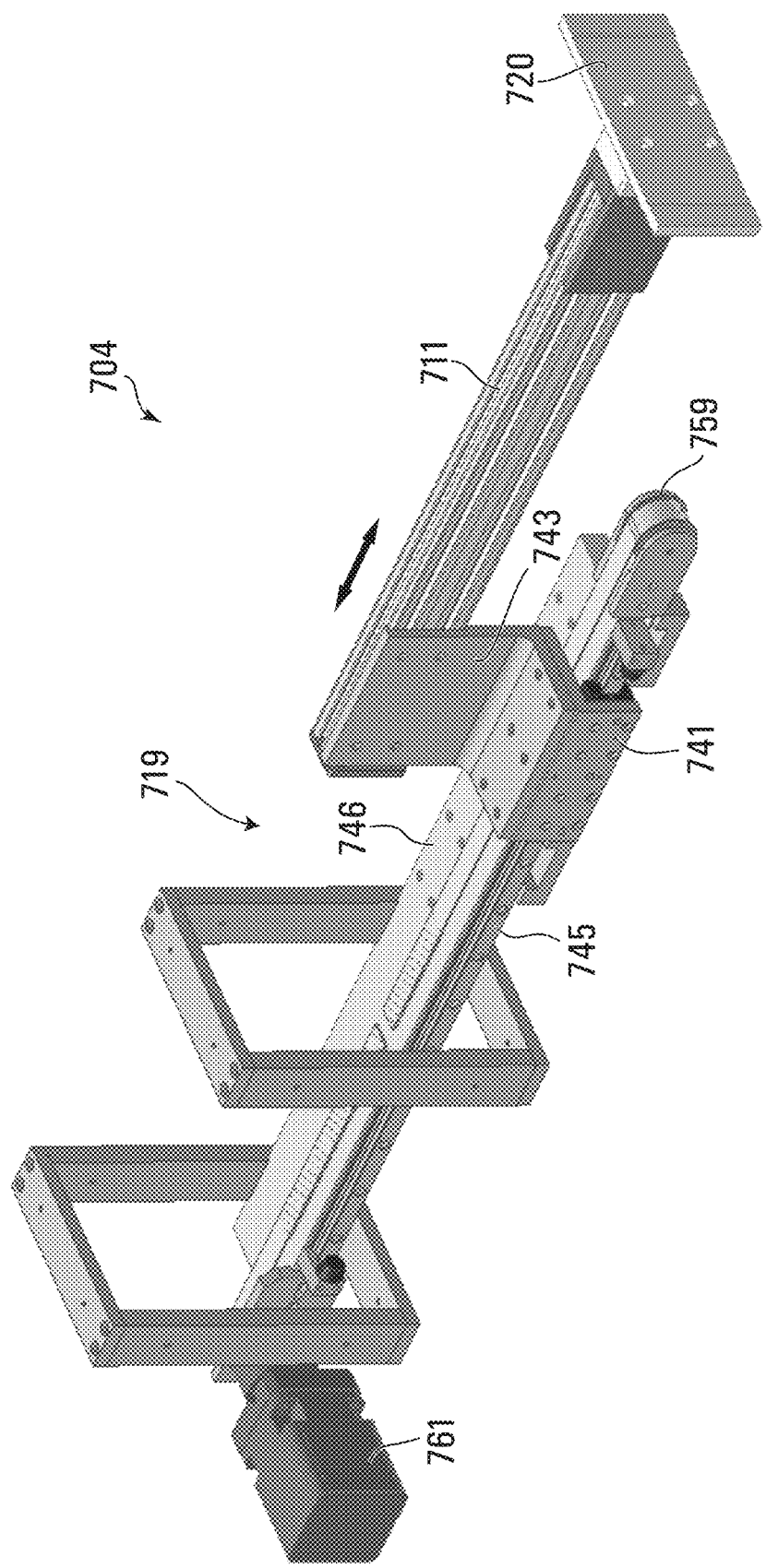

METHOD AND SYSTEM FOR ORDER FULFILMENT

CROSS-REFERENCE TO RELATED APPLICATIONS

This application is a continuation of U.S. patent application Ser. No. 16/230,979 filed on Dec. 21, 2018 which is a continuation of U.S. patent application Ser. No. 14/644,842 filed on Mar. 11, 2015, which claims priority from U.S. Provisional Patent Application Ser. No. 61/951,263 filed on Mar. 11, 2014. The contents of the aforementioned applications are incorporated by reference herein.

This application also incorporates by reference herein International PCT Patent Application Serial No. PCT/CA2013/000245 filed on Mar. 15, 2013 and U.S. Provisional Patent Application Ser. No. 61/637,665 filed on Apr. 24, 2012, in their entireties.

FIELD OF THE INVENTION

The present invention relates generally to methods and systems for order fulfilment such as order fulfilment of products ordered by customers. It also relates to systems and methods for erecting cases from case blanks.

BACKGROUND

Containers are used to package many different kinds of products. One form of container used in the packaging industry is what is known generically as a "box" and it can be used to hold various products and sometimes other boxes containing products. Some in the packaging industry refer to boxes used to package one or more products as "cartons". Also in the industry there are containers/boxes that are known by some as "cases". In this patent document, including the claims, the words "case", "cases", "carton", "cartons" "container" and "containers" are used interchangeably to refer to boxes, cartons, trays and/or cases and the like that can be used to package any type of items including products and other cartons.

Cases come in many different configurations and are made from a wide variety of materials. However, many cases are foldable and are formed from a flattened state (commonly called a carton blank). Cases may be made from an assortment of foldable materials, including but not limited to cardboard, chipboard, paperboard, corrugated fibreboard, other types of corrugated materials, plastic materials, composite materials, and the like and possibly even combinations thereof.

Cases can be used to fulfil an order initiated by a customer for one or more products by obtaining each product from one or more locations in a storage facility such as a warehouse, loading the product(s) into a case, sealing the case, and then shipping the loaded case to a customer.

However, there are many obstacles to providing efficient methods and systems to fulfil customer orders, particularly where it is desirable to be able to fulfil orders for a large number of customers that may each have orders for a wide range of different kinds and/or number of products.

Accordingly, an improved method and system of product fulfilment is desirable.

SUMMARY

According to one aspect of the present invention there is provided a method of fulfilling an order, the order comprising at least one product, the method comprising: receiving an order comprising at least one product; determining a suitable case from a plurality of available cases for holding the at least one product, the determining being a function of one or more characteristics of each the product of the at least one product and one or more characteristics of the plurality of available cases; forwarding information identifying the suitable case to a case former; providing a case blank corresponding to the suitable case to the case former; erecting a suitable case from the case blank corresponding to the suitable case with the case former; and prior to loading the suitable case with the at least one product, labelling the suitable case.

According to another aspect of the present invention there is provided a method of fulfilling an order, the order comprising a plurality of products, the method comprising: receiving an order comprising a plurality of products; determining a plurality of suitable cases from the plurality of available cases for holding the plurality of products, the determining being a function of at least one characteristic of each the product of the plurality of products and of at least one characteristic of the plurality of available cases; forwarding information identifying the plurality of suitable cases to at least one carton former; providing case blanks corresponding to each of the plurality of suitable cases to the at least one case former; the at least one carton former erecting the plurality of suitable cases from the case blanks corresponding to each of the plurality of suitable cases with the one or more case formers; prior to loading each of the suitable cases formed from the case blanks with the one or more case formers, labelling each of the suitable cases.

According to another aspect of the present invention there is provided a system for fulfilling an order, the order comprising at least one product, the at least one product having a product characteristic, the system comprising: an order fulfilment processor; a first case blank magazine and a second case blank magazine, the first and second case blank magazines each holding at least one case blank, with the at least one case blank in the first magazine and the second magazine each having a case blank characteristic; a carton former operable to erect a case from a case blank held in either of the first and second case blank magazines; a case blank feeding apparatus operable to selectively feed a case from each of the first case blank magazines to the case former; a labelling device operable to label a case blank prior to loading the case with at least one product; wherein the order fulfilment processor is operable to (a) receive an order comprising at least one product; (b) determine a suitable case for the at least one product from the at least one case in the first and second case blank magazines as a function of the product characteristic of each the at least one product and the case blank characteristic of each the at least one case blank in the first and second case blank magazines; and (c) forward information identifying the suitable case to a case former; and wherein the case former is operable to: (i) receive the information identifying the suitable case from the order fulfilment processor: (ii) select and receive a case blank from the case blank feeding apparatus for the suitable case from one of the first and second magazines; and (iii) erect the suitable case from the case blank; and wherein the labelling device is operable to label the case blank of the suitable case prior to or after the case former has erected the suitable case from the case blank.

According to another aspect of the present invention there is provided a system for fulfilling an order, the order comprising a plurality of products, the plurality of products each having a product characteristic, the system comprising:

an order fulfilment processor; a plurality of case blank magazines each holding a plurality of available case blanks, with the plurality of available case blanks in each of the plurality of magazines having a case blank characteristic; a carton former operable to erect a case from a case blank of each of the plurality of case blank magazines; a case blank feeding apparatus operable to selectively feed a case blank from each of the plurality of case blank magazines to the case former; a labelling device operable to label each of the cases prior to loading each case with at least one product; wherein the order fulfilment processor is operable to (a) receive an order comprising a plurality of products; (b) determine at least one suitable case for holding the plurality of products as a function of the product characteristic of the plurality of products and the case blank characteristics of each of the case blank in the plurality of case blank magazines; and (c) forward information identifying a suitable case to a case former; and wherein the case former is operable to: (i) receive the information identifying a suitable case from the order fulfilment processor: (ii) select and receive a case blank from the case blank feeding apparatus corresponding to the suitable case from one of the available case blanks in one of the plurality of case blank magazines; and (iii) erect the suitable case from the case blank; and wherein the labelling device is operable to label the case blank of the suitable case prior to or after the case former has erected the suitable case from the case blank.

According to another aspect of the present invention there is provided a system for forming a container from a tubular blank comprising a plurality of panels and flaps interconnected to provide a generally flattened tubular configuration, wherein the plurality of panels comprise a first panel, and a second panel interconnected to the first panel, the second panel being rotatable relative to the first panel, the system comprising: (a) a plurality of magazines, each of the plurality of magazines for storing a plurality of tubular blanks in a generally flat configuration; (b) a case blank transfer apparatus for transferring a case blank from a selected one of the plurality of magazines to an erector head; (c) an erector head operable to received a case blank at a pick up location from the case blank transfer apparatus and open the case blank; (d) a folding and sealing apparatus; and (e) a movement sub-system having at least one movement apparatus connected to the erector head for moving the erector head along a cyclical path extending between the pick up location and the folding and sealing apparatus.

According to another aspect of the present invention there is provided a method for forming a container from a tubular blank comprising a plurality of panels and flaps interconnected to provide a generally flattened tubular configuration, wherein the plurality of panels comprise a first panel, and a second panel interconnected to the first panel, the second panel being rotatable relative to the first panel, the method comprising: a. obtaining a selected case blank from one magazine of a plurality of magazines, each of the plurality of magazines storing a stack of tubular blanks in a generally flat configuration; b. transferring the selected case blank to an erector head; c. erecting the selected case blank with the erector head; and d. folding and sealing the selected case blank.

Other aspects and features of the present invention will become apparent to those of ordinary skill in the art upon review of the following description of specific embodiments of the invention in conjunction with the accompanying figures.

BRIEF DESCRIPTION OF THE DRAWINGS

In the figures which illustrate by way of example only, embodiments of the present invention.

FIG. 6C is a right side elevation view of the magazine sub-system of FIG. 6A, but with several components omitted;

FIG. 7 is a right side perspective view of the system of FIG. 1A but with several components omitted to show the blank intake system and the two erector heads and movement apparatuses, and a folding and sealing apparatus;

FIGS. 10A-10E are a plan, front and side elevation views and two perspective views, of a blank for a regular slotted case shown is a generally flattened tubular configuration;

FIG. 26A is a schematic perspective view of part of the folding and sealing apparatus of system shown in FIG. 1A.

DETAILED DESCRIPTION

Figure 1A:
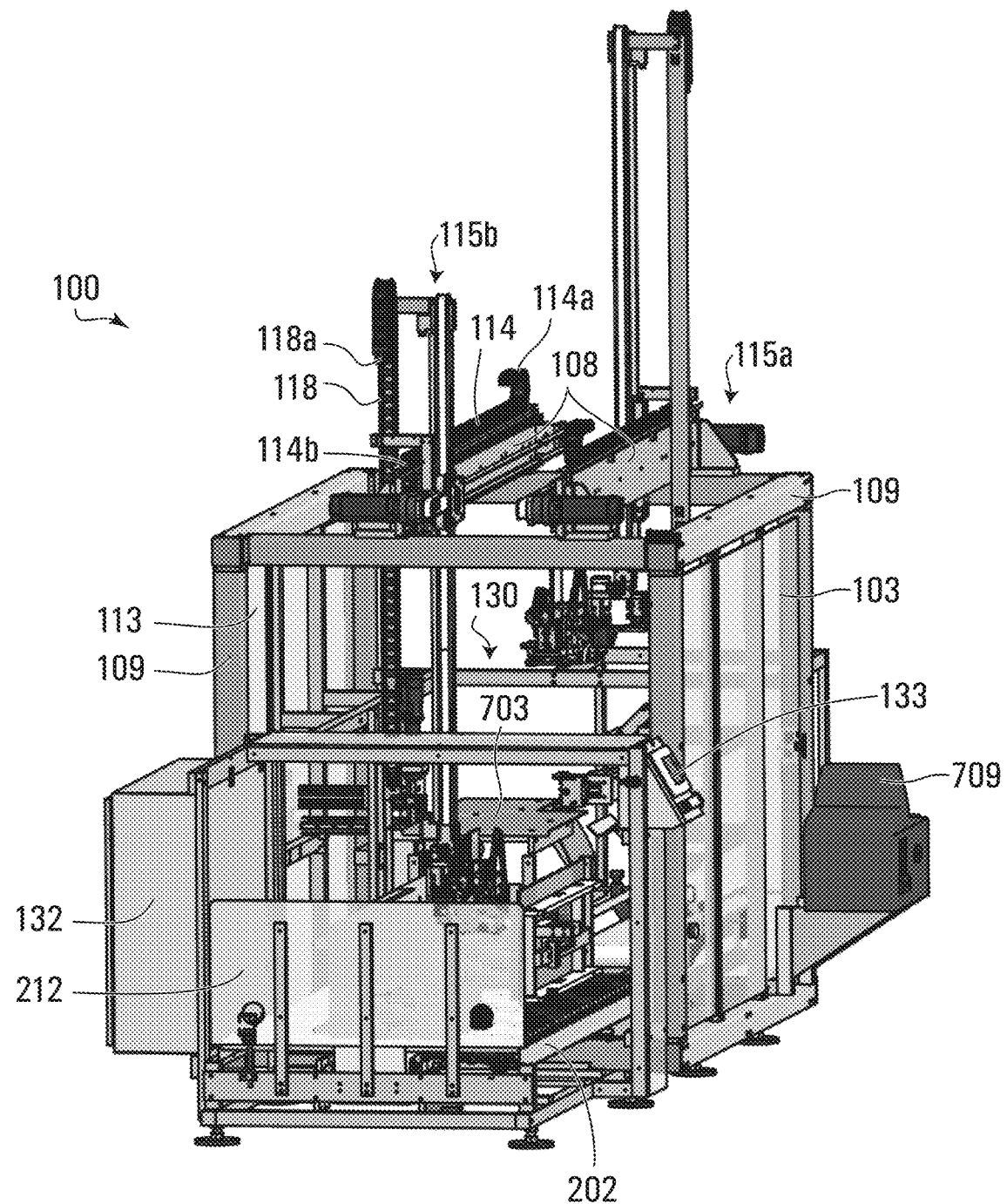
FIG. 1A is top right front perspective view of part of a carton forming system in accordance with an example embodiment of the present invention.

With reference initially to FIGS. 1A-3, an example of a carton/case forming system that may be used as part of a product order fulfilment system is a carton/case forming system 100 (generally referred to as carton forming system 100). Carton forming system 100 may include a frame generally referred to as frame 109. The frame 109 may have integrated with it a series of panels 103 that may be made from a plastic or glass and that may or may not be transparent or semi-transparent. One or more of the panels 103 may be configured to operate as a hinged door so that interior portions of system 100 can be accessed. System 100 may also include a magazine 110 adapted to receive, hold and move a plurality of carton blanks 111 while in a substantially flat orientation. System 100 may include at least first and second erector heads 120a, 120b for retrieving carton blanks from the magazine 110. Erector heads 120a, 120b may pick up the carton blanks 111 from the magazine 110 and then manipulate the blanks in such a way that, with the assistance of other components of system 100, the carton blanks 111 are transformed into erected cartons.

The erector heads 120a, 120b may be moved by a movement sub-system. The movement sub-system may include one or more movement apparatuses. For example, erector head 120a may be mounted to and moved by a first moving apparatus 115a. Second erector head 120b may be mounted to and moved by a second moving apparatus 115b. In some embodiments only a single erector head and movement apparatus may be provided, but this may result in a lower production rate of erected cartons compared to when particularly two or possibly more, movement apparatuses and erector heads are provided, as illustrated in the drawings.

System 100 may also include a folding and sealing apparatus generally designated 130, which may be configured to fold one or more flaps of each carton blank and provide for sealing of one or more flaps as part of the process in forming fully erected cartons. In co-operation with erector heads 120a, 120b, a common folding and sealing apparatus 130 may be configured to handle in alternating sequence, carton blanks 111 carried by both erector head 120a and erector head 120b. System 100 may also include a carton discharge conveyor 117 for receiving and moving away carton blanks 111 once they have been fully erected.

The structural/mechanical components of system 100 may be made from any suitable materials. For example, frame members, and many of the parts that make up the erector heads 120, moving apparatuses 115, many of the components and parts that make up folding and sealing apparatus 130, and magazine 110, may be made of steel or aluminium, or any other suitable materials. Aluminum is particularly suitable for most parts. However, plates that hold the suction cups on the erector head and flanges that mount on gearbox shafts can be made from stainless steel for strength and hardness. Parts and components may be attached together in conventional ways such as for example by bolts, screws, welding and the like.

Figure 1B:
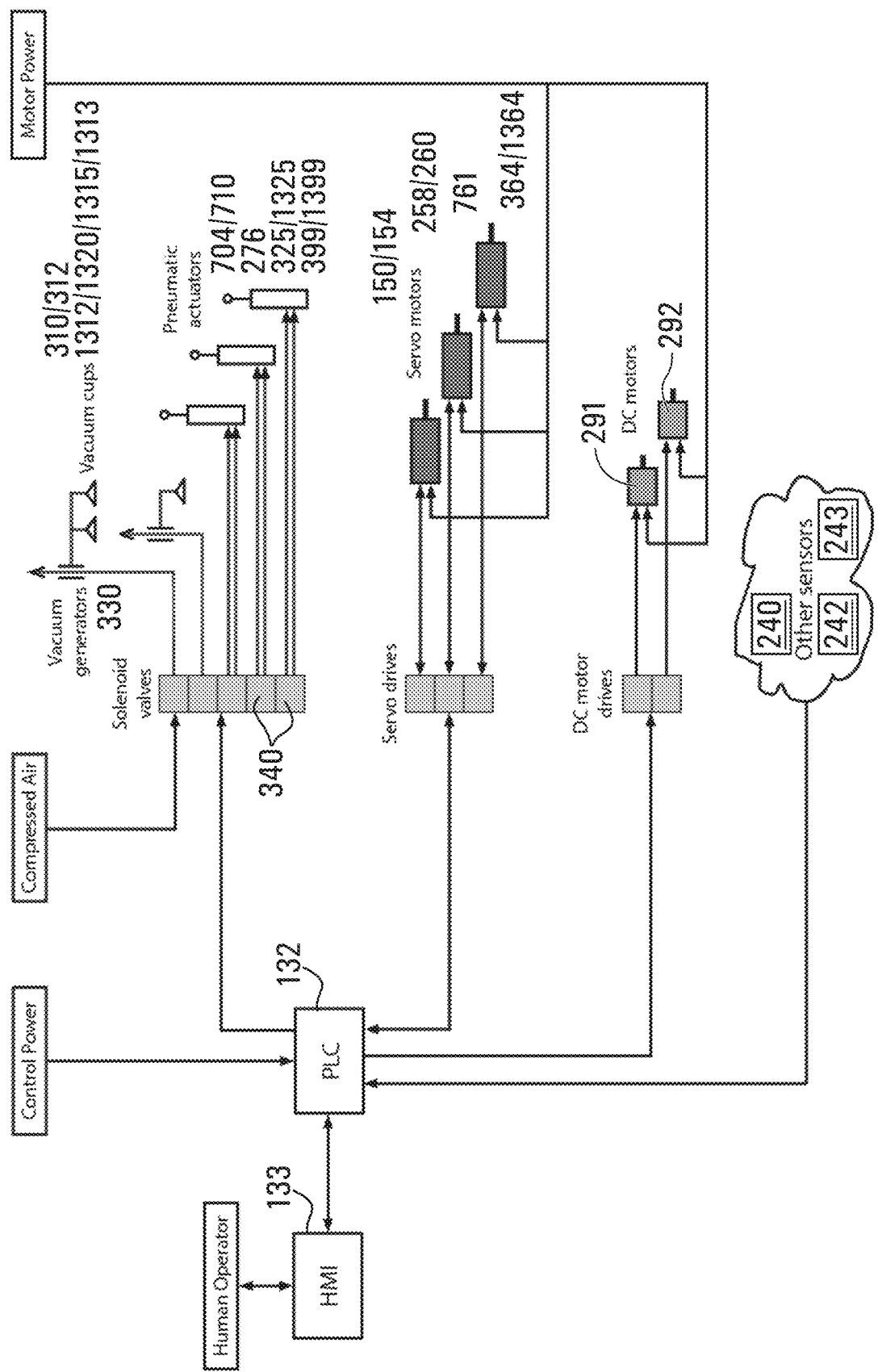
FIG. 1B is a schematic flow chart of the power and control sub-system of the part of the case forming system of FIG. 1A.
Figure 2:
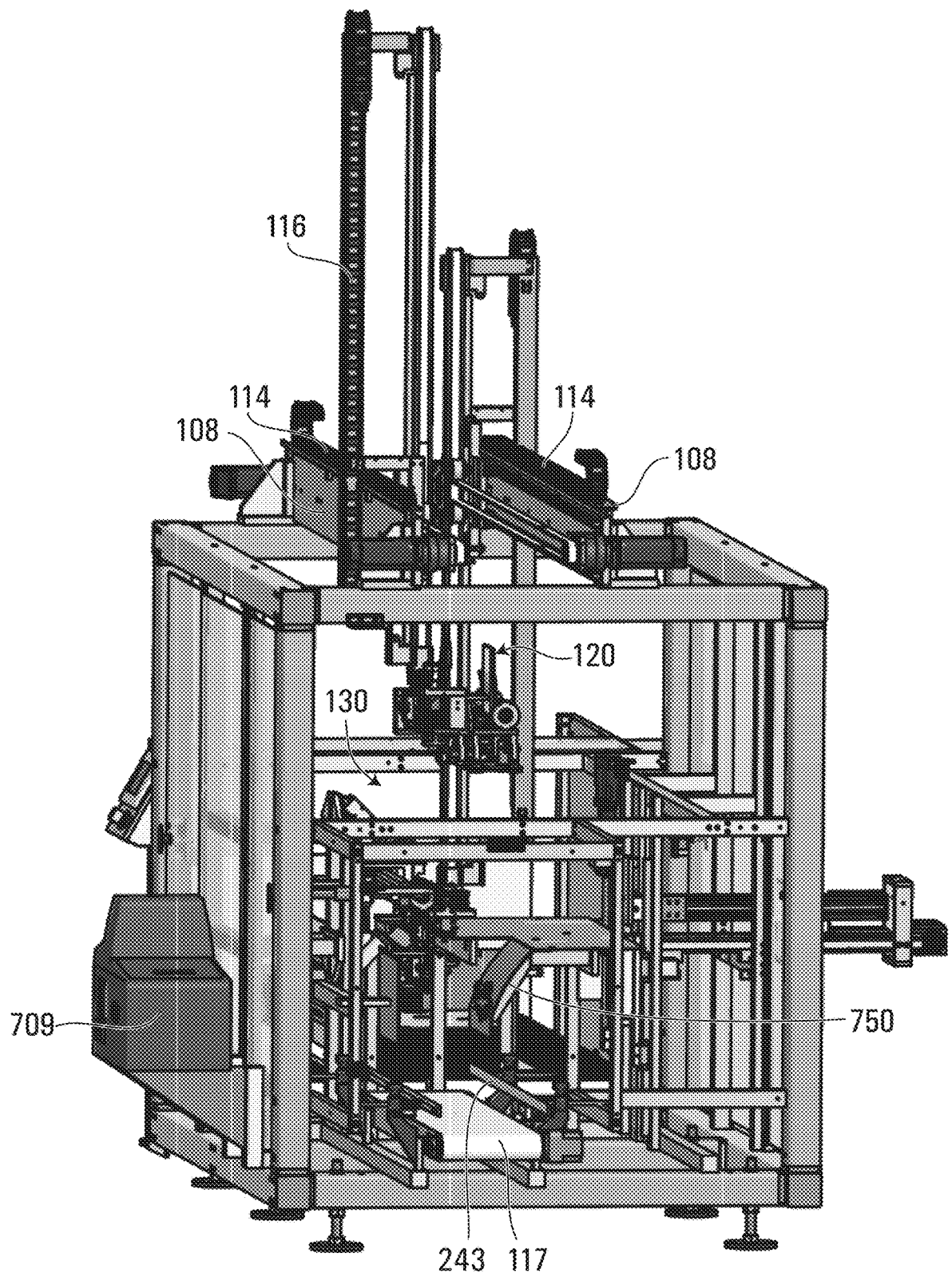
FIG. 2 is a top right rear perspective view of the carton forming system of FIG. 1A.
Figure 3:
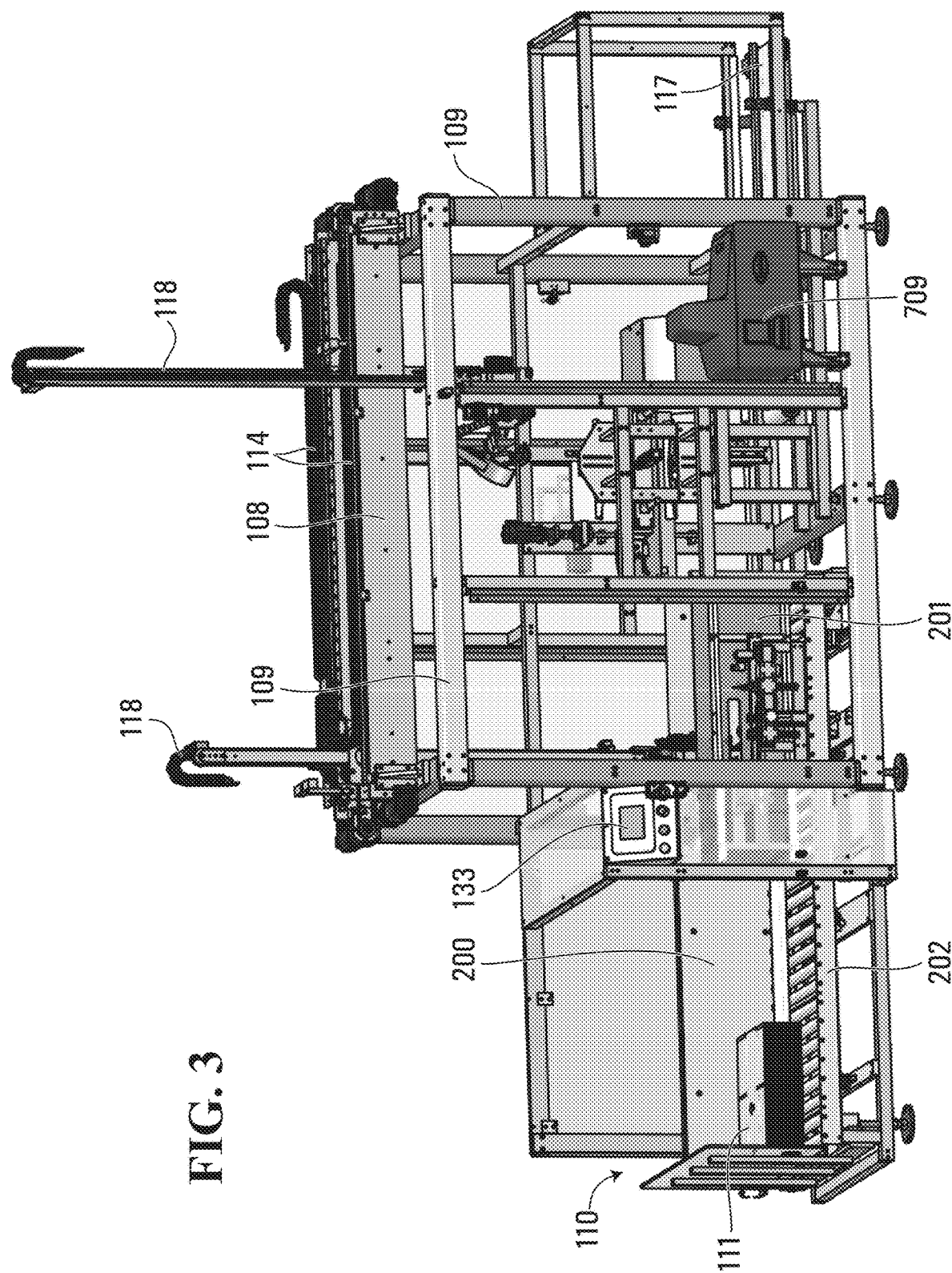
FIG. 3 is a top right side perspective view of the carton forming system of FIG. 1A.
Figure 4:
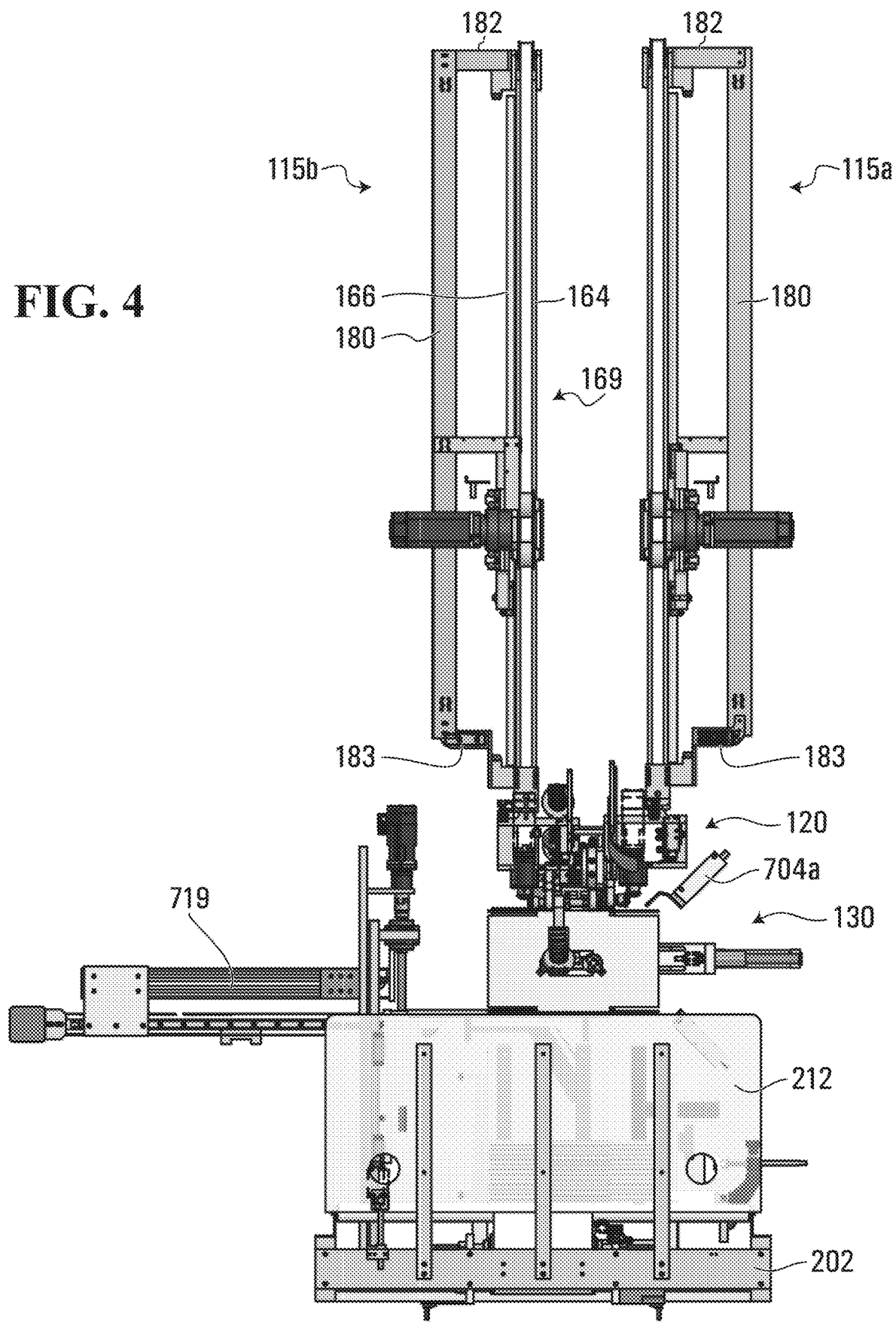
FIG. 4 is a front schematic elevation view of the carton forming system of FIG. 1A, but with several components omitted.
Figure 5:
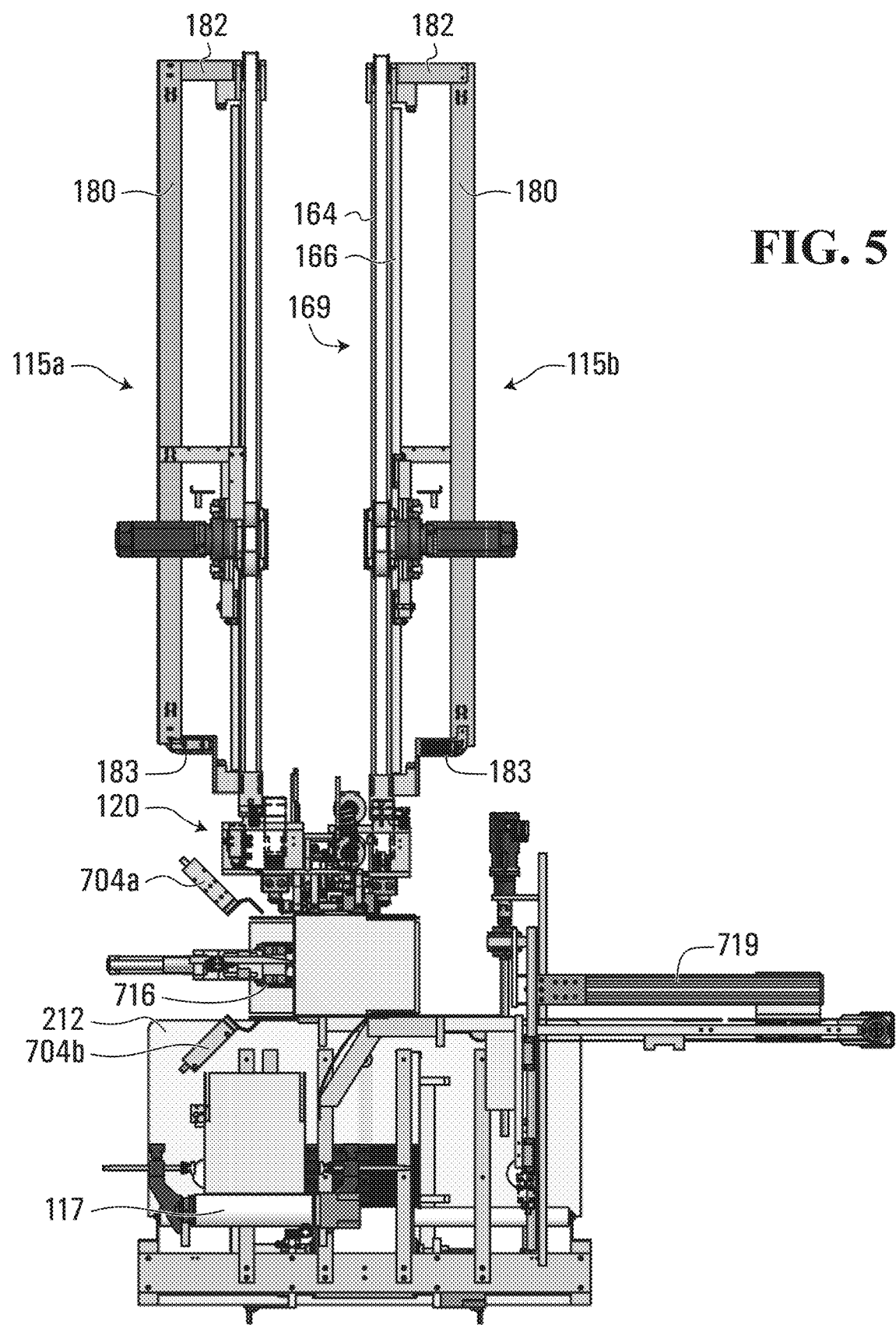
FIG. 5 is a rear schematic elevation view of the carton forming system of FIG. 1A but with several components omitted.
Figure 6A:
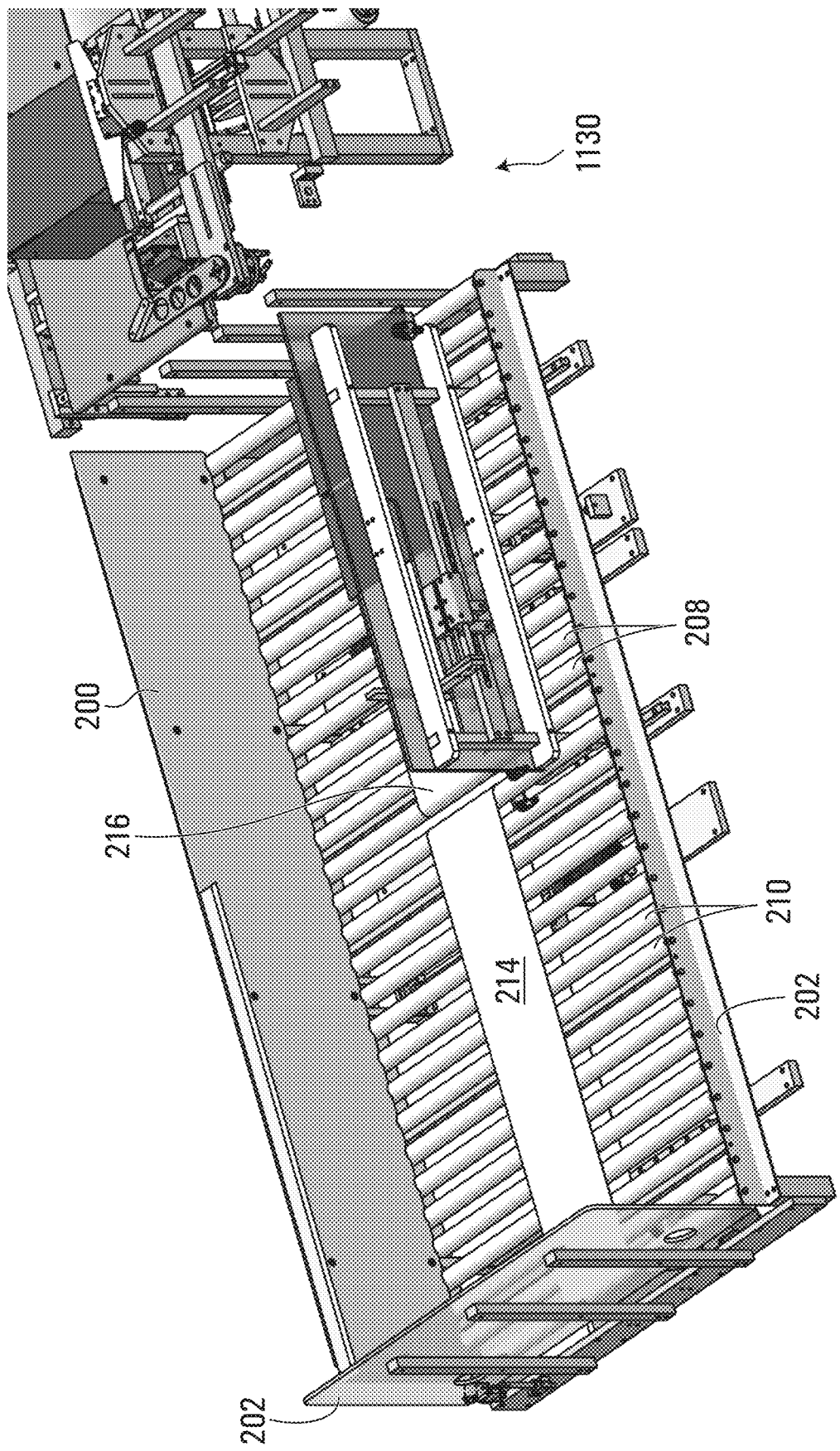
FIG. 6A is a top right perspective view of a magazine sub-system.
Figure 6B:
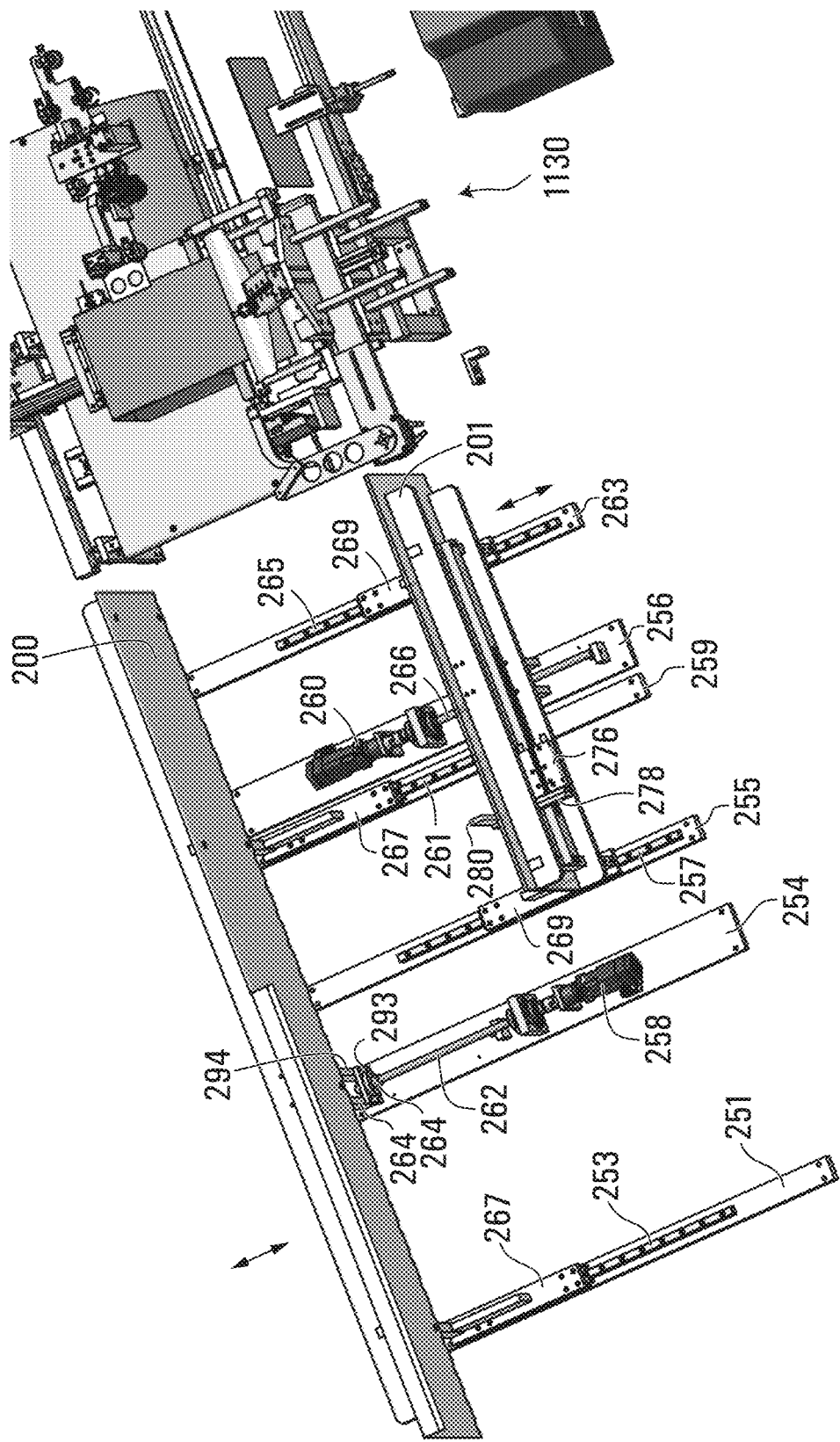
FIG. 6B is a top right perspective view of the magazine sub-system of FIG. 6A, but with several components omitted.
Figure 6D:
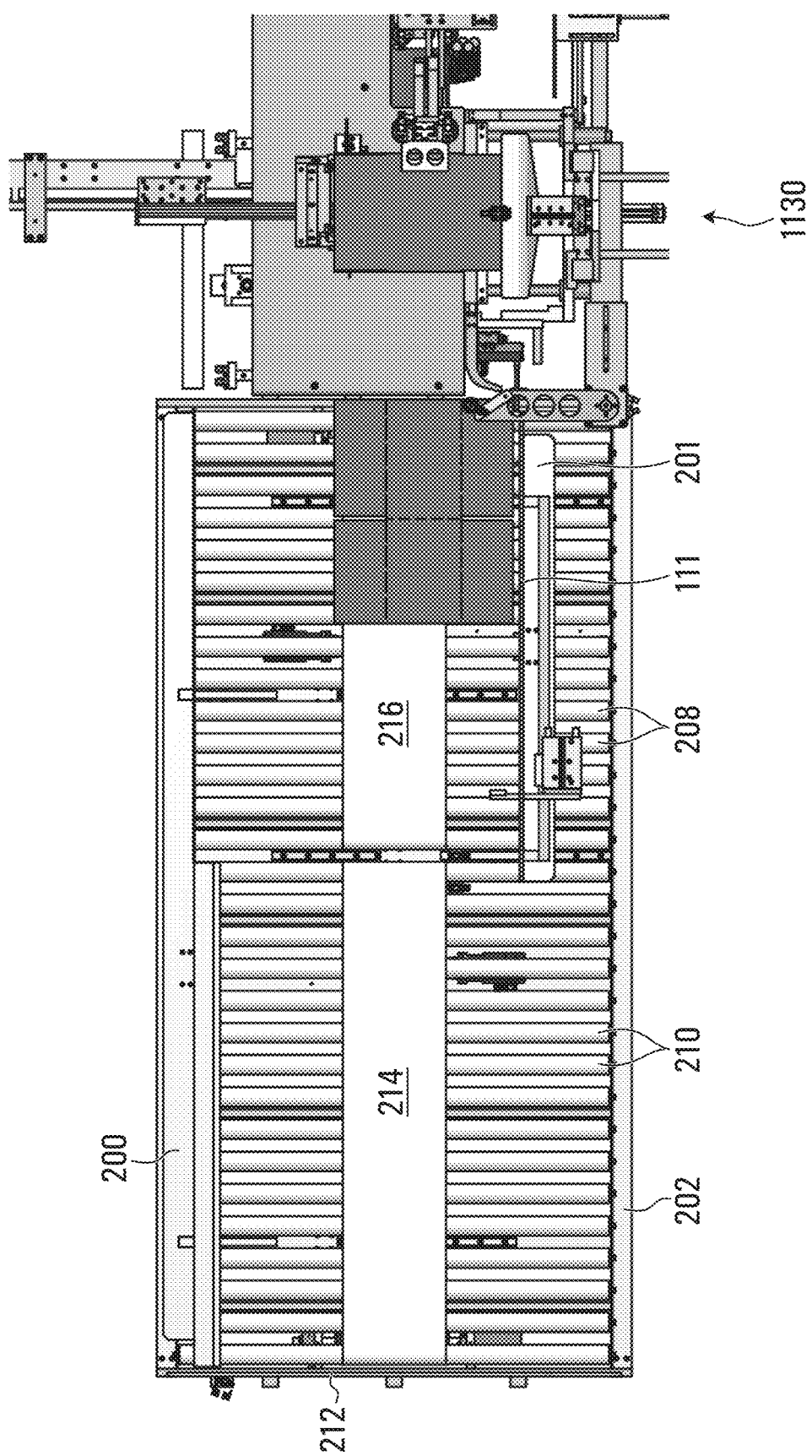
FIG. 6D is a top plan view of the magazine sub-system of FIG. 6A.
Figure 8:
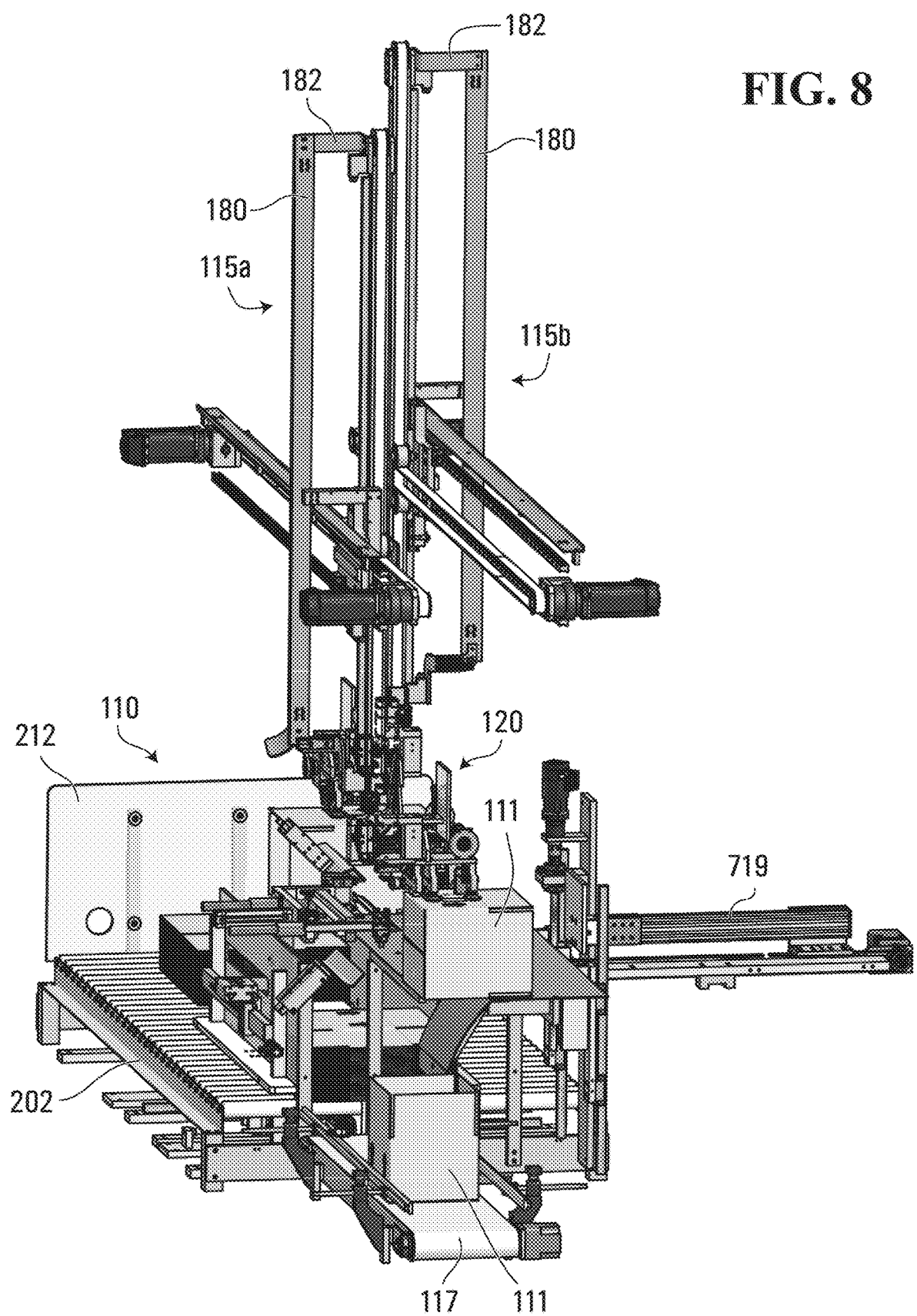
FIG. 8 is a top right rear perspective view of the components of FIG. 7.
Figure 9:
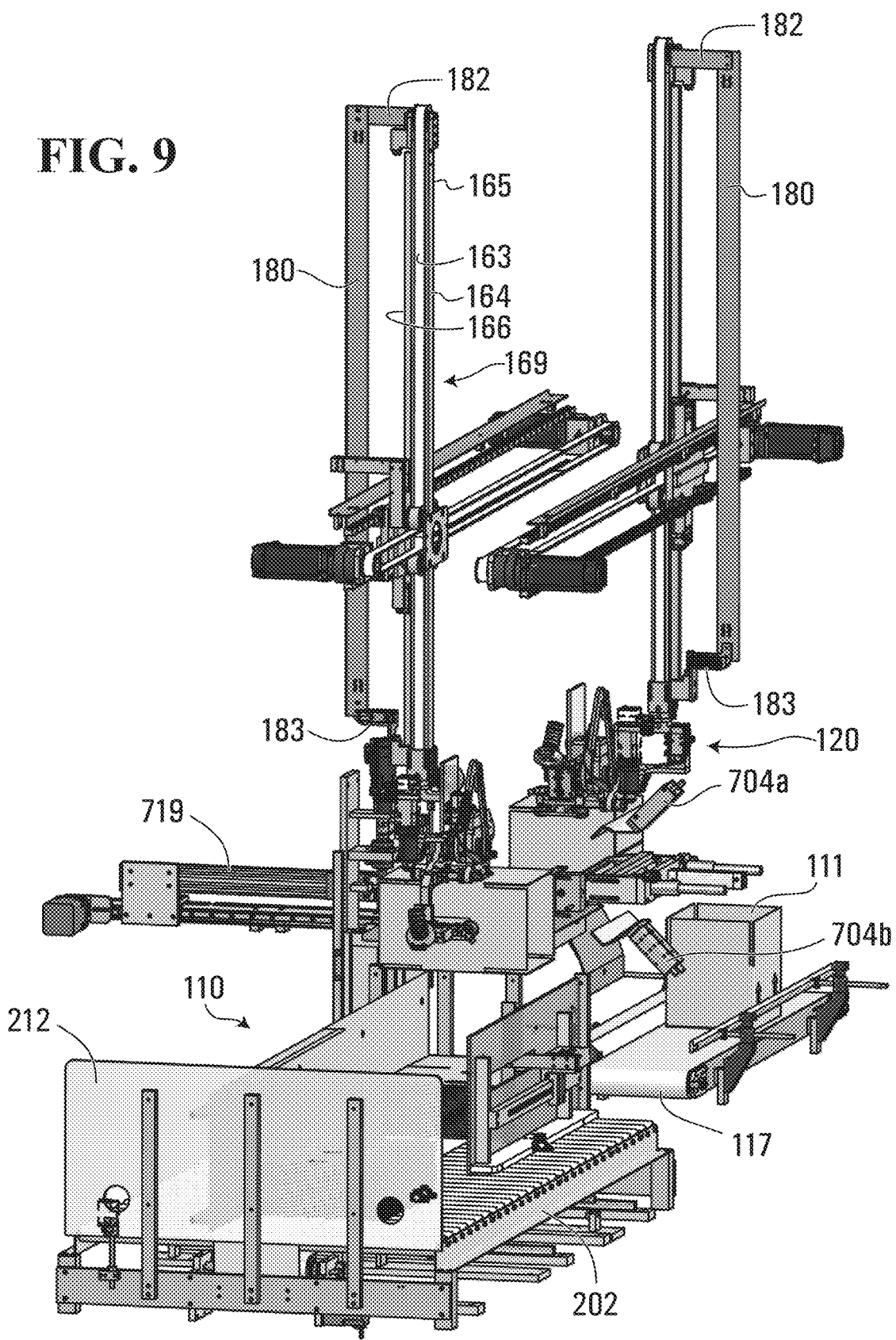
FIG. 9 is a top right front perspective view of the components of FIG. 7.

An example of a scheme for the power and data/communication configuration for system 100 is illustrated in FIG. 1b. The operation of the components of carton forming system 100, and of system 100 as a whole, may be controlled by a programmable logic controller ("PLC") 132. PLC 132 may be accessed by a human operator through a Human Machine Interface (HMI) module 133 secured to frame 109. HMI module 133 may be in electronic communication with PLC 132. PLC 132 may be any suitable PLC and may for example include a unit chosen from the Logix 5000 series devices made by Allen-Bradley/Rockwell Automation, such as the ControlLogix 5561 device. HMI module 132 may be a Panelview part number 2711P-T15C4D1 module also made by Allen-Bradley/Rockwell Automation. It should be noted that not all of the sensors, motors, servo motors, drives, vacuums, vacuum generators and vacuum cups described hereinafter are specifically identified in FIG. 1B.

Electrical power can be supplied to PLC 132/HMI 133, and to all the various servo motors and DC motors that are described further herein. Compressed/pressurized air can also be supplied to the vacuum generators and pneumatic actuators through valve devices such as solenoid valves that are controlled by PLC 132, all as described further herein. Servo motors may be connected to and in communication with servo drives that are in communication with and controlled by PLC 132. Similarly, DC motors may be connected to DC motor drives that are in communication with and controlled by PLC 132; again all as described further herein. Additionally, various other sensors are in communication with PLC 132 and may (although not shown) also be supplied with electrical power.

With reference now to FIGS. 10A-10E and 11A, an example of one kind of tubular carton blank 111 that can be processed by system 100 to form a regular slotted case (RSC) is disclosed. Other kinds of carton blanks, tubular carton blanks, and tubular carton blanks of different sizes can be processed by system 100.

Each carton blank 111 may be generally initially formed and provided in a flattened tubular configuration as shown in FIGS. 10A-10E. Each blank 111 has a height dimension "H"; a length dimension "L"; and a major panel length "Q" (see FIG. 10B). By inputting each of these three dimensions for a blank 111 to be processed by system 100, into PLC 132, PLC 132 can determine if the system 100 can process that size blank without the necessity for manual intervention to make an adjustment to one or more components of the system 100. If PLC 132 determines that the adjustment can be made without human intervention, the PLC 132 may make the necessary adjustments to positions and/or movements of at least some of the components forming system 100, including the path of movement of erector heads 120a, 120b as the erector heads move and cycle through their processing sequences.

However, in some systems 100, for some size blanks 111, PLC 132 may determine that human intervention of some kind is necessary to make set-up adjustments to the positioning/orientations of at least some of the components of the system to enable the system to process the blank and may accordingly inform an operator of system 100.

Blank 111 may have opposed major panels A and C integrally interconnected to a pair of opposed minor panels B and D to form a generally cuboid shaped blank when opened. An overlap strip of carton blank material may be provided between panel B and panel A that can be sealed by conventional means such as a suitable adhesive, to provide an overlapping seam joint in the vicinity of "P" (see FIG. 10A). This overlap may join the panels A, B, C and D into a continuous blank that is of generally flattened tubular configuration as shown in FIG. 10A. A number of such blanks 111, in a flattened configuration, can be delivered to the vicinity of system 100 that can be erected into the generally open tubular configuration shown for example in FIG. 11.

Also, as shown in FIGS. 10A-10E and 11, are upper side major and minor flaps E, H, L, I that are provided one side of the respective major and minor panels A-D. A second set of major and minor flaps F, G, K and J are also provided on the opposite, lower/bottom sides of the major and minor panels A-D. However, in other embodiments, cartons having other side panel configurations can be formed. The panels and flaps can be connected to adjacent flaps and/or panels by predetermined fold/crease lines (shown in broken lines). These fold/crease lines may for example be formed by a weakened area of material and/or the formation of a crease with a crease forming apparatus. The effect of the fold lines is such that one panel such as for example panel A can be rotated relative to an adjacent panel such as D or B along the fold lines. Flaps may also fold and rotate about fold lines that connect them to their respective panels.

Figure 11:
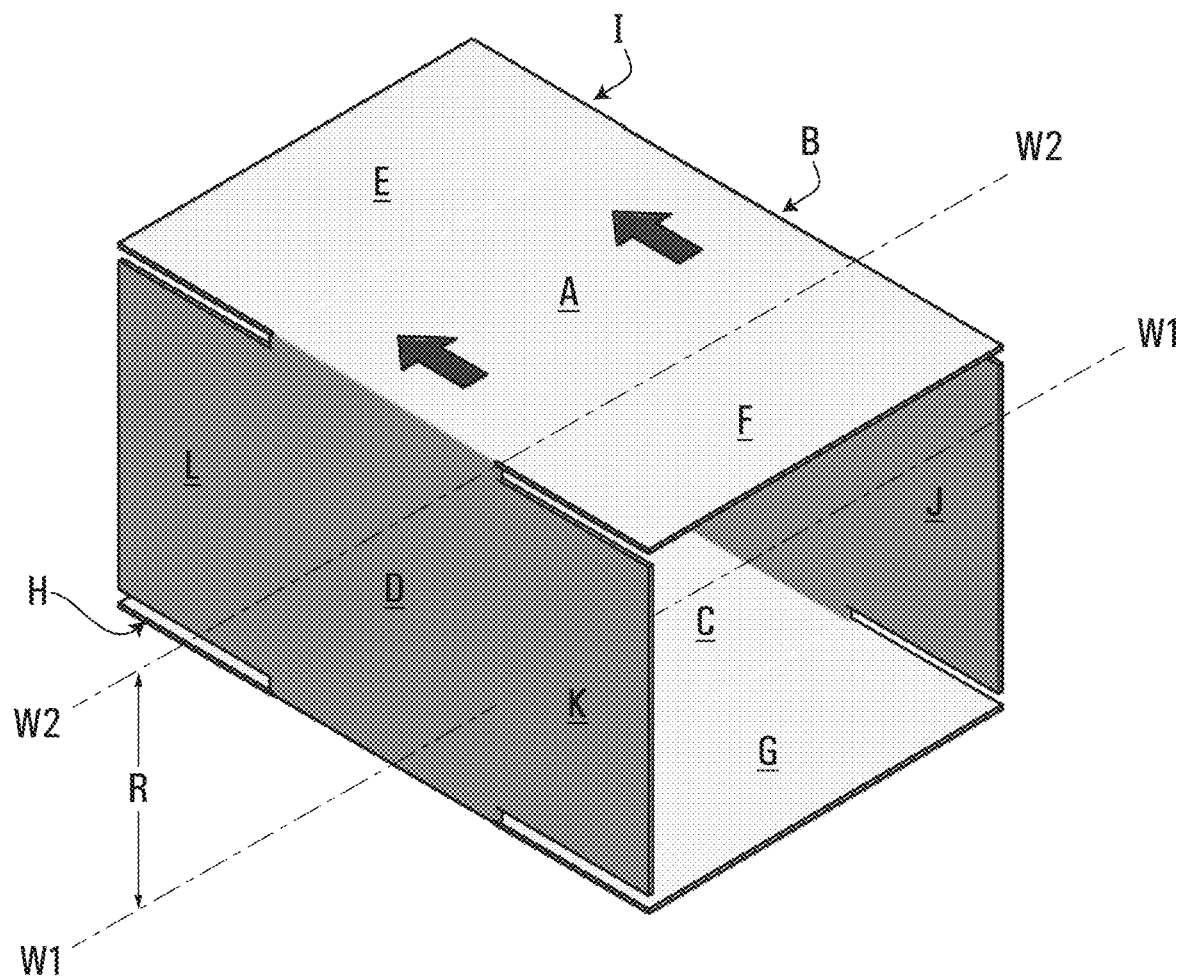
FIGS. 11-16 are schematic right perspective sequential views of a blank of FIGS. 10A to 10E configured in an open configuration being sequentially processed into an erected carton.

As shown in FIG. 11, blank 111 may be designated with a first datum line "W1" that passes through the mid-point of the fold line between panel D and flap K, and the mid-point of the fold line between panel B and flap J. This datum line W1 may be determined by PLC 132 for a particular blank or group of blanks 111 to be processed, based on the input of the dimensions H, L and Q of the blanks. Blank 111 may be designated with a second datum line "W2" that may be determined by PLC 132 and which passes along and is generally parallel to the fold line between panel D and flap K, and the mid-point of the fold line between panel A and flap F. Datum W1 will be parallel to Datum W2. PLC 132 may also determine the relative position of the bottom of the erected carton as this will be aligned with a vertical datum plane passing through Datum W1 and Datum W2. Aligning the position datum W2 and of the datum plane with other components in system 100 will ensure that the carton is properly positioned during processing through system 100. Also, the vertical distance R between datum W1 and the datum line W2 may be calculated by PLC 132. This can ensure that PLC 132 knows where it needs to position the erector head so that top panel A, and accordingly, datum W1 are properly positioned throughout the processing of the blank by system 100.

System 100 is able to track and modify the position of the blank 111, and in particular the vertical position of the datum line W1 of the blank as the blank moves longitudinally through system 100 and as various components of system 100 engage the blank 111 during its movements. This will ensure that the blank 111 being processed is appropriately positioned relative to the system components so that the system components engage the blank at the correct position on the blank during processing of the blank.

As will be described hereinafter, carton blank 111 may be transformed from a generally flattened tubular configuration to an open tubular configuration and the flaps may be folded and sealed to form the desired erected carton configuration. The carton may be configured as a top opening carton suitable to be delivered to a carton loading conveyor with an upwardly facing opening or with a sidewards facing opening suitable for side loading.

Carton blanks 111 may have flaps that provides material that can, in conjunction with a connection mechanism (such as for example with application of an adhesive, sealing tape or a mechanical connection such as is provided in so-called "Klick-lok™" carton blanks) interconnect flap surfaces, to join or otherwise interconnect, flaps to adjacent flaps (or in some embodiments flaps to panels), to hold the carton in its desired erected configuration.

Carton blanks 111 may be made of any suitable material(s) configured and adapted to permit the required folding/bending/displacement of the material to reach the desired configuration. Examples of suitable materials are chipboard, cardboard or creased corrugated fiber-board. It should be noted that the blank may be formed of a material which itself is rigid or semi-rigid, and not per se easily foldable but which is divided into separate panels and flaps separated by creases or hinge type mechanisms so that the carton can be erected and formed.

Turning now to the components of system 100, various specific constructions of a suitable magazine 110 might be employed in system 100. With particular reference now to FIG. 3, FIGS. 6a-d, and FIG. 7, magazine 110 may be configured to hold a plurality of carton blanks 111 in a vertically stacked, flattened configuration, and be operable to move the stack of carton blanks 111 longitudinally in a direction generally parallel to longitudinal axis Y under the control of PLC 132, to a pick up position where an erector head 120a and 120b can retrieve cartons from the magazine.

Magazine 110 may comprise a single conveyor or other blank feed apparatus to deliver blanks to a pick up location. In the illustrated embodiment of FIGS. 1A to 9, two conveyors are disclosed: an in-feed conveyor 204; and an alignment conveyor 206. However, as will described hereinafter in other embodiments, the blank feed apparatus may be configured with multiple in-feed conveyors feeding cartons/cases from multiple magazines that hold carton/case blanks having different configurations. This enables a system 100 to by automation, selectively and sequentially erect cartons that differ in size, type, and/or configuration from each other.

Returning to system 100 of FIGS. 1A to 9, in-feed conveyor 204 may be configured and operable to move a stack of blanks 111 from a stack input position (where a stack may be loaded onto conveyor 204 such as by human or robotic placement) to a position where the stack of blanks is transferred to horizontally and transversely aligned, alignment conveyor 206. Alignment conveyor 206 may be positioned longitudinally downstream in relation to in-feed conveyor 204 and be used to move the stack of blanks to the pick up position. Magazine 110 may be loaded with, and initially hold, a large number of carton blanks 111 in a vertical stack, with the stack resting on in-feed conveyor 204. A rear wall 212 mounted to a lower portion of a magazine frame generally designated 202, can be configured to retain the one or more stacks from falling backwards when initially loaded on conveyor 204. Rear wall 212 may have a generally planar, vertically and transversely oriented surface facing the stack of blanks 111. Rear wall 212 and conveyor 204 may be of an appropriate length to be able to store a satisfactory number of stacks of blanks in series on conveyor 204. PLC 132 can control the operation of conveyor 204 to move one stack at a time to the alignment conveyor 206.

In feed-conveyor may have one or more stacks of blanks arranged longitudinally on a conveyor belt 214 so that they can in turn be fed onto alignment conveyor 206. A sensor may be provided in the vicinity of conveyor 204 to monitor the number of stacks waiting on conveyor 204 and that sensor may be operable to send a warning signal to PLC 132 that can alert an operator that the magazine is low and needs to be replenished (e.g. because the stack on the alignment conveyor being processed by erector head 120 is the only one left). The sensor may be a part number 42GRP-9000-QD made by Allen Bradley.

Of particular note, a plurality of stacks of blanks might be provided on conveyor 204. Each stack may be included with some kind of information indicator that can be read by an information reader such as electronic or an optical reading device. For example, a bar code may be provided on a stack of blanks such as on the top or bottom blank of the stack. The bar code may be read by a suitably positioned bar code reader. The bar code reader may be in communication with PLC 132. The bar code may provide information indicative of a characteristic of the blanks in the stack. For example, the bar code may identify the size and/or type of blank in a particular stack. Other information indicators may be used such as for example RFID tags/chips and RFID readers. The information can then be automatically provided by the information reader to PLC 132 which can determine whether the current configuration of system 100 can handle the processing the particular type/size of blanks without having to make manual adjustments to any of the components. It is contemplated that within a certain range of types/sizes of blanks, system 100 may be able to handle the processing of different types/sizes of blanks without manual adjustment of any components of system 100. The bar code/RFID tag may provide the information about the dimensions of the blank as discussed above and then PLC 132 can determine adjustments, if any that need to be made to (a) the erector device operation; (b) the magazine and the tamping apparatuses in the magazine; (c) to provide a suitable path for the movement of the movement sub-system to provide for suitable pick up of a blank from the magazine and suitable handling by the erector device and the folding and sealing apparatus; and (d) adjustment of at least some of the components of the folding and sealing apparatus to be able to process a particular blank or a particular stack of blanks. The result is that system 100 may be able to process automatically, at least some different types/sizes/configurations of blanks to form different cartons, without having to make manual operator adjustments to any components of system 100.

Conveyor 204 may include a series of transversely and horizontally oriented rollers 210 mounted to the lower portion of a magazine frame 202 for free rotation. Rollers 210 may allow for generally horizontal longitudinal downstream movement of the stack towards conveyor 206. A conveyor belt 214 may be provided that may be driven by a suitable motor such as a DC motor or a variable frequency drive motor 291 (see FIG. 1b). Motor 291 may be DC motor and may be controlled through a DC motor drive (all sold by Oriental under model AXH-5100-KC-30) by PLC 132.

Conveyor belt 214 may have an upper belt portion supported on the rollers 210. Once PLC 132 is given an instruction (such as by a human operator through HMI module 133), upper belt portion of belt 214 may move longitudinally downstream towards conveyor 206. In this way belt 214 can move a stack of blanks 111 longitudinally downstream, with the stack of blanks at its outer transverse portions also being supported on the rollers 210. PLC 132 can control motor 291 through the motor drive and thus conveyor 204 can be operated to move and transfer the stack towards and for transfer to the alignment conveyor 206.

Stack alignment conveyor 206 may also include a series of transversely oriented rollers 208 that are mounted for free rotating movement to a lower portion of the magazine frame 202. A conveyor belt 216 may be driven by a motor 292 that may be like motor 291 and with a corresponding motor drive. Motor 292 may also be controlled by PLC 132. Belt 216 may be provided with an upper belt portion supported on rollers 208 and upon which the stack of blanks 111 may be supported. Conveyor belt 214 may be operated to move the stack of blanks 111 further longitudinally until the front face of the stack abuts with a generally planar, vertically and transversely oriented inward facing surface of front end wall 218.

Conveyor belt 214 of conveyor 204 and conveyor belt 216 of conveyor 206 may be made from any suitable material such as for example Ropanyl.

A sensor 242, such as an electronic eye model 42KL-D1LB-F4 made by ALLEN BRADLEY, may be located within the horizontal gap between belt 214 and belt 216. Sensor 242 may be positioned and operable to detect the presence of the front edge of a stack of blanks as the stack of blanks begins to move over the gap between conveyor belt 214 and conveyor belt 216. Upon detecting the front edge, sensor 242 may send a digital signal to PLC 132 (see FIG. 1b) signalling that a stack has moved to a position where conveyor 206 can start to move. PLC 132 can then cause the motor 292 for conveyor 206 to be activated such that the top portion of belt 216 starts to move the stack downstream. In this way, there can be a "hand-off" of the stack of blanks from in-feed conveyor 204 to alignment conveyor 206.

Once the rear edge of the stack of blanks 111 has passed the sensor 242 a signal may be sent to PLC 132 (see FIG. 1b) which can then respond by sending a signal to shut down the motor 291 driving belt 214 of conveyor 204. Conveyor 204 is then in a condition ready to be loaded with another stack of blanks 111. Meanwhile conveyor 216 can continue to operate as it moves the stack of blanks 111 to the pick up position.

The presence of a stack of blanks 111 at the pick up location may be detected by a sensor 240 that may be the same type of sensor as sensor 242. The sensor 240 may detect the presence of the front edge of a stack of blanks at the pick up position and may send a digital signal to PLC 132 signalling that a stack is at the pick up position. At the pick up position, the stack of blanks may be "squared up" and thereafter, once properly aligned, single carton blanks 111 may be retrieved in series from the stack of blanks 111 by the alternate engagement of the erector heads 120a, 120b with the upper most blank in the stack.

The magazine 110 may be configured and operable to enable the stack of blanks 111 to be properly positioned and oriented in a pick up position for proper engagement by one of the erector heads 120a, 120b. During movement of the stack of blanks 111 longitudinally by conveyors 204 and 206, the left hand side of the stack of blanks may be supported and guided by a left hand side wall 200. Side wall 200 may be mounted to a lower portion of lower frame 202 and side wall 200 may be oriented generally vertically and may extend longitudinally for substantially the full lengths of conveyors 204 and 206.

The right hand side of the magazine 110 adjacent conveyor 204 may be left generally open; however to the right hand side of conveyor 206 there may be a right hand side guide wall 201.

Possible mounting arrangements for side walls 200 and 201 are illustrated in further detail in FIGS. 6A-6D. In this regard, lower frame portion 202 may include bottom support plates 251, 255, 259 and 263 that are supported on the ground terrain/floor with these plates being spaced from each other and oriented in a generally transverse, parallel relationship to each other. Each of support plates 251, 255, 259 and 263 has mounted to an upper surface thereof, one of the tracks 253, 257, 261 and 265. Side wall 200 may be supported by connector blocks 267 that fit onto and are capable of sliding laterally on and in relation to tracks 253 and 261. Similarly side wall 201 may be supported by connector blocks 269 that fit onto and are capable of sliding laterally on and in relation to tracks 255 and 263.

A drive mechanism may be provided to drive each of side walls 200 and 201 on their respective tracks. For side wall 200, a drive mechanism that is in electronic communication with PLC 132 can be provided. By way of example, a servo motor 258 with gear head may be provided and be in electronic communication with PLC 132 through a servo drive (as per FIG. 1b). Examples that could be used are servo motor MPL-B1530U-VJ42AA made by ALLEN BRADLEY, in combination with servo drive 2094-BC01-MP5-S also made by ALLEN BRADLEY and gear head AE050-010 FOR MPL-A1520 made by Apex.

A lead screw rod 262 may be inter-connected to servo motor/gear head 258. Lead screw rod 262 may pass through a nut such as a brass nut 264. Nut may be fixedly secured to a plate 293. Plate 293 may be interconnected to spaced, generally vertically oriented bar members 294. Bar members 294 may be interconnected to support frame (not shown) forming part of side wall 200. By activating servo motor/gear head 258, the rotation of the servo may rotate the screw rod 262. As rod 262 passes through nut 264, the nut is moved laterally either inwards or outwards, thereby causing wall 200 to slide on tracks 252, 261 inwards or outwards depending upon the direction of rotation of screw rod 262. An encoder may be provided within or in association with servo drive motor 258 and the encoder may rotate in relation to the rotation of the respective drive shaft of the servo drive. The encoder may be in communication with, and provide signals to the servo drive which can then pass on the information to PLC 132. Thus, PLC 132 may be able to determine the longitudinal position of the screw rod 262 in real time and thus the transverse position of side wall 200 and can operate the servo drive 258 to adjust the position of the side wall 200. The particular type of encoder that may be used is known as an "absolute" encoder. Thus once the encoder is calibrated so that a position of the screw rod 262 is "zeroed", then even if power is lost to system 100, the encoder can maintain its zero position calibration. However, as side wall 200 is not moved during processing of a blank 111, the mechanism for adjusting the transverse position of side wall 200 may alternatively be a simple hand crank mechanism instead of a servo drive motor in communication with PLC 132. It should be noted that a proper position for left side wall 200 during the processing of a blank stack is that shown in FIG. 7, with the wall 200 in abutment with the left side edges of the blanks in each stack. The proper positioning of wall 200 will ensure that the datum line W1 when the blanks are flattened is properly transversely aligned to be picked up by erector heads 120a, 120b and moved through folding and sealing apparatus 130, as described hereinafter in detail to achieve proper folding and sealing of the carton blank.

Similarly, for side wall 201, a drive mechanism 260 (that may be the same types of components that used for side wall 200) that is also in electronic communication with PLC 132 may be provided. By way of example, a servo motor with gear head designated 260 may be provided and also be in electronic communication through a servo drive with PLC 132. A lead screw rod 266 may be inter-connected to servo motor/gear head 266 (which may be like servo/gear head 268). Lead screw rod 266 may pass through a nut such as a brass nut (not visible in Figures) like nut 264. The nut may be fixedly secured to a plate 295. Plate 295 may be interconnected to spaced, generally vertically oriented bar members 296. Bar members 296 may be interconnected to side wall support frame generally designated 271 (see FIG. 6c) that forms part of side wall 201. By activating servo motor/gear head 260, the rotation of the servo may rotate the screw rod 266. As rod 266 passes through the nut, the nut is moved laterally either inwards or outwards, thereby causing wall 201 to slide on tracks 257, 265. An encoder may be provided within or in association with servo drive motor 260 and the encoder may rotate in relation to the rotation of the respective drive shaft of the servo motor. The encoder may be in communication with a servo drive and thus provide signals to PLC 132. Thus, PLC 132 may be able in real time to determine the longitudinal position of the screw rod 266 and thus the transverse position of side wall 201. Thus PLC 132 can operate the servo motor 260 to adjust the position of the side wall 201. An "absolute" encoder may also be used in this application.

During operation of system 100 in erecting a carton, side wall 200 may remain stationary, but side wall 201 may be moved laterally as part of the blank stack alignment procedure to provide for generally longitudinal alignment of the side edges of blanks 111 in the stack as they are held between side walls 200 and 201.

A lateral tamping apparatus may be secured to side wall 201 and may be used to affect lateral alignment of the front and rear side edges of the blanks 111 in the stack (i.e. the front and rear edges of the blanks in the stack are generally aligned with a vertical axis such as axis Z in FIG. 7). A lateral tamping apparatus generally designated 275 may include a horizontally and longitudinally oriented support plate 270 that may be attached at either end to vertical members of side wall support frame 271. Attached to an outer surface of plate 270 may be a track 272. Secured to track 272 for sliding longitudinal movement along track 272 may be a slider block 273. Attached to slider block 273 may be a pair of upstanding support plates which at their upper ends are secured to a double acting, pneumatic actuator 276 such as the model DFM-25-80-P-A-KF Part #170927 made by Festo. Actuator 276 may have one or more piston arms (not visible in FIG. 6b or 6c because they are shown retracted). Piston arms of actuator 276 may reciprocate between retracted and extended positions—back and forwards in a longitudinal direction. With reference to FIG. 1b, a pneumatic actuator may be supplied with pressurized air communicated through electronic solenoid valves for causing the piston arms to retract and extend. The solenoid valves may be a model CPE14-M1Bh-5J-1/8 made by Festo and may be controlled by PLC 132. Alternatively, a linear servo drive system—similar to one described in connection with the movement of side walls 200 and 201—may be provided for this actuator. Such a servo drive system could be controlled by PLC 132. PLC 132 could make adjustments to the movement of both side walls 200 and 201 as well as this actuator for the lateral tamping apparatus, such that magazine 110 could be automatically adjusted to process a wide range of sizes of blanks.

It should be noted that during the operation of system 100 in erecting cartons, the slider block 273 will not move along track 272. Slider block 273, and the components attached directly or indirectly thereto including actuator 276, will not move longitudinally during operation. However the longitudinal position of slider block 273 can be adjusted during the set-up of system 100 when processing particular sizes of carton blanks.

Attached to the end of the piston arms of actuator 276 may be a transverse plate 278 that may pass through a longitudinally extending slot 279 through side wall 201. The distal end of plate 278 from piston arms is attached to a vertical tamper plate 280 that is positioned transversely inwards from the inner surface of side wall 201. Retraction of the piston arms of actuator 276 can cause plate 278 to engage the rear side edges of the blanks 111 in the stack and as the front edges of those blanks are pushed up against the inner surface of the front wall 218, the front and rear edges of the blanks can be laterally aligned. While a pneumatic actuator 276 is illustrated, other alignment devices could be used. For example, a linear servo drive in communication with PLC 132 might be employed, that would perform the same function but it could electronically position the vertical tamping plate 280, and the operator may not have to adjust it manually during system set up.

By operation of PLC 132, suitable adjustment of right side wall 201 and tamper plate 280, the blanks 111 can be moved to precisely the known pick up location and their orientation may be "squared-up" blanks 111 in a stack of blanks that is held against front wall 218, and may thus ensure that the blanks 111 are in the proper location for being engaged by the erector heads 120a, 120b.

In particular, once the stack of blanks 111 have generally reached the pick up location, PLC 132 can send a signal to drive mechanism 260 to cause the drive mechanism 260 to cause side wall 201 to move laterally inwards towards the side of stack of blanks 111. PLC 132 will cause the drive mechanism 260 to move a sufficient distance to cause the edges of the blanks 111 to become in contact along their length with inner surface of longitudinally aligned inner surface of side wall 201. However, PLC 132 will not cause side wall 201 to be moved to such an extent that it creates a force on the stack of blanks such that causes the blanks to buckle/be damaged if they are compressed to a significant extent between side walls 200 and 201. PLC 132 may be able to determine how much to move side wall 201 towards side wall 200 by virtue of the carton size dimensions that have been inputted into the PLC, including dimension H (see FIG. 10A). The amount of slight compression can be fine tuned such as by trial and error for different sized carton. It should be noted that for many sized cartons, the manufacturers comply with industry standard carton sizes.

Once the longitudinal alignment has been completed by side wall 201, PLC 132 can cause actuator 276 to be activated to cause the vertical plate 280 to engage the rear edges of the blanks 111 in the stack. PLC 132 may cause the drive mechanism 260 to move a sufficient distance to cause the rear edges of the blanks 111 to come in contact along their length with inner surface of laterally aligned inner surface of plate 280. However, the amount of retraction of the piston arms will not cause side wall vertical plate 280 to be moved to such an extent that it creates a force on the stack of blanks that would cause the blanks to buckle/be damaged if they are compressed too much between plate 280 and front wall 218. The appropriate manual positioning and securement (such as by tightening screws appropriately positioned through block 273, can secure actuator 276 at an appropriate longitudinal position on rail 270.

Thus, by way of review: The tamping actuator 276 may ride on the side guide wall 200. For a carton of a particular size/shape, the tamping actuator 276 can be adjusted manually in a fore-aft direction so that when the actuator 276 is retracted, the vertical tamper bar 280 is in the right position to push the blanks up against the front wall 218 (without squeezing them).

The sliding assembly of components that includes actuator 276 may also have a pointer or indicator, and on the stationary part of the magazine there may be a numeric scale to assist in rapidly manually adjusting the actuator to the correct position on rail 270 for a known case size.

In review the tamping sequence for ensuring the blanks are properly squared up at the pick up location steps include the following:

1. The right-hand-side magazine side guide wall 201 under control of PLC 132 expands wide enough to allow the stack of blanks to enter on alignment conveyor 206, even if the stack is misaligned and/or the blanks in the stack are not perfectly square with each other and in relation to the X-Y axes.

2. The belt 216 advances the stack of blanks 111 towards the front stop datum and may abut with front wall 218

3. The tamping actuator 276 is extended, and then the side guide wall 201 may contract to make contact with the side of the case stack and press the side wall 201 against the left hand side guide wall 200. This aligns the cases so the side edges of blanks are aligned with each other and the longitudinal side wall of the walls 200 and 201.

4. The tamping actuator 276 may retract, and the tamping bar 280 presses the stack forward, thereby aligning the blanks in the stack so that their front and rear edges are vertically aligned with each other and with the inner face of the bar 280 and the inside surface of front wall 218.

5. The blanks are then properly positioned so that the erector heads can begin picking up blanks from the stack.

Turning now to other components of system 100, to retrieve blanks from the magazine 110, at least a first engagement device may be provided to engage a panel of a blank 111 and thus be able to hold and move the blank. Where the blank is a tubular blank, system 100 may be provided with a first engagement device for engaging one panel (e.g. Panel A) of a blank and a second engagement device for engaging a second panel (e.g. Panel B) of the blank. 111. The first and second engagement devices may comprise one or more suction cups providing a suction force onto a panel acting generally normal to the surface of the panel that is engaged, as described further below. Other types of suitable engagement devices might be employed. The first and second engagement devices may be rotatable relative to each other so that the first panel can be rotated relative to the second panel. The first and second engagement devices may be mounted to a single common erector head.

With reference to FIG. 7, system 100 may be provided with a movement sub-system that may be a pair of movement apparatuses each supporting and moving one of erector heads 120*a*, 120*b*. Each erector head 120*a*, 120*b* may have a dedicated, independently driven and controlled movement apparatus 115*a*, 115*b*. Thus erector head 120*a* may be supported and moved by movement apparatus 115*a*. Similarly erector head 120*b* may be supported and moved by movement apparatus 115*b*. Movement apparatus 115*a* may be constructed in a manner that is substantially identical to movement apparatus 115*b* but may be configured as mirror image of movement apparatus 115*b*. In this way, movement apparatus 115*a* may support erector head 120*a* from a right hand side and movement apparatus 115*b* may support erector head 120*b* from a left hand side, in such a manner that the erector heads 120*a*, 120*b* may both be moved along the same longitudinal and vertical path. The common path of erector heads 120*a*, 120*b*, may be a cyclical path that lies substantially in or is parallel to a plane that it parallel both vertical axis Z and longitudinal axis Y in FIG. 7. Thus movement of the erector heads 120*a*, 120*b* may only be in vertical Z and longitudinal Y directions (i.e. directions parallel to axes Z and Y in FIG. 7), and there may be no substantial movement in a lateral Z direction (i.e. a direction parallel to axis X in FIG. 7). If the movement of the erector heads 120*a*, 120*b* is restricted to only Z and Y directions, a moving apparatus for each can be constructed that is relatively less complex than if movement in all three directions is required.

The movement of heads 120*a*, 120*b* by movement apparatuses 115*a*, 115*b* respectively, may be synchronized such that they may travel along the same longitudinal and vertical path but they move out of phase with each other so that one erector head does not interfere with the other erector head, as will be described further below. Thus, the relative positions of the two erector heads 120*a*, 120*b* can be arranged so that the heads they do not collide or otherwise interfere with each other during operation of system 100.

Only the detailed construction of left side movement apparatus 115*b* will be described herein, it being understood that movement apparatus 115*a* may be constructed in a substantially identical manner as a mirror image of moving apparatus 115*b*. With particular reference to FIGS. 4, 5, 7, 8, 9 and 17, movement apparatus 115*b* may include a vertical movement device and a horizontal movement device. The vertical movement device may include a generally hollow vertically oriented support tube 169 that may be generally rectangular in cross section. Support tube 169 may be formed from a unitary tubular piece of material or may be formed into opposed, vertically extending and oriented, surfaces 164, 165, 166 and 168 that may be inter-connected together using conventional mechanisms such as bolts, welding etc. Support tube 169 may be secured to a horizontally extending brace plate 182. Brace plate 182 may be interconnected to a vertically extending brace plate 180. The bottom portion of brace plate 180 may be interconnected by way of a series of angled plates generally referred to as 183, to the lower end of support tube 169.

At the upper end of support tube 169 may be mounted a freely rotatable pulley wheel 155*b*. At the bottom end of plates 164, 166, erector head 120*b* may be fixedly attached to support tube 169 by means of a horizontally extending mounting plate that is connected to support tube 169, which engages with a pair of spaced mounting block 190*a*, 190*b* that may be joined with bolts through bolt holes 191*a*, 191*b* in blocks 190*a*, 190*b* that also pass through the mounting plate at the bottom of support tube 169. Thus, as erector head 120*b* is interconnected to support tube 169, erector head 120*b* will move in space with support tube 169.

To support the support tube 169 and erector head 120*b* that is connected thereto, and facilitate movement of the support tube 169 and erector head 120*b* in horizontal motion, a horizontal movement device may be provided and may include a slide block 158 that may use a rail system to move horizontally and may be provided with a pair of spaced, longitudinally and horizontally extending short inner blocks, each one fitting on one longitudinally extending rail 160, 162 that holds the blocks securely but allows blocks to slide horizontally relative to the rails. An example of a suitable rails system is the Bosch Rexroth ball rail system in which the rails are made from steel and the blocks have a race of ceramic balls inside allowing the block to slide on the rails. Rails 160, 162 are generally oriented horizontally and may be attached to the frame 109. Slide block 158 may be mounted to rails 160 or 162 for horizontal sliding movement along the rails. Secured to the front face of slider block 158 are four freely rotatable pulley wheels 155*a*, 155*c*, 155*d* and 155*f* which have drive belt 153 pass around them as described below. Slide block 158 may also use a rail system to allow support tube 169 to be connected to it and also move vertically relative to slide block 158. Accordingly, extending vertically along a back surface of tube 169 may be a vertically and longitudinally extending rail. Support block may have a runner block interconnected to the vertical rail on support tube 169. Thus support tube 169 can slide horizontally relative to slide block 169. Again, a suitable rail system is the Bosch Rexroth ball rail system referenced above.

A drive apparatus may also be provided to drive the horizontal movement device and the vertical movement device. For example, the drive apparatus may include a pair of drive motors interconnected to a drive belt, with the drive belt being inter-connected to the horizontal and vertical movement devices. For example, the drive apparatus may include a left belt drive motor 150 (which may be a servo motor such as the model MPL-B330P-MJ24AA made by Allen Bradley) may be mounted to a longitudinally extending beam member 108 that is connected to frame 109 (see FIGS. 1*a*, 2 and 3). Servo drive 150 may have a drive wheel 152. Similarly, a right belt drive 154 (which may be a servo motor like servo drive 150) may also be mounted to beam member 108 connected to frame 109. Servo drive 154 may have a drive wheel 156. Servo motor 152 may be longitudinally spaced from, and may be horizontally aligned with, servo motor 154. Both servo motors 150 and 154 can be driven in both directions at varying speeds, such rotation being controllable through servo drives by PLC 132 (see FIG. 1*b*). Both servo motors 150 and 154 may be provided with two separate ports 364*a*, 364*b*. One for the ports may be for supplying a power line and the other for a communication line to facilitate the communication with the servo drive and PLC 132. It should be noted that all of the servo motors described in this document may be similarly equipped. Servo motors 150, 154 may also have a third input which may provide input for an electric braking mechanism.

Apparatus 115a may also include a continuous drive belt 153 that may for example be made from urethane with steel wires running through it Belt 153 may be engaged and may be driven by motors 150 and 154 under control of PLC 132 as it may independently control through their respective servo drives, the operation of both servo motor 152 and servo motor 154. Belt 153 extends continuously from a start location at the bottom left side of support tube 169, where belt is fixedly attached to a belt block 159a that is attached to support tube 169. From there belt extends upwardly on a first portion 153g to block pulley 155f, around the upper side of block pulley 155f. From block pulley 155f, belt 153 extends horizontally along a second portion 153h to servo drive wheel 152. The belt then passes around and is engaged by servo drive wheel 152, on a third portion 153a on the underside of pulley 155a, upwards along a fourth portion 153b to pulley 155b. From there belt extends around pulley 155b, downwards on a fifth portion 153c to block pulley 155c, around block pulley 155c along a sixth portion 153d to servo drive wheel 156. After passing around and being engaged by servo drive wheel 156, belt 153 extends continuously from around servo drive wheel 156, on to a seventh portion 153e to the upper side of block pulley 155d. From block pulley 155d, belt 153 then extends vertically downwards along an eighth portion 153f to belt block 159b where the belt terminates. Belt 153 vertically supports the support tube 169 both at the bottom as it is interconnected to support tube 169 with blocks 159a, 159b, and at the top of support tube 169 where it passes 155b. Thus belt 153 is indirectly also vertically supporting erector head 120b. Furthermore, by adjusting the relative rotations of servo drive wheels 152 and 156, the relative lengths of all belt portions can be adjusted through the operation of the servo motors 150 and 154. Thus, the relative vertical position of support tube 169 relative to slide block 158 can be adjusted. Additionally, by adjusting the relative rotations of servo drive wheels 152 and 156, through the operation of the servo motors 150 and 154 the horizontal position of slide block 158 on rails 160, 162 can be adjusted thus altering the horizontal position of support tube 169 and erector head 120b. It will thus be appreciated that by adjusting the direction and speeds of rotation of drive wheels 152, 156 relative to each other the support tube 169 can be moved vertically and/or horizontally in space within the physical constraints imposed by among other things the position of the servo drive wheels 152 and 156, the length of the belt 153, and the length of support tube 169. The following will be appreciated with reference to FIG. 17 in particular:

If wheels 152 and 156 both remain stationary then the position of support tube 169 will not be altered;
If wheels 152 and 156 both rotate in the same clockwise direction and at the same speed relative to each other, then support tube 169 (and thus erector head 120b) will move horizontally from right to left;
If wheels 152 and 156 both rotate in the same counter-clockwise direction and at the same speed relative to each other, then support tube 169 (and thus erector head 120b) will move horizontally from left to right;
If wheel 152 rotates counter-clockwise, and wheel 156 rotates in opposite clockwise rotational directions, but both wheels rotate at the same rotational speed relative to each other, then support tube 169 (and thus erector head 120b) will move straight vertically downward;
If wheel 152 rotates clockwise, and wheel 156 rotates in opposite counter-clockwise rotational directions, but both wheels rotate at the same rotational speed relative to each other, then plates 164, 166 will move straight vertically upwards.

It will be appreciated that if the speeds and directions of the two servo motors are varied in different manner, then the motion of the support tube 169 (and thus erector head 120b) can be created that has both vertical upwards or downwards component as well as a horizontally right to left, or left to right movement. Thus any desired path within these two degrees of freedom (vertical and horizontal) can be created for support tube 169 (such as a path having curved path portions) (and thus erector head 120b). Thus by controlling the rotational direction and speed of the motors 150, 154 independently of each other, PLC 132 can cause support tube 169 (and thus erector head 120b) to move along any path, within the physical constraints imposed by the spacing of the drive wheels 152, 156 and pulley wheel 155b, and the bottom of support tube 169 in vertical and horizontal directions to allow for the end erector 120b to carry a carton blank 111 through the various processing steps performed by system 100.

It will also be appreciated that by providing two opposed moving apparatuses 115a, 115b, the movements of each of the end effectors 120 can be co-ordinated and synchronized so that even though they move along the same path, the movement of the end effectors are out of phase (for example by 180 degrees).

Thus the movements of one end effector will not interfere with the movement of the other. An encoder may be provided for each of the servo drive motors 150 and 154 and the encoders may rotate in relation to the rotation of the respective drive wheels 152, 156. The encoders may be in communication with, and provide signals through the servo drives to PLC 132. Thus PLC 132 can in real time know/determine/monitor the position of the belt 153 in space and thus will determine and know the position of the erector head 120b in space at any given time. The particular types of encoders that may be used are known as "absolute" encoders. Thus the system can be zeroed such that due to the calibration of both encoders of both servo drives 150 and 154, the zero-zero position of the erector head in both Z and Y directions is set within PLC 132. The zero-zero position can be set with the erector head at its most horizontally left and vertically raised position. PLC 132 can then substantially in real time, keep track of the position of the erector head 120b as it moves through the processing sequence for a blank 111.

PLC 132 and the encoders associated with the servo motors 150, 154 and their servo drives on each of apparatuses 115a, 115b may be capable of being able to be set at zero-zero positions for each of the two separate erector heads 120a, 120b. PLC 132 can then substantially in real time, keep track of the position of both the erector heads 120a, 120b as they both independently move through the processing sequence for a blank 111.

Also associated with moving apparatus 115b is a first, generally horizontally oriented caterpillar device 114 having an input end 114a and an output end 114b. A second, generally vertically oriented caterpillar device 118 is also provided and has an input end 118a, and an output end 118b. Caterpillars 114 and 118 may have a hollow cavity extending along their length. Within the cavities of caterpillars 114, 118 hoses/wires carrying pressurized air/vacuum and electrical/communication wires can be housed. Caterpillar 114 allows such hoses and wires to move longitudinally as the support tube 169 and erector head 120*b* are moved longitudinally. Caterpillar 118 allows such hoses and wires to move vertically as the support tube 169 and erector head 120*b* are moved vertically. The hoses and wires may extend from external sources to enter at an inlet 114*a* of caterpillar 114 and emerge at an outlet 114*b*. Once leaving outlet 114*b*, the hoses and wires may extend to enter at an inlet 118*a* of caterpillar 118 and emerge at an outlet 118*b*. These hoses and wires may then pass from outlet 118*b* into the input hoses 190 and 191 on erector head 120*b* (see FIG. 30). In this way both pressurized air/vacuum and/or electrical communication wires may be brought form locations external to the frame 109 onto the moving erector head 120*b*. An example of suitable caterpillar devices that could be employed is the E-Chain Cable Carrier System model #240-03-055-0 made by Ignus Inc. It should be noted that electrical communication between the PLC 132 and the erector head 120*b* could in other embodiments be accomplished using wireless technologies that are commercially available.

Turning now to FIGS. 30 to 33, left hand side erector head 120*b* is shown in isolation. Right hand side erector head 120*a* may be constructed in the same manner as erector head 120*b*, but may be supported from the right hand side moving apparatus 115*a*, in contrast to erector head 120*b* which may be supported from the left hand side by left hand moving apparatus 115*b*.

Erector head 120*b* may have a body generally designated as 300 that may comprise of a number of components. Many of the components of erector head 120*b* may be made from a strong material such as a metal (e.g. aluminium, steel, etc.), a hard and strong plastic such as or other suitable materials including composite materials.

Erector head 120*b* may be generally configured to handle a range of sizes of carton blanks 111 that can be formed into a carton. Erector head may be configured by providing easy attachment to support tube 169 using mounting blocks 190*a*, 190*b* and bolts etc. to permit for the easy interchange of erector heads 120 so that the system can in some circumstances, be readily adapted to forming differently sized/shaped cartons from differently configured blanks.

In one embodiment, erector head 120*b* may include a rotatable paddle 310 connected to a distal end portion 314*a* of a paddle arm 314. Paddle arm 314 may have an end portion 314*b* opposite to distal end portion 314*a*, that is formed with a circular opening that facilitates arm 314 being connected to a shaft 316. Paddle 310 can rotate with shaft 316 about the longitudinal axis of shaft 316. Shaft 316 may be connected to a rotary actuator 399 such as a double acting rotary pneumatic actuator manufactured by Festo under engineering part #DSM-32-270-CC-FW-A-B. Actuator 399 can cause rotation of shaft 316 clockwise and counter-clockwise around its axis of up to 270 degrees. Rotary actuator 399 may be supplied with pressurized air supplied by hoses (not shown) connected to ports 395 and 397. Those hoses may also be connected to a solenoid valve device 340 which may be controlled by PLC 132. In this way the rotation clockwise and counter-clockwise of paddle 310 may be controlled by PLC 132.

Also formed as part of body 300 of erector head 120*b* is a bottom suction plate 327 that is generally shaped in a square cross configuration to provide flanged openings for such cups. In each of the open flanges of plate 327 is positioned a suction cup 312. It should be noted that while many types of suction cups may be employed on the erector head, a preferred type of suction cup is the model B40.10.04AB made by Piab. Two of the suction cups 312 are mounted to a generally longitudinally oriented support block 319*a* and the other two suction cups are mounted to a second generally longitudinally oriented support block 319*b*.

Support blocks 319*a* and 319*b* are generally oriented longitudinally in space apart, parallel relation to each other and each block 319*a*, 319*b* is joined to other body components of body 300. Blocks 319*a*, 319*b* each have open passageways that interconnect each suction cup 312 with an outlet from a vacuum generator 330. Vacuum generator 330 may be any suitable vacuum generator device such as for example the model VCH12-016C made by Pisco. Vacuum generators 330 each have an inlet interconnected to a hose (not shown) that can carry pressurized air to the vacuum generator. The vacuum generator converts the pressurized air supplied to the inlet port, into a vacuum at one of the outlet ports. That vacuum outlet port is interconnected through the passageway in blocks 319*a*, 319*b* to a suction cup 312 so that the suction cup can have a vacuum force. Interposed along the pressurized air channel running between each vacuum generator 330 and the source of pressurized air that may be an air compressor (see FIG. 1*b*), may be located a solenoid valve device 340 that may for example be a model CPE14-M1BH-5L-1/8 made by Festo. Valve device 340 may be in electronic communication with PLC 132 and be controlled by PLC 132. In this way PLC 132 can turn on and off the supply of vacuum force to each of the suction cups 312. To channel the compressed air appropriately, valves in valve device 340 can be driven between open and closed positions by solenoids responsive to signals from PLC 132. Electrical lines carrying signals to and from PLC 132 could also pass through hose 190 to operate the valve device 340.

Still with reference to FIGS. 30 to 33, downward extending end portions 323 of longitudinal support block 319 have openings 331 that are configured to receive a transversely mounted shaft 342. Shaft 342 may be mounted for rotation within openings 331. At one end of shaft 342 may be mounted a gear wheel device 360 that is configured to rotate with shaft 342. Gear wheel 360 may be interconnected to a drive wheel of a gear box 362 to form a mitre gear connection. Gear box 362 may be driven by a servo motor 364 mounted above gear box 362. Servo motor 364 may also be a model MPL-B1530U-VJ44AA made by ALLEN BRADLEY and gear box may be a model AER050-030 FOR MPL-A1520 AB SERVO MOTOR made by Apex.

Figure 30:
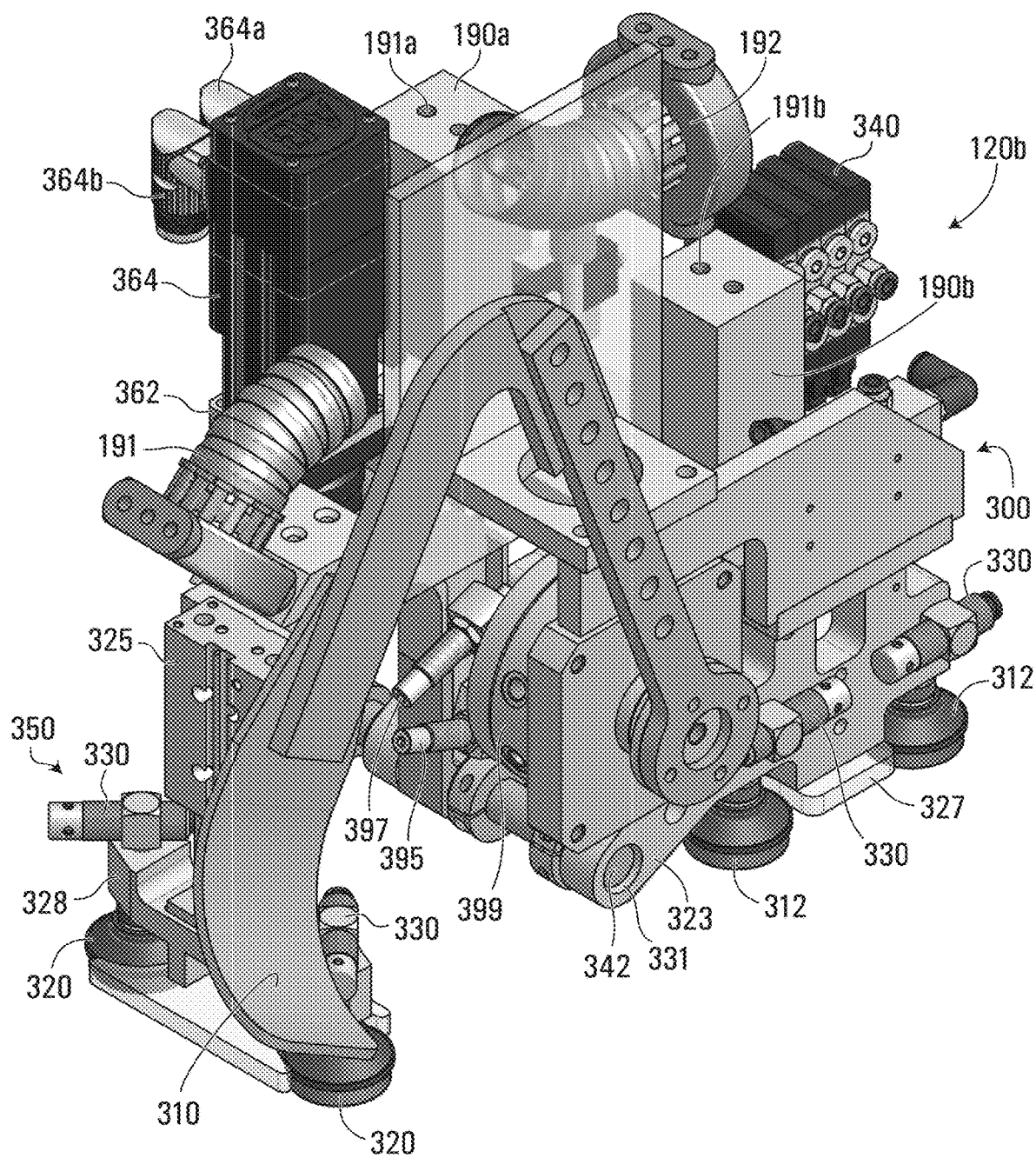
FIG. 30 shows a top right perspective view of a first embodiment of an erector head.
Figure 31:
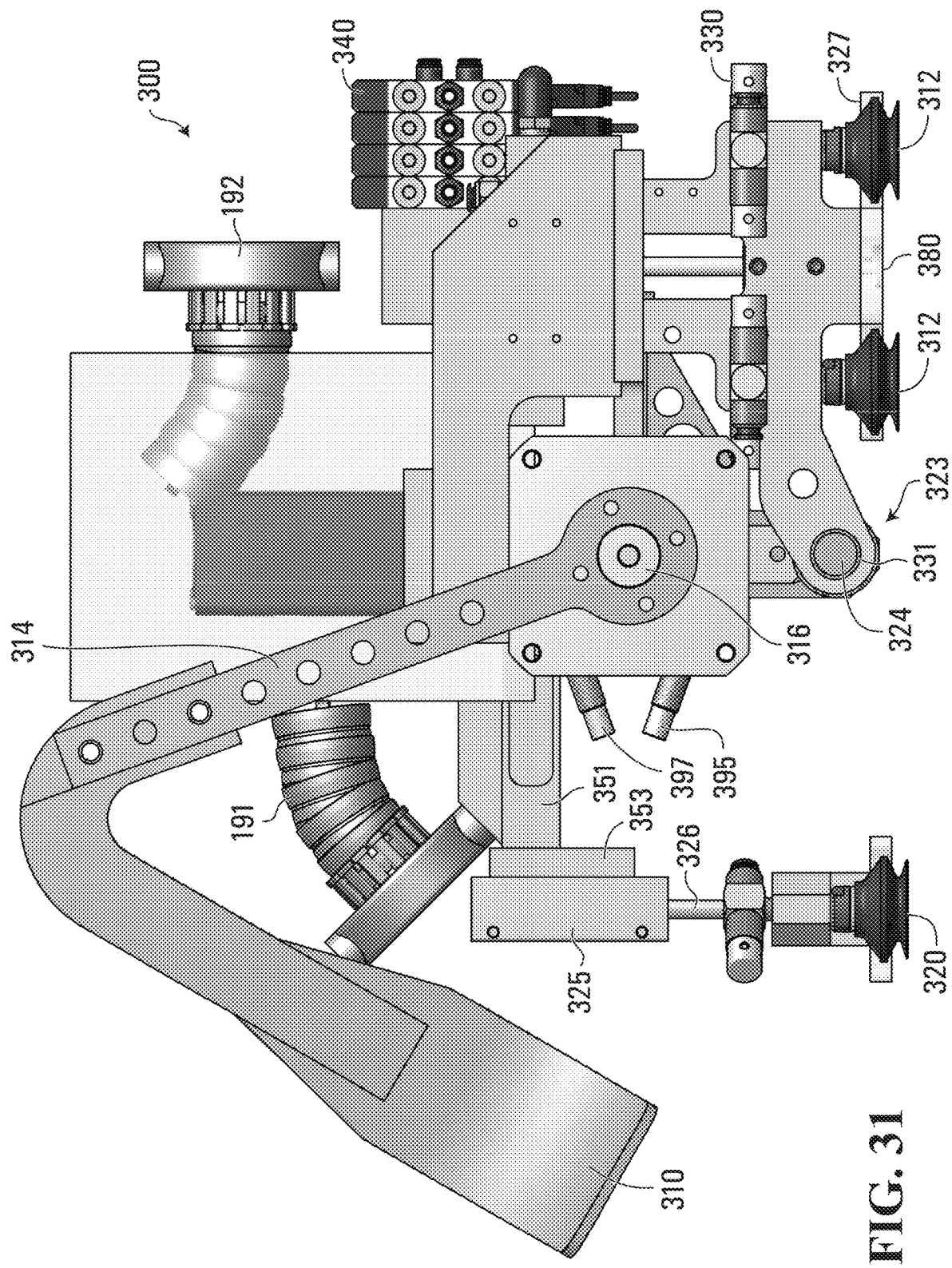
FIG. 31 is a side elevation view of the erector head of FIG. 30.
Figure 32:
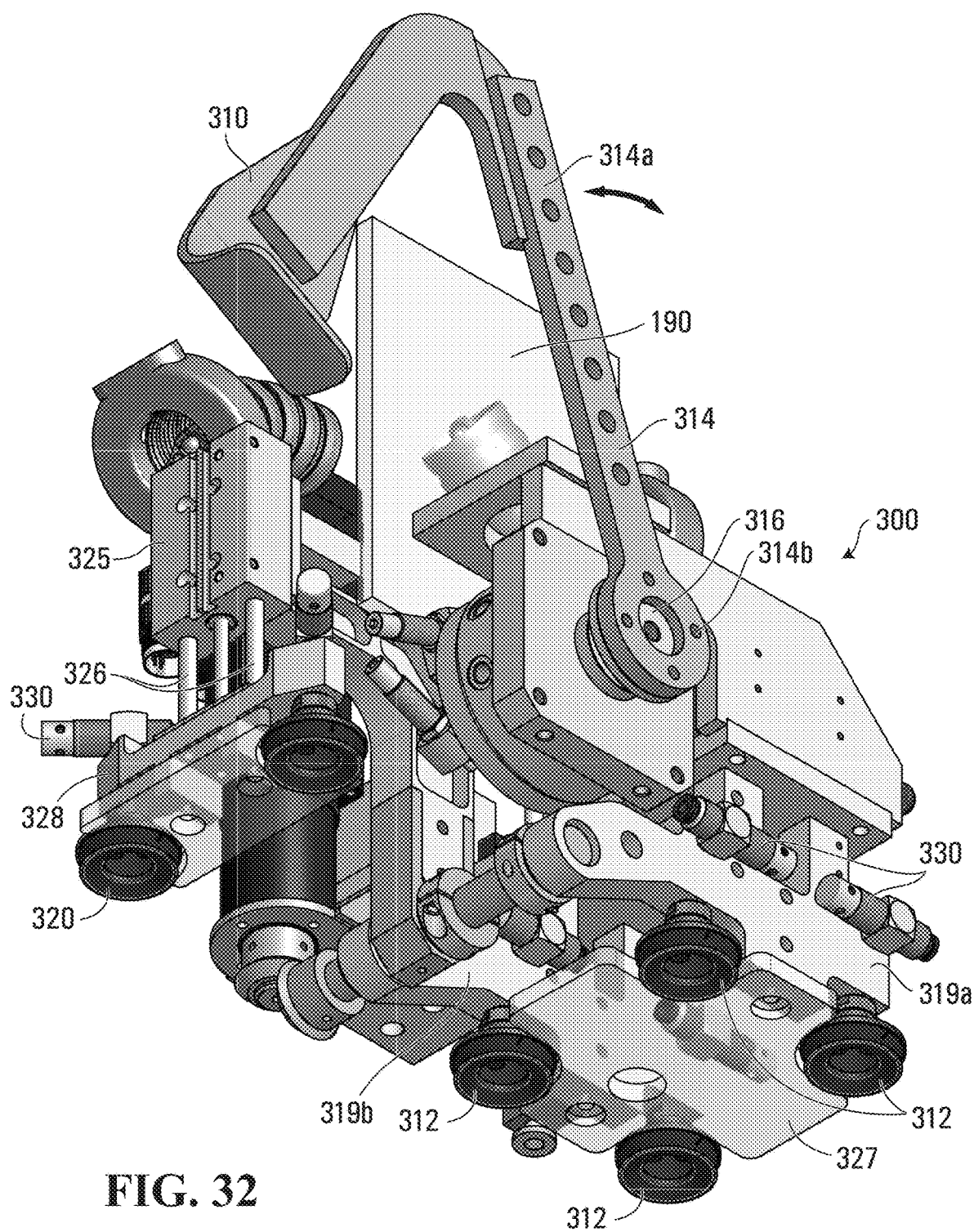
FIG. 32 is a bottom right perspective view of the erector head of FIG. 30.
Figure 33:
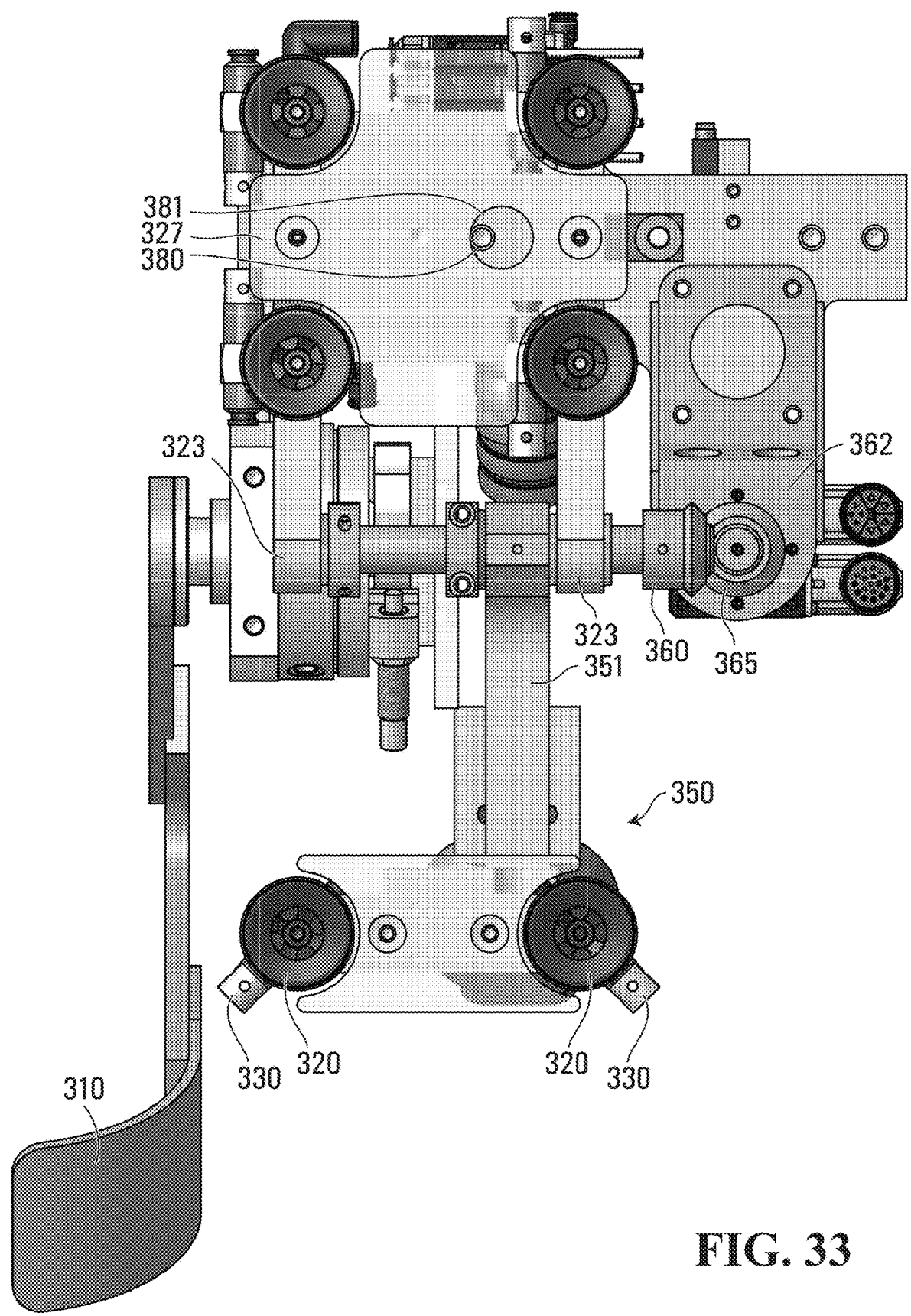
FIG. 33 is a bottom plan view of the erector head of FIG. 33.

In FIG. 30, servo motor 364 is shown with two separate ports 364*a*, 364*b*. One for the ports may be for supplying a power line and the other for a communication line to facilitate the communication with the servo drive and PLC 132. It should be noted that all of the servo motors described in this document may be similarly equipped. Servo motor 364 may, through connection with a servo drive (see FIG. 1*b*), be controlled by and be in communication with PLC 132. An encoder may be provided within or in association with servo motor 364 and the encoder may rotate in relation to the rotation of the respective drive shaft of the servo motor. The encoder may be in communication with, and provide signals to the servo drive and thus to PLC 132. PLC 132 may be able to determine the rotational position of the shaft 342. Thus, when appropriate signals are provided from PLC 132, so servo motor 364 can be operated and can cause shaft 342 to rotate in a particular desired direction at a particular desired rotational speed for a desired amount of time. Thus PLC 132 can control the rotational position of shaft 342.

Mounted to shaft 342 between end portions 323 of support blocks 319a, 319b is a rotator device generally designated 350. Rotator device 350 is fixedly attached to shaft 342 and will rotate with shaft 342. Rotator device 350 includes an arm 351 having one end fixedly mounted to shaft 342. The opposite end of arm 351 has a mounting block 353 attached to it.

Secured to mounting block 353 may be a pneumatic actuator 325 that may for example be a model DFM-12-80-P-A-KF, or part #170905 made by Festo. Actuator 325 may be supplied with pressurized air to activate the device that may be controlled by solenoid valve device 340 in the supply line. The solenoid valve 340 may be in communication with and be controlled by PLC 132 (see FIG. 1b). Actuator 325 may be actuated to reciprocate piston arms 326 between an extended position and a retracted position. PLC 132 may send a signal to valve device 340 to operate actuator 325 to extend piston arms 326 at a particular angular position of arm 351 and/or location of erector head 120b that is provided by the encoder associated with servo motor 364. Similarly, PLC 132 may send a signal to valve device 340 to activate arms 326 to be retracted at a particular shaft 342 angular position, and to retract piston arms 326 at a particular angular position, of arm 351 and/or a particular location of erector head 120b. PLC 342 may cause, acting through valve device 340, actuator 325 to be actuated at approximately the same time as the cups 320 have contacted the surface of downward facing panel D and/or when rotation of arm 351 is just about to begin or has just commenced. Piston arms 326 may be completely extended by the time arm 351 has rotated about 45 degrees.

Mounted to distal ends of piston arms 326 is a mounting block 328 which may be configured to support a pair of suction cups 320. Blocks 328 may have open passageways (not shown) that interconnect each suction cup 320 with an outlet from another vacuum generator 330. Vacuum generator 330 may be any suitable vacuum generator device such as for example the model VCH12-016C made by Pisco. As indicated above, vacuum generators 330 each have an inlet interconnected to a hose (not shown) that can carry pressurized air to the vacuum generator. Vacuum generators 330 convert the supplied pressurized air supplied the inlet port to a vacuum at one of the outlet ports. That vacuum port is interconnected through the passageway in block 328 to a suction cup 320 so that the suction cup can have a vacuum force. Interposed along the pressurized air channel running between each vacuum generator 330 associated with suction cups 320 and the source of pressurized air may be located the same valve device 340. Valve device 340 may be interconnected electronically (either with a wireless system or wired communication connection) to PLC 132 and be controlled by PLC 132. In this way PLC 132 can also turn on and off the supply of vacuum force to each of the suction cups 320.

With reference also to FIG. 11, suction cups 312 can be employed to engage and hold onto the top panel A of blank 111. Once a blank 111 is retrieved from the top of the stack of blanks, the rotator arm 351 can be rotated approximately 180 degrees such that suction cups 320 of rotator device 350 can engage and hold onto the underside panel D of blank 111. Once suction cups 320 have engaged panel D the arm 351 can be rotated 90 degrees backwards in the opposite rotational direction and the opposing vacuum forces created by suction cups 312 above and suction cups 320 below, cause the tubular blank 111 to be moved from a flattened configuration to an open configuration as panel D is rotated substantially 90 degrees relative to panel A. The air suction force that may be developed at the outer surfaces of suction cups 320 and 312 will be sufficient so that when activated they can engage and hold top panel A in a stationary position relative to erector head 120b and rotate panel D relative to panel A to open up the tubular blank to a generally rectangular configuration. The vacuum generated at suctions cups 320 and 312 can also be de-activated by PLC 132 at appropriate times by sending signals to valve device 340.

Each erector head 120a, 120b may be configured to be able to handle a wider range of different sized/dimensioned blanks 111 by providing for additional suction cups 320 and 312 positioned at different locations on the erector heads. Suction cups 320, 312 could each be "self-sealing" of "self-plugging" suction cups which if not engaging and sealing with a surface of a particular blank that is being processed, may automatically become blocked. This would allow the vacuum/suction forces to be maintained on other suctions cups that may have the source of pressurized air/vacuum interconnected thereto and which are engaging a panel of a blank 111. In this way, each erector head may be adapted to handle a wider variety of sized/dimensioned blanks and cartons/cases that can be formed therefrom.

The opening of the blank 111 may be assisted by the extension of piston arms 326 of actuator device 325 during rotation of the rotator arm 351. Preferably when rotator arm 351 has rotated somewhere in the range of about 30-60 degrees back to the 90 degree position, and preferably when it is at approximately 40-50 degrees, and most preferably when it is at about 45 degrees, then the piston arms 326 may be fully extended. This extension of arms 326 and thus of suction cups 320 in a generally tangential direction relative to the rotation of arm 351 compensates for the offset of the axis of rotation of the arm 351 compared to the axis of rotation of the blank that extends along the fold line between panels A and D. The effect of the extension of piston arms 326 once the arm is rotated such as to 90 degrees ensures that the panel D is also oriented at 90 degrees to panel A.

Once a blank 111 has been opened to the configuration shown in FIG. 11, then PLC 132 can send a signal to valve device 340 which causes rotary actuator 399 to rotate shaft 316 and thus rotate paddle 310. Paddle 310 can then engage trailing flap K of blank 111 and cause it to fold about its fold line where it joins to panel D. Thus flap K can be folded inwards towards the bottom opening of blank 111. Leading bottom flap J may also be folded about its fold line which joins it with panel B by engagement of the flap with upper and lower folding rails/ploughs 700, 701 that form part of folding and sealing apparatus 130. As the blank 111 held by erector head 120b is moved longitudinally downstream into the folding and sealing apparatus 130 the leading bottom flap J can be folded inwards so that both bottom flaps K and J are folded inwards to start the formation of the bottom of the carton.

Another feature of erector head 120b that can be noted is that a carton location sensor apparatus may be provided and may include a reciprocating sensor rod 380 which, when not in contact with a blank, extends downwards through an aperture 381 in plate 327, below the level of the plane of suction cups 312. When the erector head 120b is brought vertically downwards to retrieve a blank on a stack of blanks 111 in magazine 110, the erector head's movement just prior to suction cups 312 contacting with the upper surface of the blank will be generally vertically downwards. Prior to the suction cups 312 contacting the surface of a panel A of a blank, sensor rod 380 will engage the surface of panel A and cause sensor rod 380 (which may be resiliently displaced due to a spring mechanism biasing the rod downwards) to be pushed upwards. This movement upwards of sensor rod 380 relative to plate 327 will physically cause a sensor (not shown) to be activated and send a signal to PLC 132. The sensor may be an inductive proximity sensor. The metal cylinder fixed on the rod is sensed by the sensor's circuitry because it changes the inductance of the induction loop inside the sensor. The sensor may be 871FM-D8NP25-P3 made by ALLEN BRADLEY. PLC 132 may respond to that signal by causing servo drives 150 and 154 to slow down so that the final few centimeters (e.g. 3.5 cm) of movement downwards towards contact between cups 312 and the upper surface of panel A occurs at a much slower rate and also PLC knows how much further vertically downwards erector head 120*b* must be lowered to establish proper contact between suction cups 312 and panel A. It should also be that sensor rod 380 and associated sensor device can also be used to ensure that PLC 132 is aware of whether once a blank has been engaged in the magazine 110, it stays engaged with erector head 120 until the appropriate release location is reached, such as once erection of the carton has been completed.

The particular arrangement of suction cups and rotating paddle on erector heads 120 can be designed based upon the configuration of the carton blank and the particular panels and flaps that need to be rotated. It will also be appreciated that on erector head 120 that is illustrated, suction cups are used to apply a force to hold and/or rotate panels of a carton blank. However alternative engagement mechanisms to suction cups 312 and 320 could be employed.

With particular reference to Figures including FIGS. 1 to 15 and 17, system 100 may also include a folding and sealing apparatus 130. Rail and plough apparatus may be configured to cause all remaining flaps of a blank 111 to be appropriately folded and sealed to produce a carton configuration that is suitable for delivery to a discharge conveyor such as discharge conveyor 117. Apparatus 130 may include the following components: upper and lower folding rails/ploughs 700 and 701; a carton support plate 703; a discharge chute 750; an upper flap closing device 705; a lower flap closing device 707; a right hand compression device 706; and a left hand compression device 704; and a glue applicator 709 (see FIG. 1) having one or more nozzles positioned to apply adhesive to flaps such as flaps J and K. Each of the rails and actuator devices of apparatus 130 may be supported by rods or other members to interconnect the components to support frame 109.

Upper flap actuation device 705 may include a pneumatic actuator device 704*a* having its piston arms connected to an upper plough 708*a*. Similarly, lower flap actuation device 707 may include a pneumatic actuator device 704*b* having its piston arms connected to an upper plough 708*b*. Actuator devices 704*a*, 704*b* may be the model DFM-25-100-P-A-KF, part #170928 made by Festo.

Figure 26:
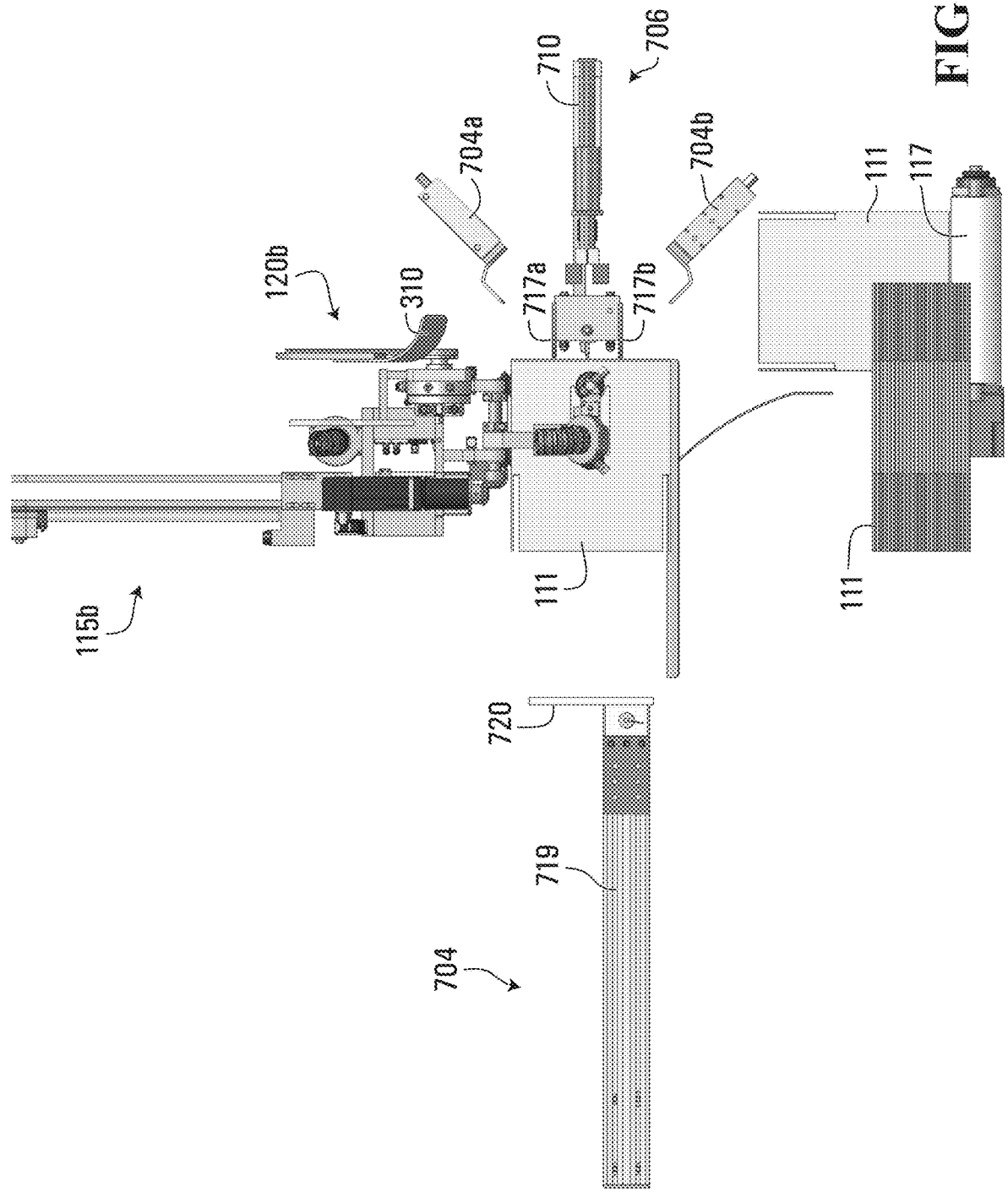
FIG. 26 is a rear elevation view of the components of FIG. 17.

Right hand compression device 706 may include a central pneumatic actuator 710 with telescoping extendible support rods 712 and 714 horizontally aligned and disposed on either side of actuator 710. Actuator 710 may be a model DNC-32-100-PPV-A part #163309 made by Festo. With particular reference to FIG. 26, actuator 710 may have piston arms that along with ends of support rods 712 and 714 connected to a longitudinally extending sealing plate 716 having attached thereto longitudinally extending upper rail 717*a*, and lower rail 717*b*. Upper rail 717*a* is positioned to be able to engage upper major flap F and lower rail 717*b* is positioned to engage lower major flap G when piston arms of actuator device 710 are extended horizontally and transversely inwards to push flaps F and G into engagement with flaps K and J that are positioned underneath.

Left hand compression ram device 704 has an actuator arm 711 which may be actuated by an actuator device 719 with a vertically and longitudinally disposed plate 720 attached to the end of the actuator arm. Actuator device 719 may be a double acting pneumatic actuator (not shown) that may be provided with pressurized air through hoses, with the air flow being controlled by the solenoid valve device that may be controlled by PLC 132. Other embodiments are possible. For example, with reference to FIG. 26A, a servo-driven actuator for arm 711 may be provided that includes a mounting block 741 that can travel along a rail guide 745 that is secured to a horizontal and longitudinally extending plate forming part of a support frame 746. Mounting block 741 can slide horizontally along rail 745. An L-shaped plate 743 interconnects arm 711 to sliding block 741. Sliding block 741 may also be connected such as with nuts and bolts on its underside to a drive belt 757 made of any suitable material such as for example the same material that may be used in the belts for the moving apparatuses 115—namely a urethane timing belt with steel wires running through it. Continuous drive belt 757 may extend between a freely rotating pulley 759 mounted to an end of frame 746, and a drive wheel of a servo motor 761. Through a servo drive and an absolute encoder. Servo motor 761 may be an Allen Bradley model AB MPL-B320P-MJ22AA and may be interconnected with servo drive to PLC 132. The servo drive may be Allen Bradley model AB. 2094-BM01-S. Motor 761 may be coupled to drive wheel for the belt thorough an APEX GEARBOX model AE070-005.

PLC 132 may control the rotation of the drive wheel driven by the servo motor 761 through use of an encoder (that may be an absolute encoder). Thus the movement of belt 757 can be controlled and PLC can determine in real time, the position of ram arm 711 and thus of compression plate 720. Depending upon the type of, and thickness of material from which blank 111 is formed, the positioning of plate 720 relative to the plate of right hand compression device 706 can be adjusted by PLC 132 to ensure an appropriate degree of compression of the flaps of blank 111 positioned there between.

Each of actuator devices 704*a*, 704*b*, 710 may be double acting cylinders and they may be supplied with pressurized air that is controlled through an electronic valve device (not shown). The valve device may a model CPE14-M1Bh-5J-1/8 valve unit that may be in communication with and be controlled by PLC 132. In this way, PLC 132 can cause the piston arms to be extended and retracted during the processing of carton blanks to achieve the closure and sealing of the flaps.

Actuator device 704*a* and its plough 708*a* may be appropriately positioned and angled downwards (such as at about 45 degrees to the vertical) to be able to fold down major flap F sufficiently to be able to be engaged by right hand compression device 706. Similarly, actuator devices 704*b* and its plough 708*b* may be appropriately positioned and angled upwards (such as at about 45 degrees to the vertical) to be able to fold up major flap G sufficiently to be able to be engaged by right hand compression device 706, substantially simultaneously, or at least allowing of right hand compression device 706 to be able to compress both flaps F and G at the same time towards minor flaps J and K that have upper surfaces containing some adhesive.

Applicator 709 can have nozzles appropriately positioned and their operation may be controlled by PLC 132. Applicator 709 can apply a suitable adhesive to flaps such as leading minor flap J and trailing minor flap K, once they have been folded inwards to form part of the carton bottom. An example of a suitable applicator 709 that can be employed is the model ProBlue 10 applicator made by Nordson Inc. An example of a suitable adhesive that could be employed with on a carton blank 111 made of cardboard is Cool-Lok 034250A-790 adhesive available from Lanco Adhesives, Inc. Applicator 709 may be in electronic communication with PLC 132 which can signal the applicator to apply adhesive at an appropriate time during the positioning of the erector heads 120a, 120b

Left hand compression device 704 may be used to enter the carton from the left side and compress flaps F, G, J and K between ram plate 720 of left hand compression device 704 and the rails 717a, 717b of right hand compression device 706. This compression assists in ensuring that the panels are compressed together to ensure that the adhesive appropriately bonds the flaps together to make a solid carton bottom.

In some embodiments, once the left hand compression device 704 and right hand compression device 706 have completed the compression of the flaps, PLC 132 can send a signal to solenoid valve devices causing the compression devices to be withdrawn. The carton will then have been fully erected and is suitable to be loaded with one or more items. Erector head 120b may then carry the erected carton to a discharge chute 750 and then release it such that it falls onto discharge conveyor 117 which can then move the erected carton away for further processing. In other embodiments such as the one illustrated, the erected carton 111 can be released and fall onto support plate 703 and remain there until the next carton blank carried by another erector head moved by another movement apparatus (such as erector head 120a moved by movement apparatus 115a) moves the next carton blank into the location where it will be folded, sealed and compressed. In doing so the newly arrived carton blank pushes the previous fully erected carton downstream where it may fall onto discharge conveyor 117. Carton discharge conveyors are well known in the art and any suitable known carton conveyor may be utilized.

Other examples of transfer devices that might be employed to transfer the carton from apparatus 130 to a carton discharge conveyor include a "blow-off" system that may use one or more jets of compressed air, a suction cup system, the use of pushing arm or simply allowing for freefall of the formed carton.

A sensor 243 (see FIG. 2) such as an electronic eye model 42KL-P2LB-F4 made by ALLEN BRADLEY may be located near the bottom of discharge chute 750. Sensor 243 may be positioned and operable to detect the presence or absence of an erected carton at the input to the discharge conveyor 117. In this way, PLC 132 can be digitally signalled if an erected carton blank 111 is in place at the bottom of the chute 750 such that another erected carton can not be discharged down the chute 750. If so, the system 100 can be stopped by PLC 132 until any fault at discharge conveyor 117 can be rectified.

The overall operation of system 100 will now be described further.

As an initial step PLC 132 may be accessed by an operator through HMI 133 to activate system 100. The system 100 may be initialized with PLC 132 ensuring that all components are put in their "start" positions. At substantially the same time, a stack of cartons may be placed at the input end of conveyor 204 and system 100 may then be activated (such as by PLC 132 being instructed through HMI 133 to commence the processing of a stack of blanks 111.

PLC 132 may then send an instruction to the drive motor of input conveyor 204 to commence to drive belt 214 causing stack of blanks 111 to move downstream. Sometime prior to the stack of blanks reaching alignment conveyor 206, the right-hand-side magazine side guide wall 201 under control of PLC 132 will be driven by servo motor 260 to expand wide enough to allow the stack of blanks to enter on alignment conveyor 206, even if the stack is misaligned and/or the blanks in the stack are not perfectly square with each other. The stack of blanks is moved downstream, until once the front edge of the stack of blanks passes the downstream edge of conveyor 204, sensor 242 will send a signal to PLC 132 indicating that the front edge of the stack has reached the input to alignment conveyor 206. In response, PLC 132 may then send an instruction to the drive motor of input conveyor 204 to commence to drive belt 216 causing stack of blanks 111 to move downstream towards end wall 218 of magazine 110. Once the front edge of the stack of blanks 111 reaches end wall 218, sensor 240 will send a signal to PLC 132 indicating that the front edge of the stack of blanks has reached end wall 218. In response, PLC 132 can then initiate the tamping sequence to "square up" the stack of blanks, as detailed above.

In review, the tamping sequence for ensuring the blanks are properly squared up at the pick up location steps, may include the following steps. The tamping actuator 276 may be extended having been activated by pressurized air controlled by PLC 132 and the associated valve. Then the side guide wall 201 may contract to make contact with the side of the case stack and press the side wall 201 against the left hand side guide wall 200. This aligns the cases so the side edges of blanks are aligned with each other and the longitudinal side wall of the walls 200 and 201. The tamping actuator 276 may then retract, and the tamping bar 280 press the stack forward, thereby aligning the blanks in the stack so that their front and rear edges are vertically aligned with each other and with the inner face of the bar 280 and the inside surface of front wall 218. The stack of blanks 111 is then properly positioned so that the erector heads 120a and 120b can begin picking up blanks from the stack.

Figure 17:
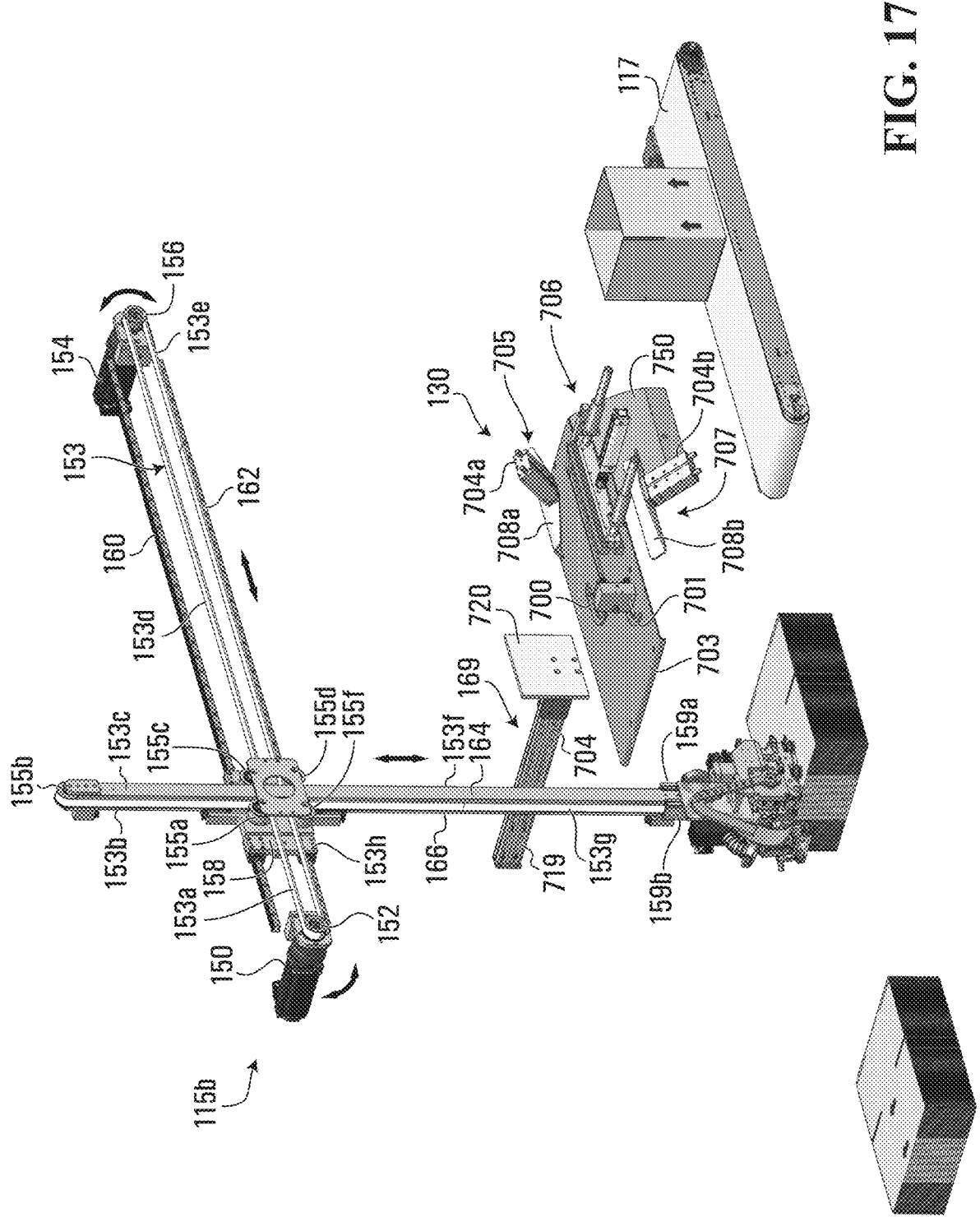
FIGS. 17-25 and 27-29 are schematic right perspective views of system of FIG. 1A, but showing only a single movement apparatus, erector head and some parts of the folding and sealing apparatus, in various sequential stages of a blank of FIGS. 10A to 10E being processed into an erected carton.

One of the erector heads such as erector head 120b will be positioned by the control of PLC 132 over movement apparatus 115b, at the zero position calibrated for the head 120b. PLC 132 may then cause servo motors 150 and 154 to be operated to achieve the following sequence of operations:

First the head 120b may be moved to the pick up position as shown in FIG. 17.

As the erector head 120b is being brought vertically downwards to retrieve the top blank on a stack of blanks 111 in magazine 110, the erector head's movement just prior to suction cups 312 contacting with the upper surface of the blank will be generally vertically downwards. Prior to the suction cups 312 contacting the surface of a panel A of a blank, sensor rod 380 will engage the surface of panel A can cause sensor rod to be pushed upwards. This movement upwards of sensor rod 380 relative to plate 327 will physically cause the sensor to be activated and send a signal to PLC 132. PLC 132 may respond to that signal by causing servo drives 150 and 154 to slow down so that the final few centimeters (e.g. 3.5 cm) of movement downwards towards contact between cups 312 and the upper surface of panel A occurs at a much slower rate. Also PLC knows how much further vertically downwards erector head 120b must be lowered to establish proper contact between suction cups 312 and panel A. It should also be that sensor rod 380 and associated sensor device can also be used to ensure that PLC 132 is aware of whether once a blank has been engaged in the magazine 110, it stays engaged with erector head 120 until the appropriate release location is reached, such as once erection of the carton has been completed.

Figure 18:
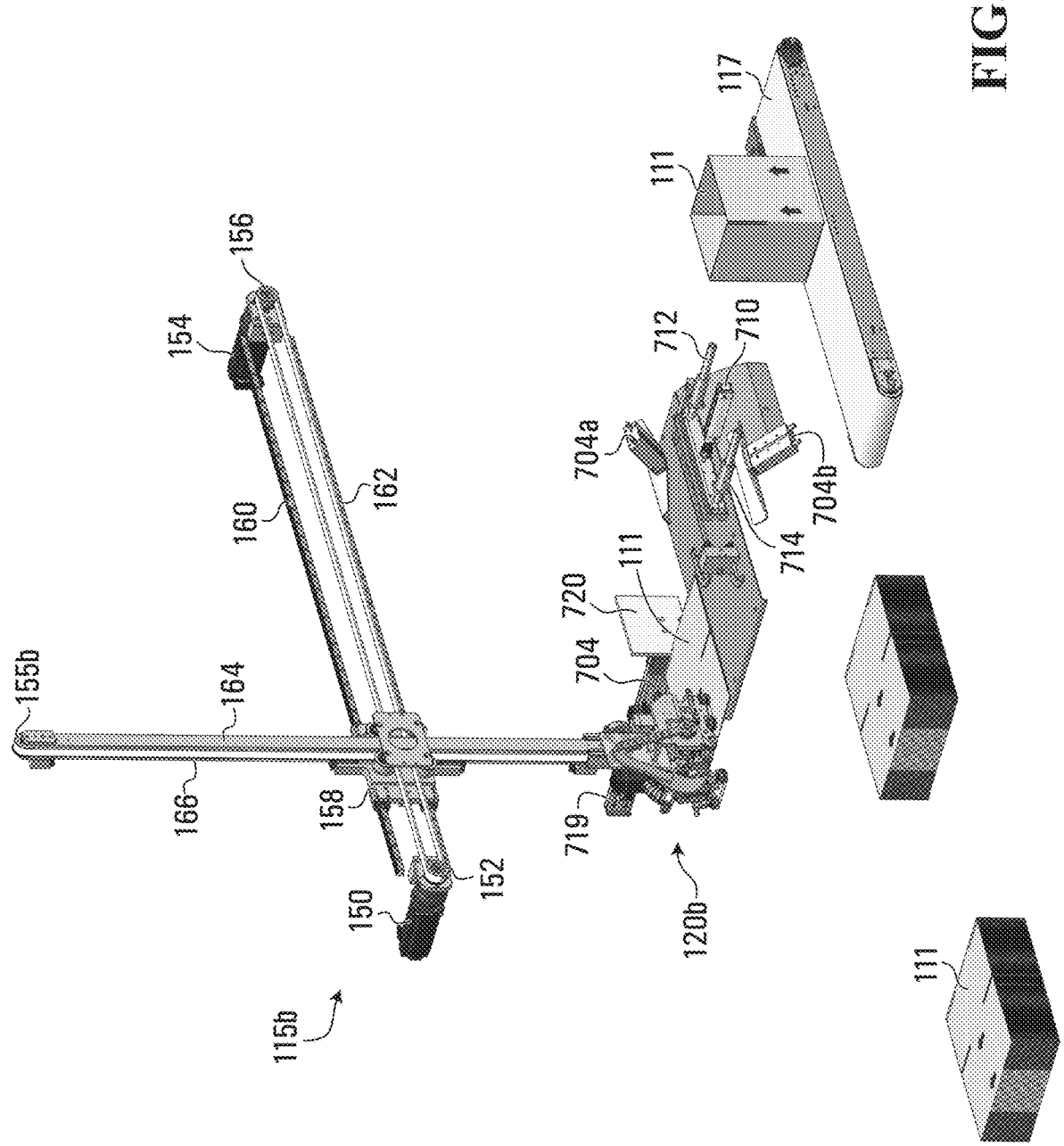

PLC 123 will also operate the valve device 340 on head 120*b* to cause suction force to be developed at suction cups 312 and optionally also 320 (although suction at suction cups 320 can be delayed);

With the head 120*b* in the pick up position shown in FIG. 17 and the suction force being applied at suction cups 312, the head 120*b* can engage the panel A (see location of suction cup outline on FIG. 10A) and then commence to lift upwards the blank as shown in FIG. 18. PLC 132 will know how high to lift the upper surface of blank 111, to ensure that once opened up, the datum line W1 will be appropriately vertically located so that components of folding and sealing apparatus 130 will be able to fulfil their functions as described above.

Figure 19:
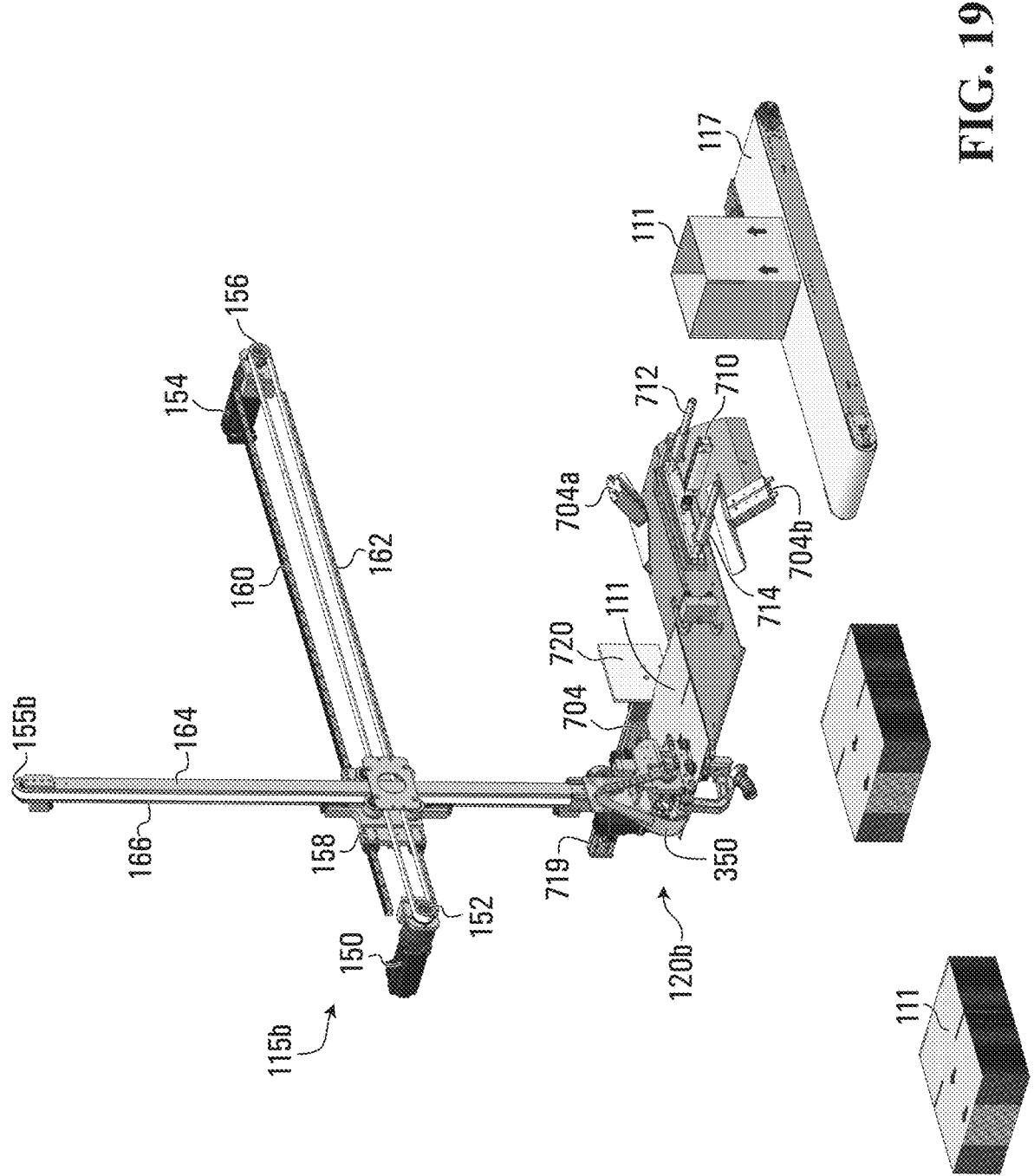

Preferably when erector head 120*b* has reached a determined vertical position, and preferably while the erector head 120*b* is not moving longitudinally towards folding and sealing apparatus 130, PLC 132 will send a signal to cause servo motor 134 to rotate which will then cause shaft 342 to rotate in a particular desired direction at a particular desired rotational speed for a desired amount of time. PLC 132 can control the rotational position of shaft 342 to cause rotator device 350 which is fixedly attached to shaft 342 to rotate with shaft 342. Thus rotator device 350 may be rotated to the position shown in FIG. 19 and at that position suction cups 320, which will have suction engaged, will attach to the underside of blank 111, and in particular to panel D.

Figure 20:
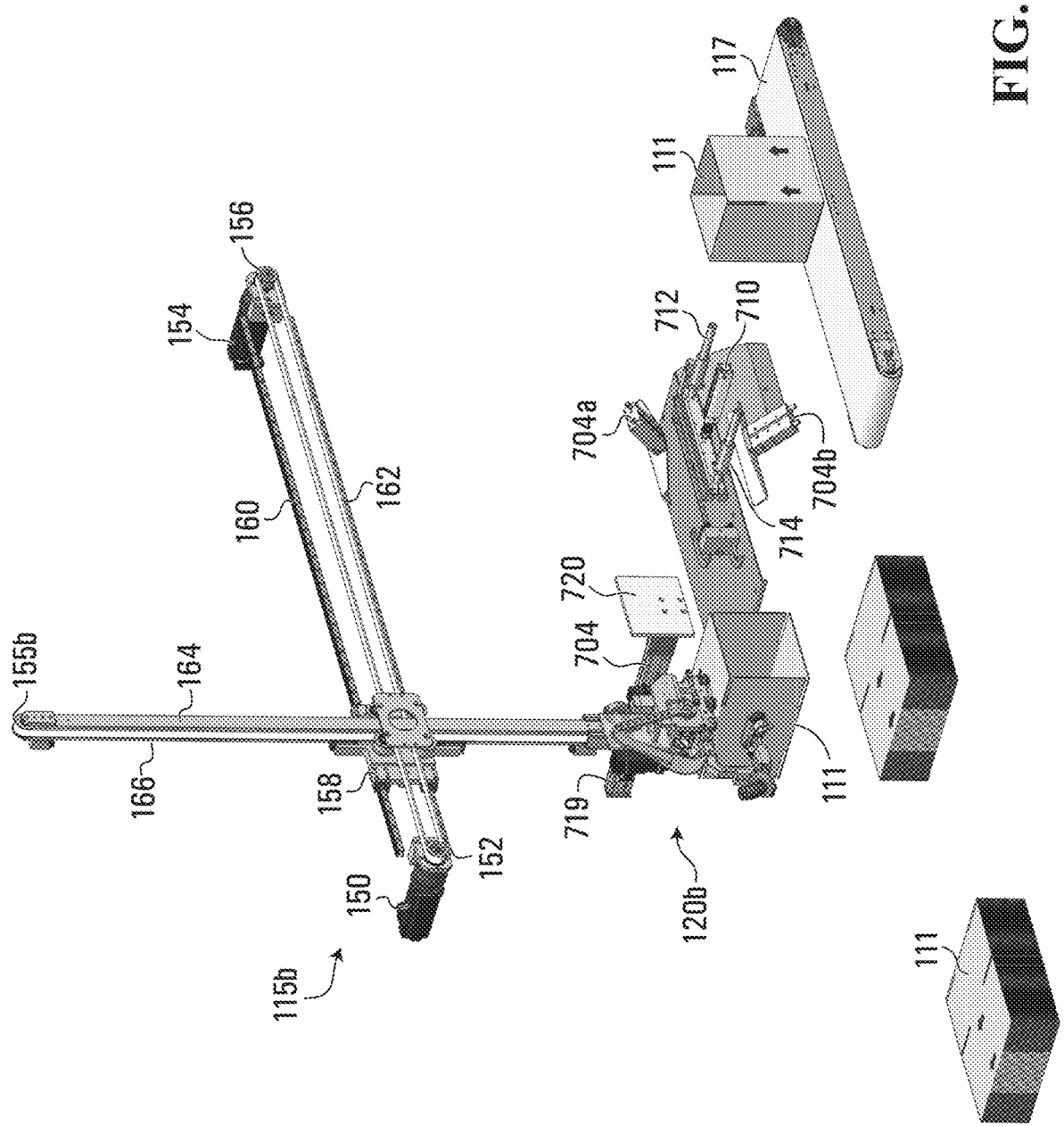

The next operation is the blank opening whereby through control of PLC 132, opposed forces provided by suction cups 312 acting upwards on top and suction cups 320 acting in an opposite downward direction will start to pull the flattened blank apart. The forces are then continued by the suction cups 312 above and 320 below, as rotator device 350 is rotated 90 degrees backwards to the position shown in FIG. 20.

During the backwards rotation of rotator device 350, actuator device 325 may be supplied with pressurized air controlled through valve device 340 to activate the actuator device. PLC 132 may send a signal to valve device 340 to operate actuator device 325 to extend piston arms 326 at a particular angular position of arm 351 and or location of erector head 120*b* that is provided by the encoder associated with servo motor 364. PLC 342 may cause, acting through valve device 340, actuator device 325 to be actuated at approximately the same time as the cups 320 have contacted the surface of downward facing panel D and the rotation of arm 351 is just about to begin or has just commenced. Piston arms 326 may be completely extended by the time arm 351 has rotated about 45 degrees. The piston arms 326 may continue to be extended and stay extended when rotator device 350 is at the 90 degrees position shown in FIG. 20.

Figure 21:
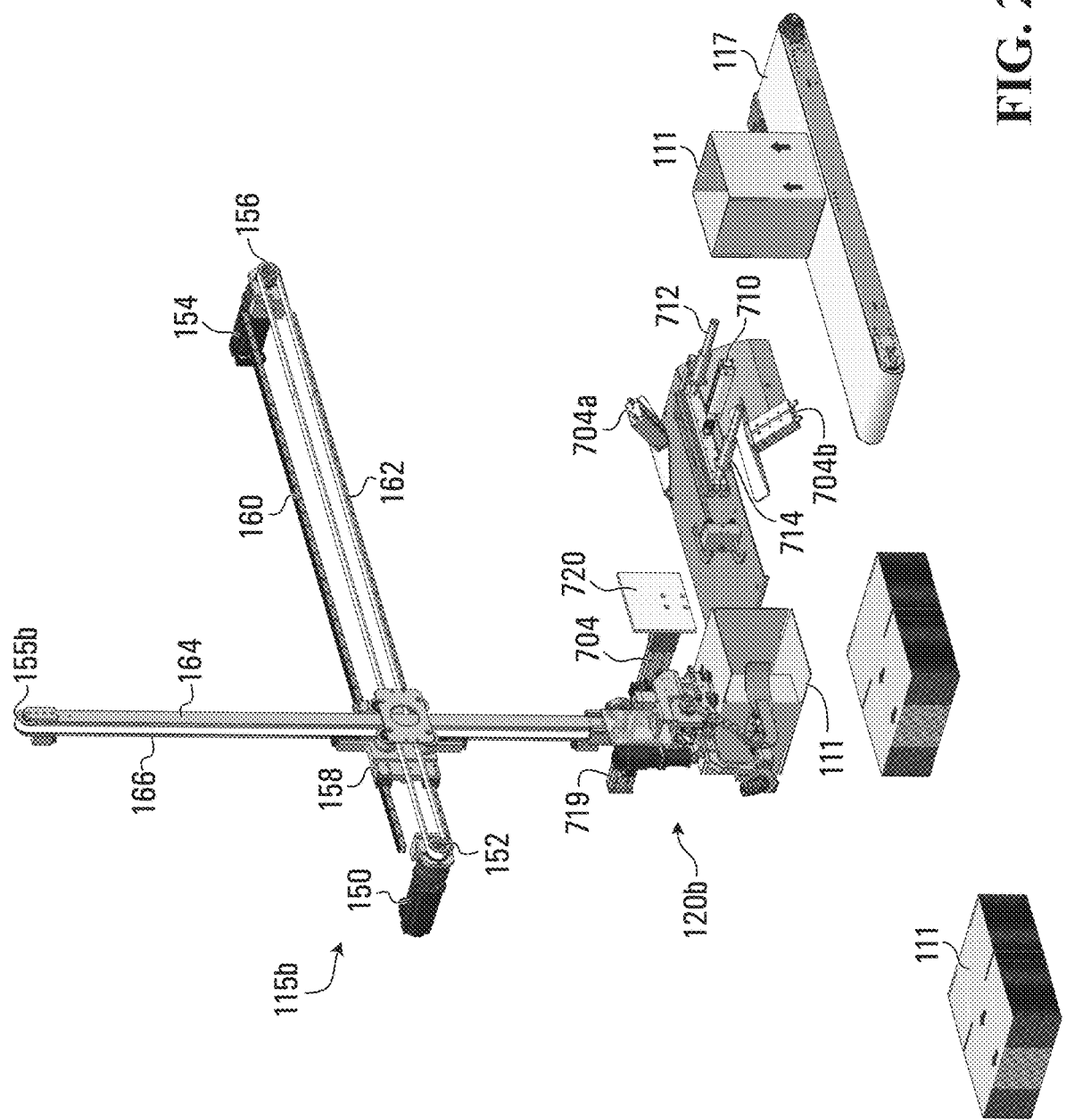

Once the blank 111 has been opened, erector head 120*b* can securely hold the blank by the suction forces exerted by cups 312 and 320, to panels A and D. Also, once opened the flaps K and J need to be folded inwards towards the bottom opening of the carton. In the embodiment shown in Figures such as FIGS. 17 to 29, the trailing minor flap K is closed by actuation of paddle 310 as shown in FIG. 21. Thus PLC 132 can send a signal to valve device 340 which causes rotary actuator 397 to rotate shaft 316 and thus rotate paddle 310. Paddle 310 can then engage trailing minor flap K of blank 111 and cause it to fold about its fold line where it joins to panel D. Thus, flap K can be folded inwards towards the bottom opening of blank 111.

Figure 22:
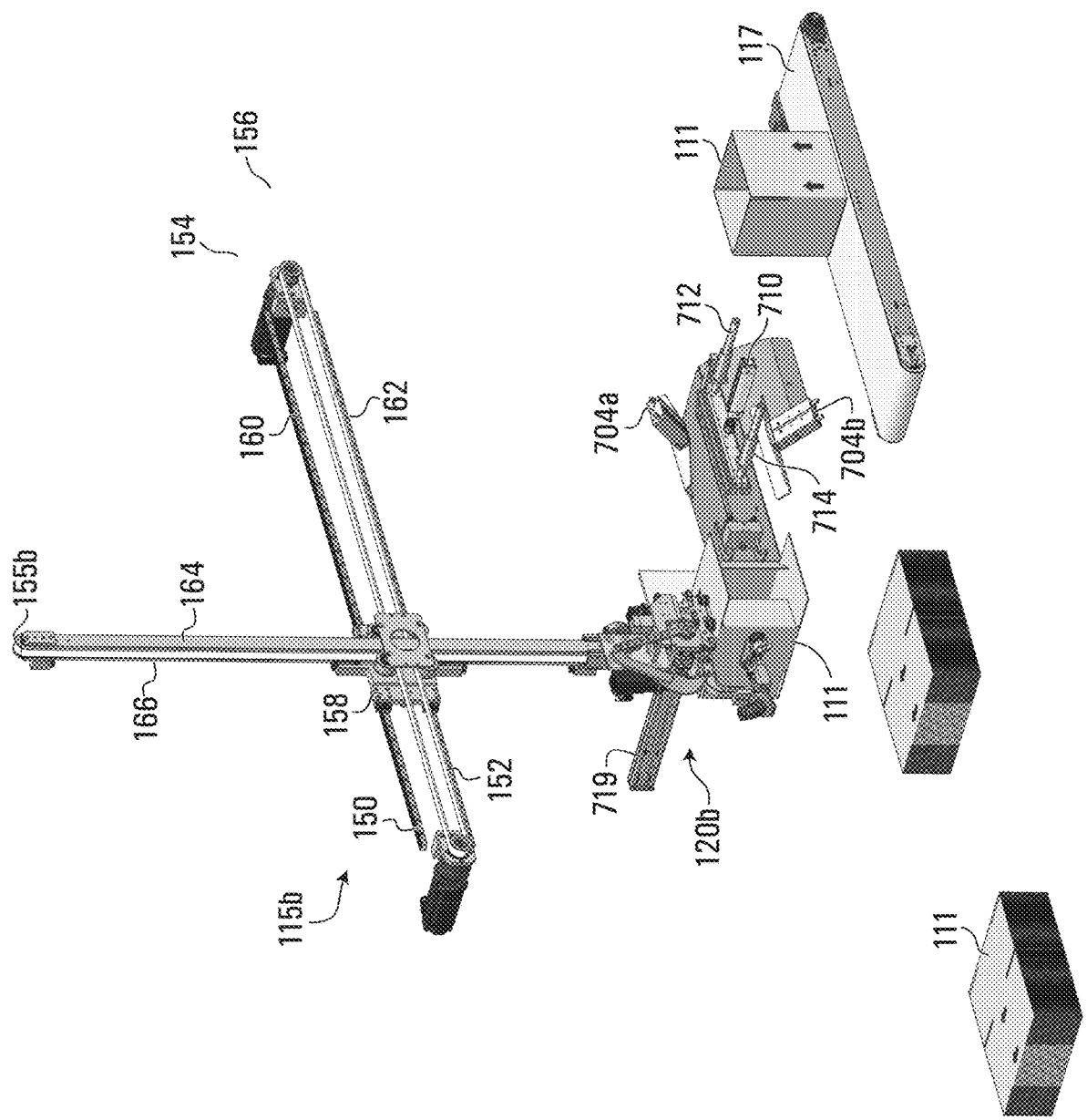

Leading bottom flap J may also be folded about its fold line which joins it with panel B by engagement of the flap with upper and lower folding rails/ploughs 700, 701 that form part of folding and sealing apparatus 130 as erector heads 120*b* is moved longitudinally downstream towards apparatus 130. As the blank 111 held by erector head 120*b* is moved longitudinally downstream into the folding and sealing apparatus 130 the leading bottom flap J can be folded inwards by rails/ploughs 700, 701, so that both bottom flaps K and J have been folded inwards to start the formation of the bottom of the carton, as is shown in FIG. 22.

Figure 23:
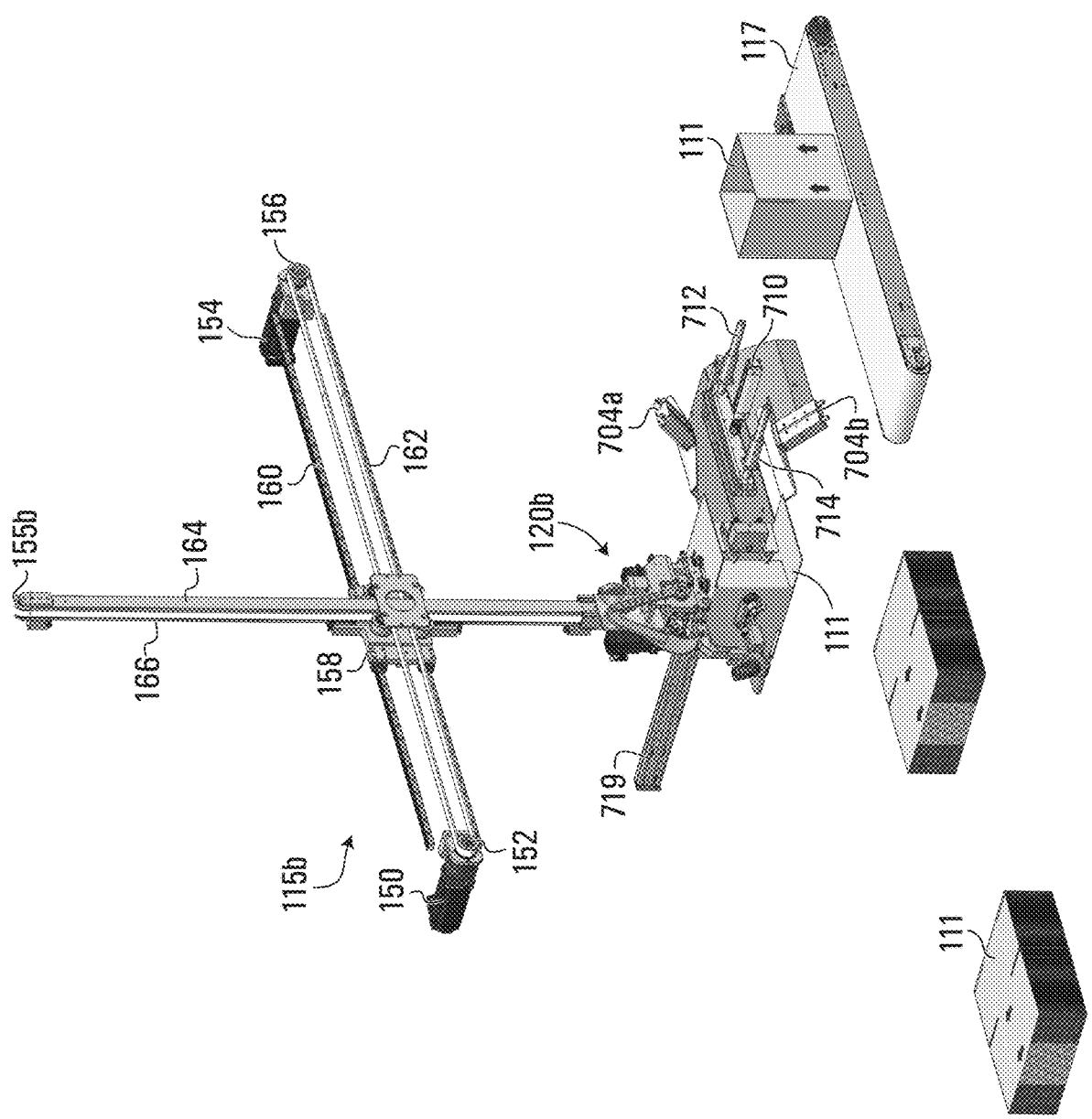
Figure 24:
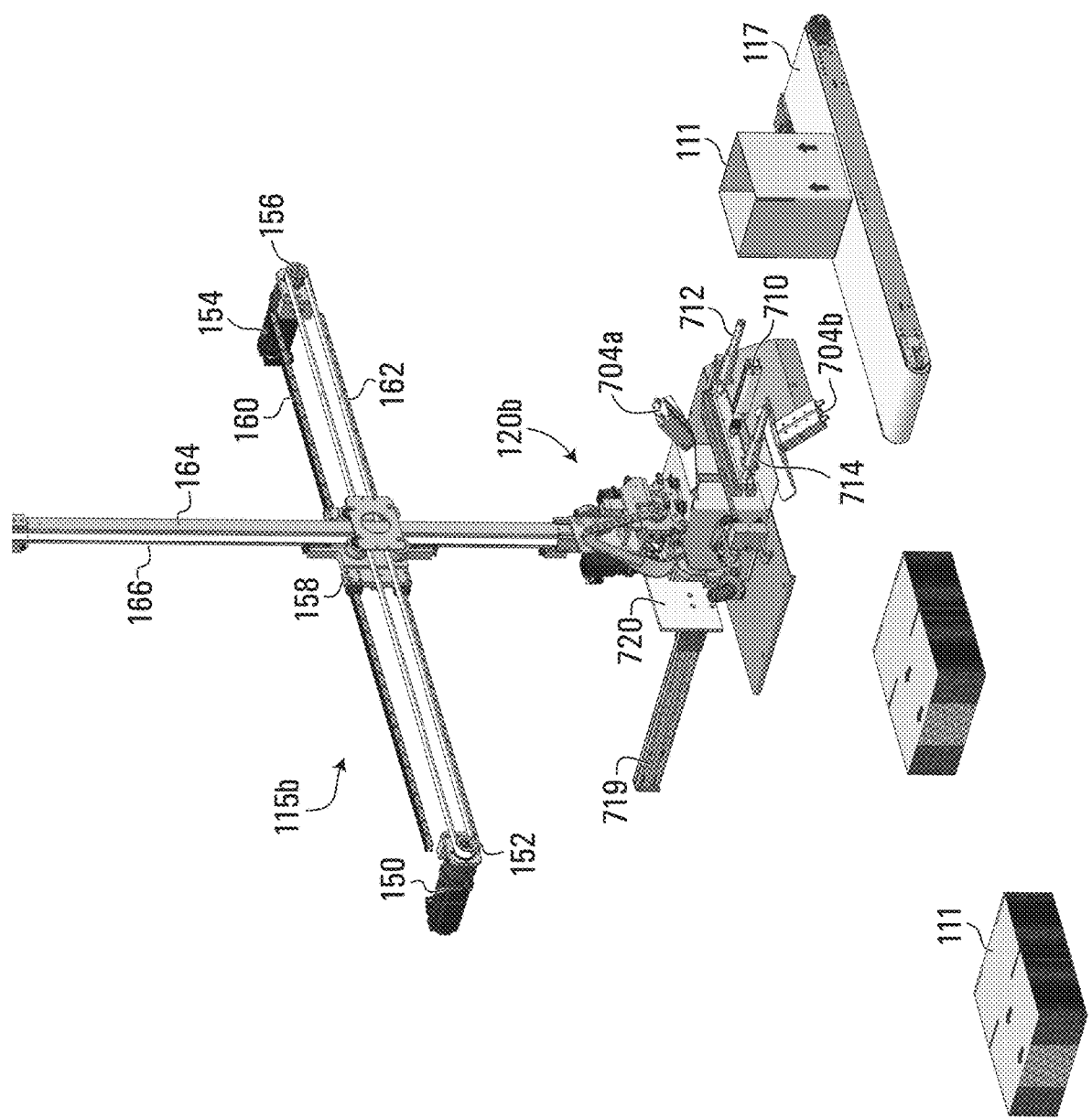
Figure 25:
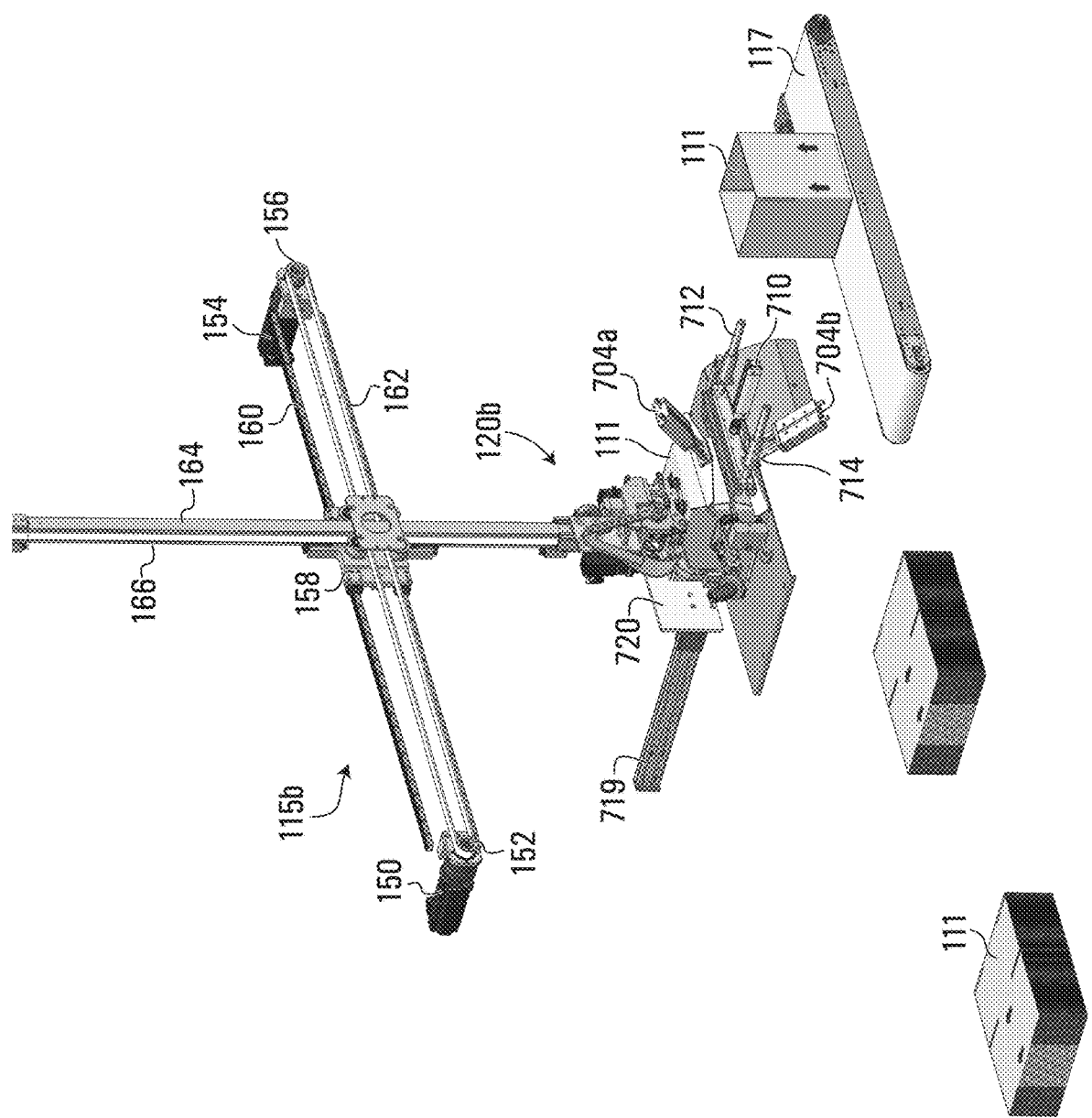

Also when the flaps K and J have been folded inwards, under the control of PLC 132, or pursuant to another control or trigger, adhesive applicator 709 can through appropriately positioned nozzles, apply a suitable adhesive at appropriate positions on the flaps K and J such as shown. The application of glue can occur before, during, or after PLC 132 has caused movement apparatus 115*b* to move erector head 120*b* to a downstream location where the major flaps F and G can be folded and compressed onto minor flaps K and J. As shown in FIG. 23, glue may be applied while movement apparatus 115*b* is moving erector head 120*b* to the downstream location for closing the bottom opening by folding and compression.

Next upper flap actuation device 705 may be activated by PLC 132 acting through a valve device to cause pneumatic actuator device 704*a* to extend piston arms connected to an upper plough 708*a*. Similarly, lower flap actuation device 707 may also be activated substantially simultaneously by PLC 132 such that pneumatic actuator device 704*b* extends its piston arms connected to lower plough 708*b* as shown in sequential FIGS. 24 and 25.

Next, as shown in FIG. 26, right hand compression device 706 with its central pneumatic actuator 710 may have piston arms extended so that longitudinally extending sealing plate 716 having attached thereto longitudinally extending upper rail 717*a*, and lower rail 717*b* engages the upper and lower major flaps F and J. Upper rail 717*a* is positioned to be able to engage upper major flap F and lower rail 717*b* is positioned to engage lower major flap G when piston arms of actuator device 710 are extended horizontally and transversely inwards to push flaps F and G into engagement with flaps K and J that are positioned underneath. Upper and lower flap actuation devices 705 and 707 may be withdrawn by PLC 132 when compression device 706 has engaged flaps F and G.

Figure 27:
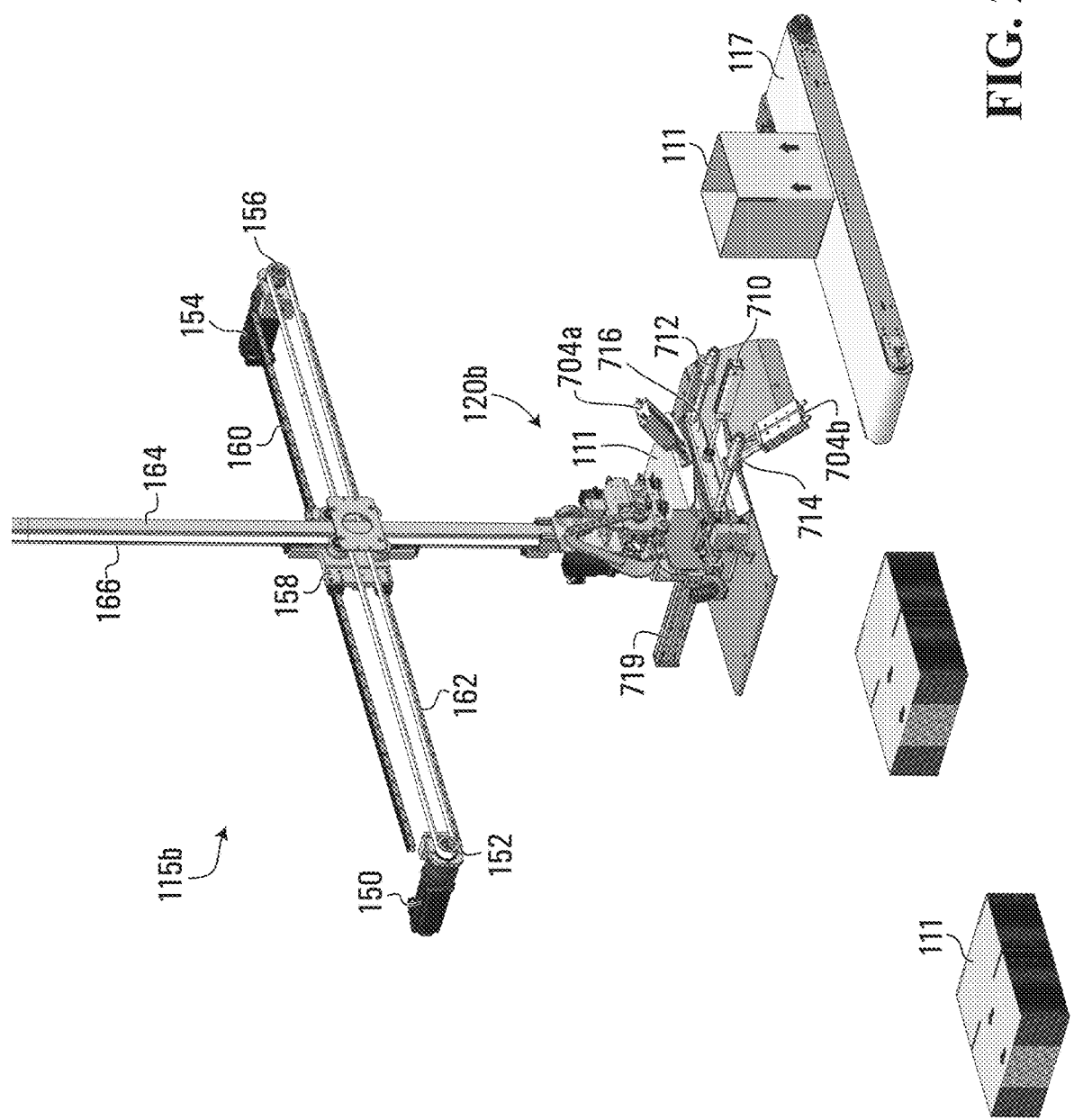

Next, as shown in FIG. 27, left hand compression device 704 may be used to enter the carton from the left side and compress flaps F, G, J and K between ram plate 720 of left hand compression device 704 and the rails 717*a*, 717*b* of right hand compression device 706. This compression assists in ensuring that the panels are compressed together to ensure that the adhesive appropriately bonds the flaps together to make a sold carton bottom.

Figure 28:
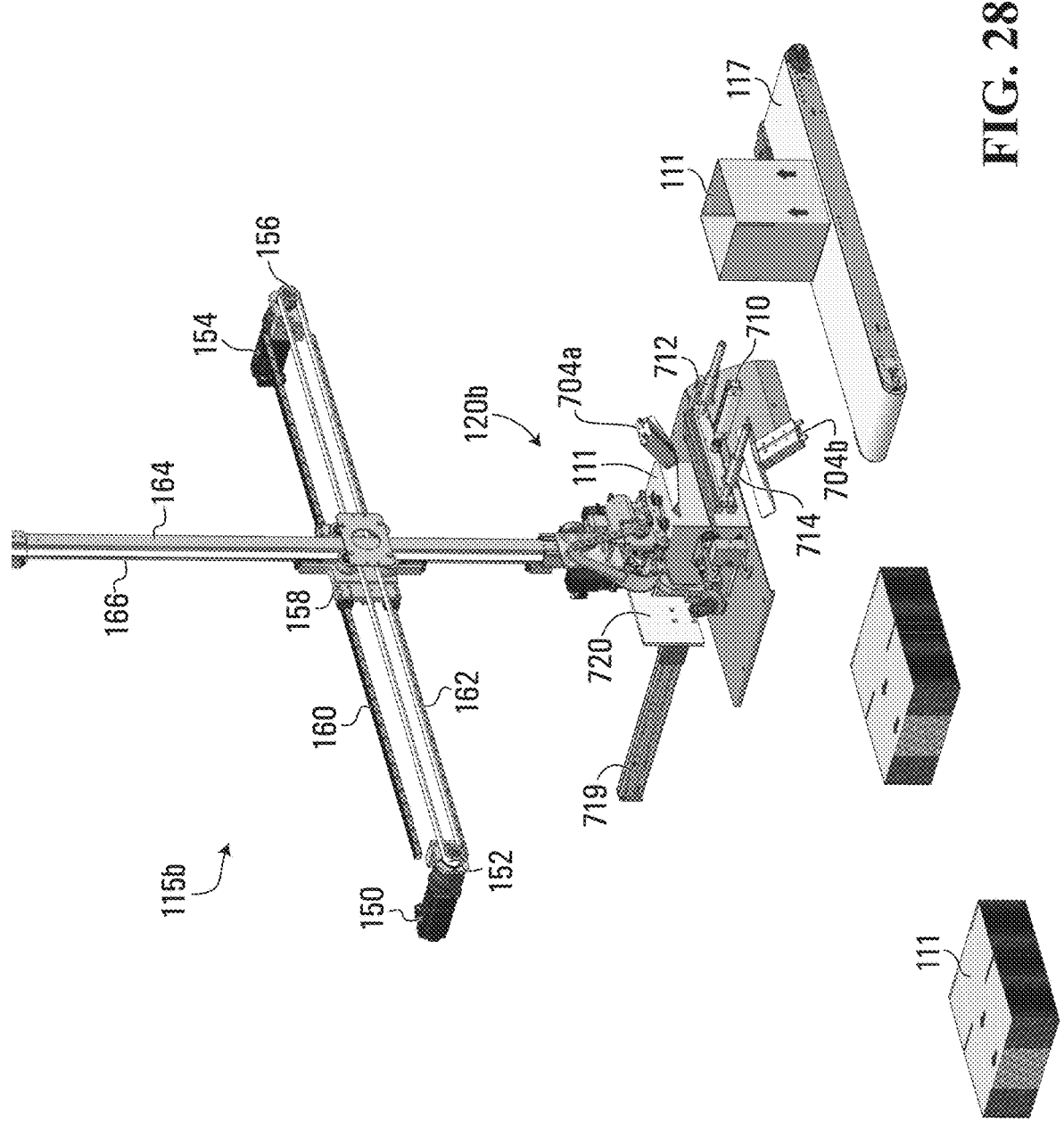
Figure 29:
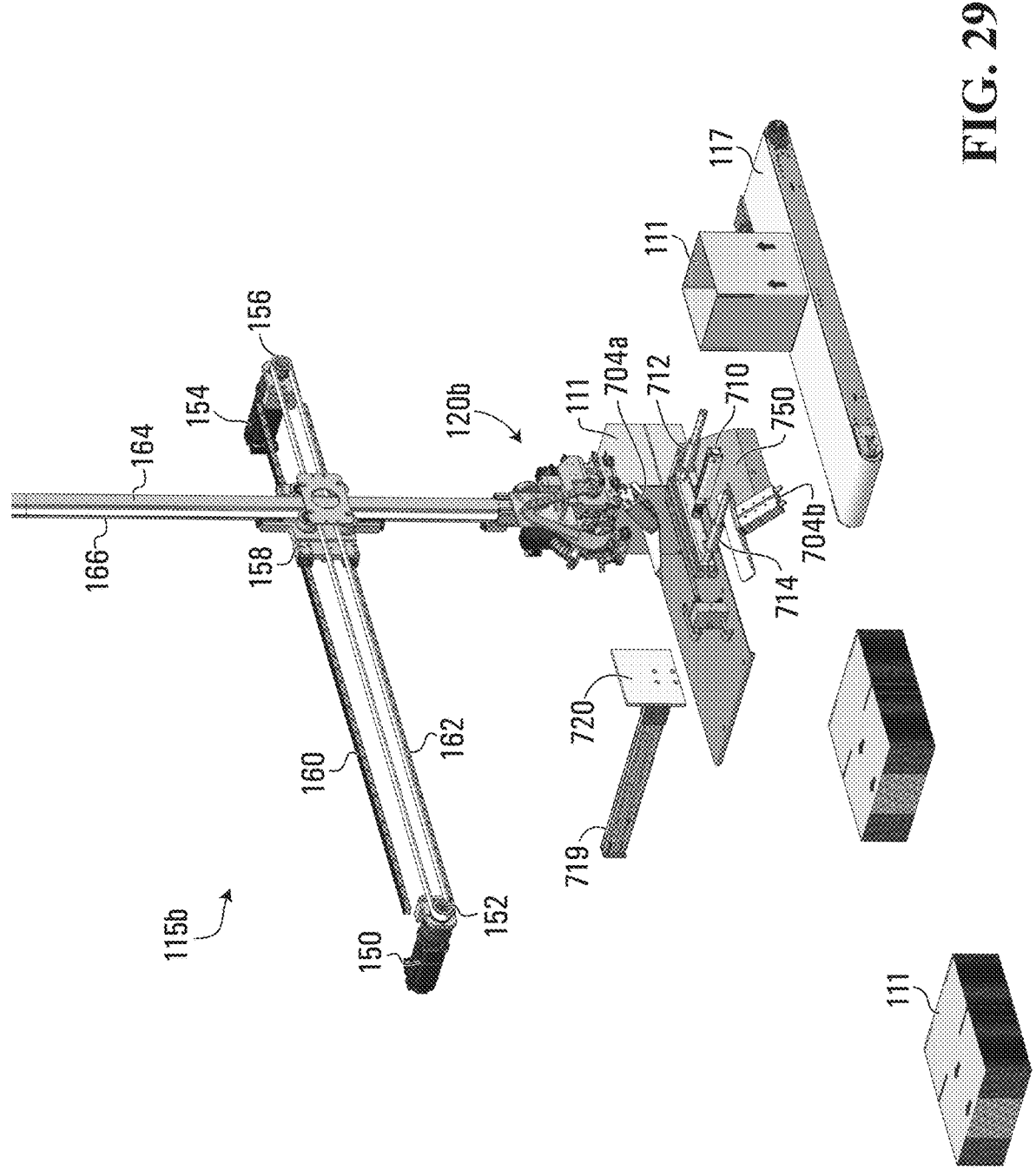

Once the compression has been held for a short time (for example about 0.5 seconds) to allow the glue to sufficiently set/harden and bond the flaps together, the compression can be released by withdrawing left hand compression device 704 and right hand compression device 706 as shown in FIG. 28. The carton is then fully erected and released from both apparatus 130 and from erector head 120*b* as PLC 132 will cause suction cups 320 and 312 to have their suction force turned off by valve device 340. Additionally, PLC 132 can cause rotator device 350 to be rotated backwards a further 90 degrees to the horizontal ready position shown in FIG. 29.

Thereafter, erector head 120*b* can release the erected carton which can then fall onto support plate 703 and remain there until the next carton blank carried by another erector head moved by another movement apparatus (such as erector head 120*a* moved by movement apparatus 115*a*) moves the next carton blank into the location where it will be folded, sealed and compressed, and in doing so pushes the previous fully erected carton downstream to chute 750 where it may fall onto discharge conveyor 117.

Figure 12:
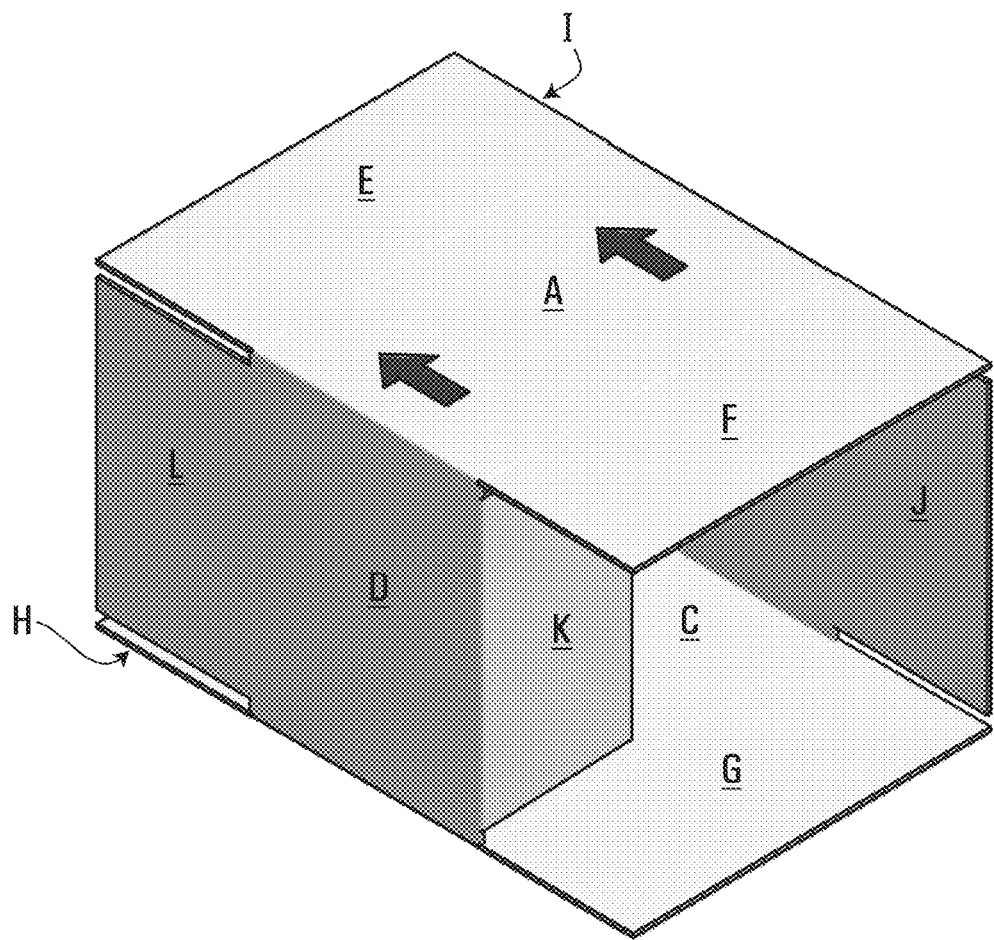
Figure 13:
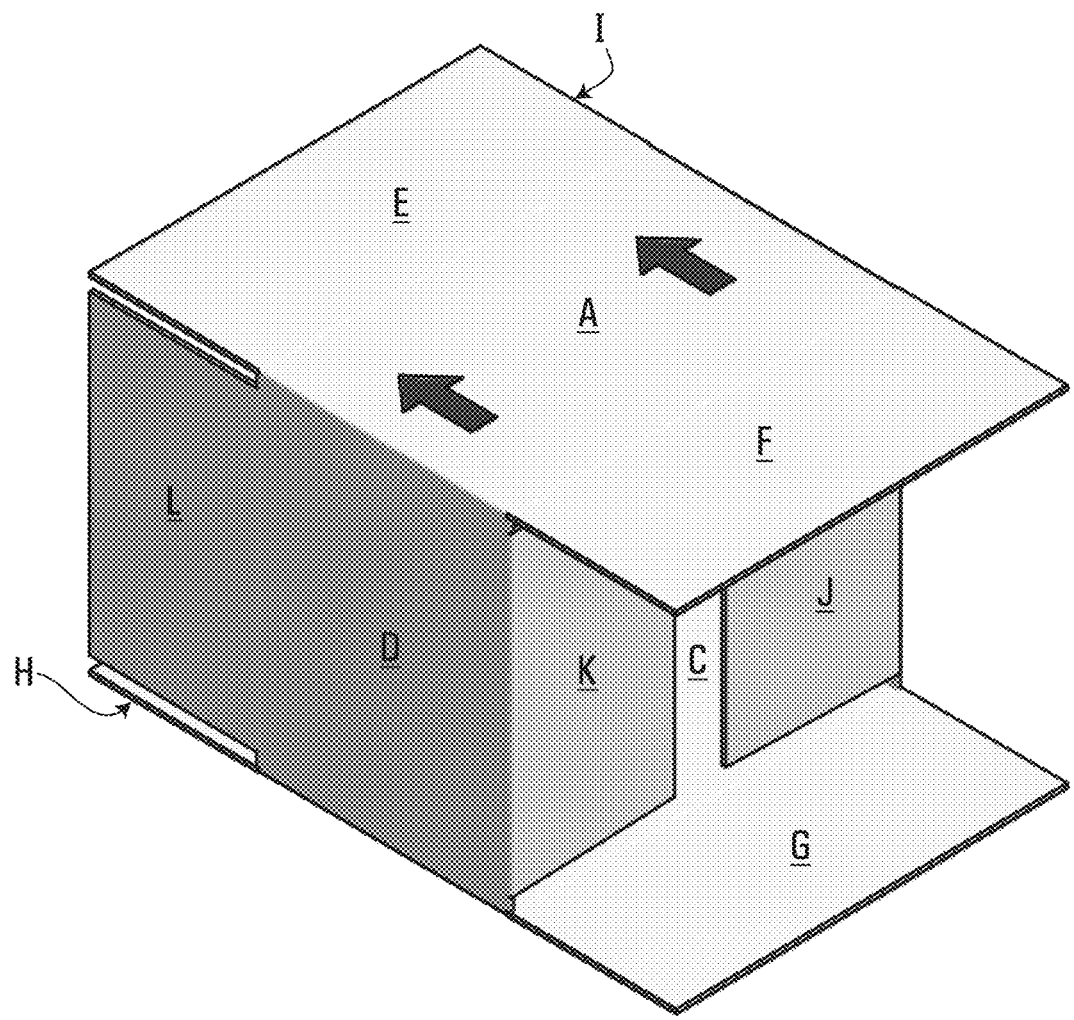
Figure 14:
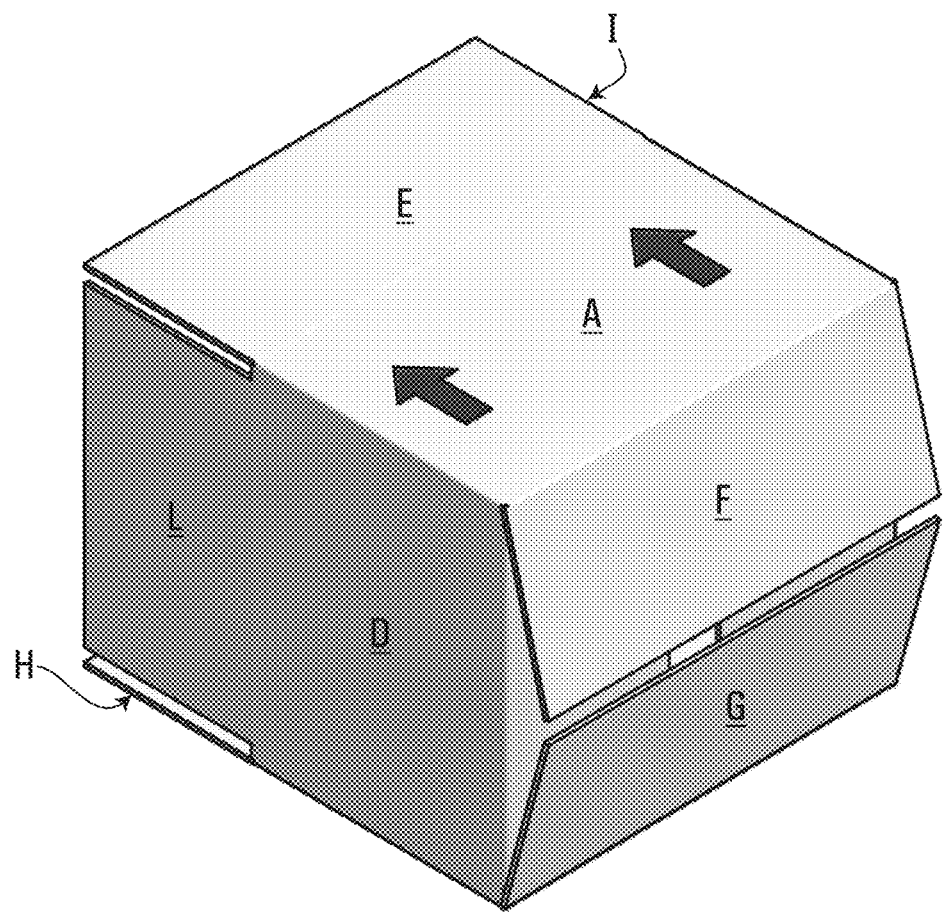
Figure 15:
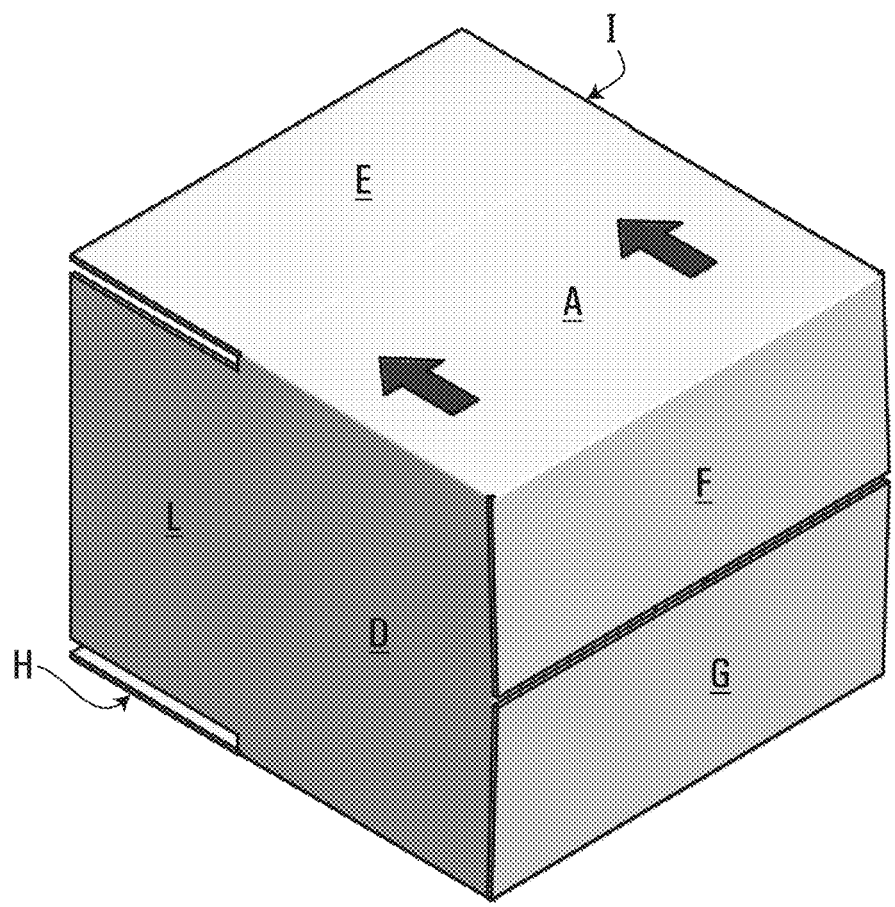

The entire sequence of movement of a blank 111 as it is processed by system 100 is shown in isolation in FIGS. 10A-D, and FIGS. 11 to 16. In FIGS. 10A-D the blank is shown in its flattened tubular configuration. In FIG. 11 it is shown in its opened configuration after being opened by an erector head like erector head 120. In FIG. 12 it is shown with the trailing minor flap K folded inwards and in FIG. 13 it is shown with leading minor flap J also folded inwards. In FIG. 14 blank 111 is shown with the major bottom flaps F and G folded inwards and in FIG. 15 the blank is shown when the flaps J, K, F and G are being or have been compressed to seal the bottom of the carton. Finally in FIG. 16 the erected carton is shown with its opening facing upwards so that it may be loaded with one or more items.

While the foregoing handling of a carton blank 111 by erector head 120*b* has been occurring, erector head 120*a*, being supported and moved by movement apparatus 115*a*, can be carrying out the same process but do so out of phase with erector head 120*b*. For example, the cyclical movement and operation of erector head 120*a* may be 180 degrees out of phase with the movement and operation of erector head 120*b*. By providing two erector heads 120*a* and 120*b* operating simultaneously, but out of phase so one does not interfere with the other, the processing capacity of blanks can be increased significantly. But in using only one erector head 120, the processing capacity of the system 100 may still be relatively high. In part the relatively high processing capacity is also due to the relatively short "stroke" (i.e. longitudinal distance) that the erector heads must travel when carrying out the blank retrieval, erection, folding, sealing and compression. This means that the components do not have to travel such a great distance as in conventional carton erectors. When using two erector heads with moving apparatuses, 100 may be capable of processing about 35 cartons per minute.

Many variations of the embodiments described above are possible. By way of example only an alternate configuration for an erector head 1120 and folding and sealing apparatus 1130 is shown in FIGS. 34*a* to 44.

Figures 34A, 34B:
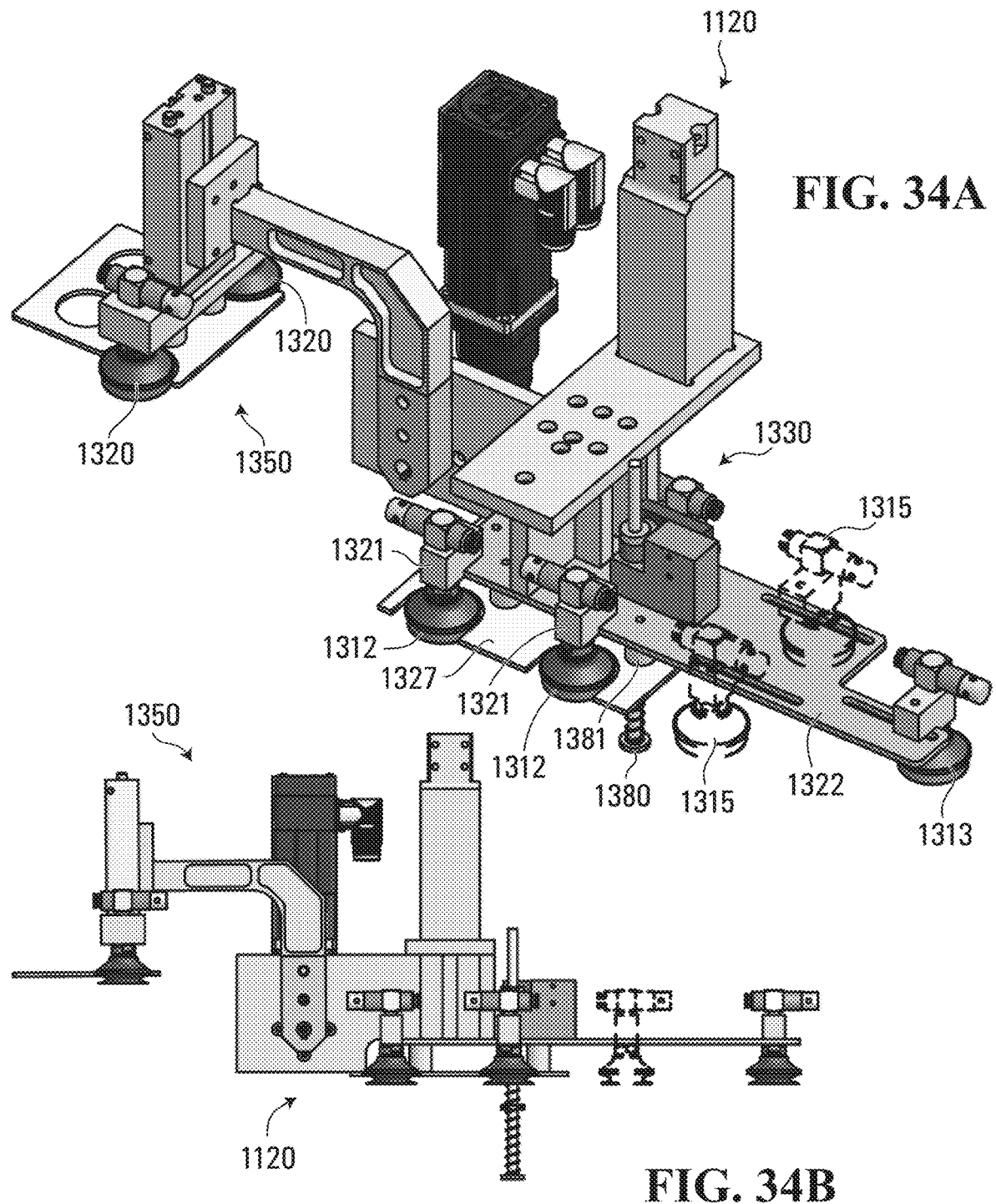
FIG. 34A is a top right perspective view of a second embodiment of an erector head.
FIG. 34B is a right side elevation view of the erector head of FIG. 34A.

With reference to FIGS. 34*a* and 34*b*, erector head 1120 is built in substantially the same way as erector head 120 and functions in the same way apart from the following major differences. Erector head 1120 does not include a paddle member like paddle 320 on erector head 120. As will be described hereinafter, the component and functionality for closing minor trailing flap K of a blank 111 can be moved off the erector head and may become part of a modified folding and sealing apparatus 1130 (see for example FIG. 36).

Erector head 1120 may have body generally designated 1330, that includes a bottom suction plate 1327 that is generally shaped in a square cross configuration to provide flanged openings for such cups. In each of the open flanges of plate 1327 is positioned a suction cup 1312. Suction cups 1312 are mounted with support blocks 1321 to a mounting plate 1322. Also mounted with mounting blocks is a suction cup 1313 and optionally cups 1315. Cups 1313 and 1315 may be employed to support a panel B of a blank 111 if the configuration of the panel and/or materials from which blank 111 is made, require additional support for the blank 111 at least when it is retrieved from the stack of blanks 111 in the magazine and even until the rotary actuator device 1350 (which may be substantially the same as rotary actuator 350 on erector head 120) engages the bottom panel D of the blank prior to opening the blank.

In some applications, without the additional support provided by cup 1313 and possibly cups 1315, the panels B and C may not remain in a generally flattened configuration when the blank if picked up by cups 1312 engaged with panel A.

It should be noted that suction cups and vacuum generators used on erector head 1120 may be same as used on erector head 120. For simplicity, electrical cables and hoses for pressurized air are not shown on erector head 1120 but like erector head 120 can be installed in appropriate locations.

Also, a valve device like valve device 340 above, to control the flow of air is not shown but may be employed on erector head 1120 and may be in electronic communication with PLC 132 and be controlled by PLC 132. In this way PLC 132 can turn on and off the supply of vacuum force to each the vacuum generators associated with each of the suction cups on erector head 1120.

Figure 35A:
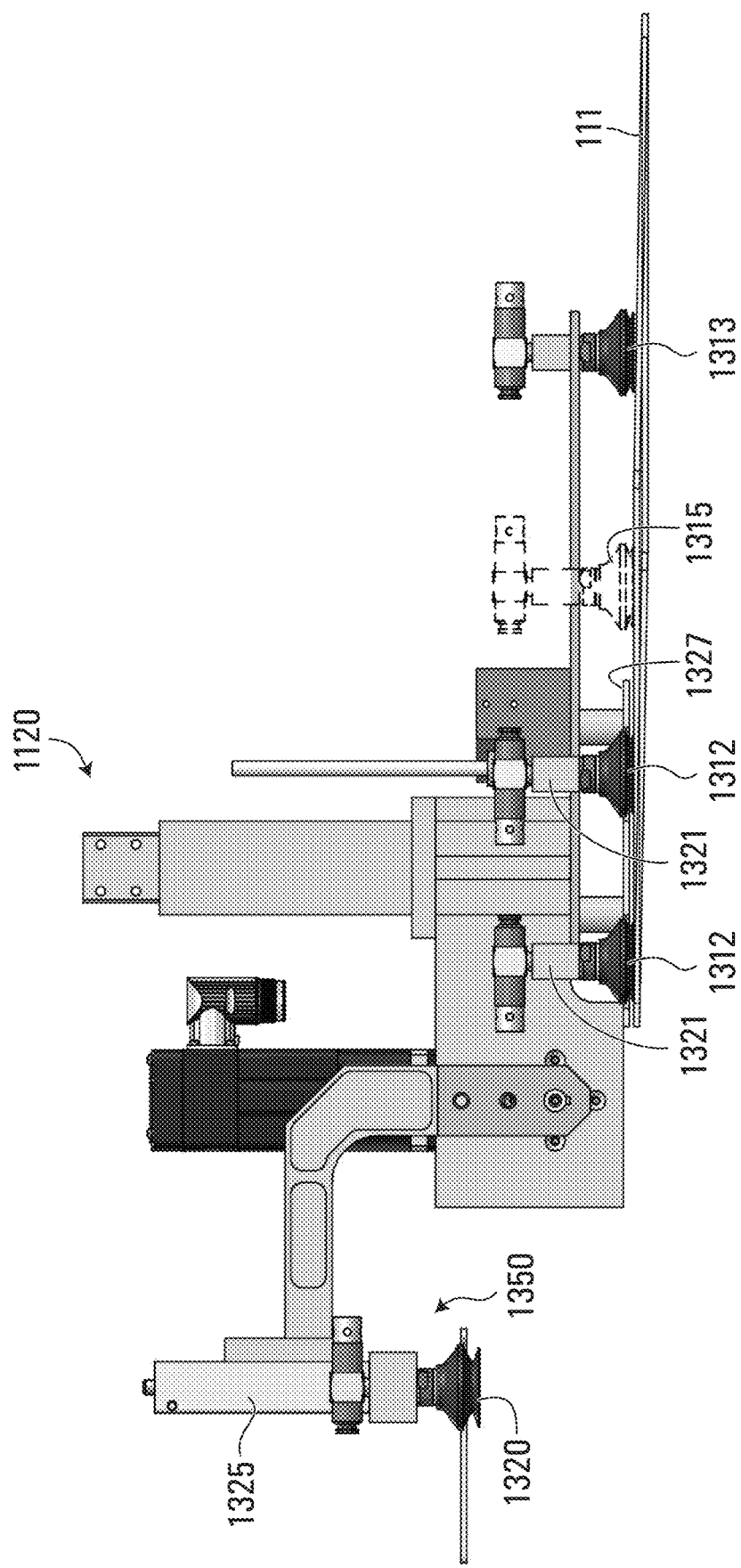
FIGS. 35A, 35B and 35C show the erector head of FIG. 34A in various stages of opening a blank.
Figure 35B:
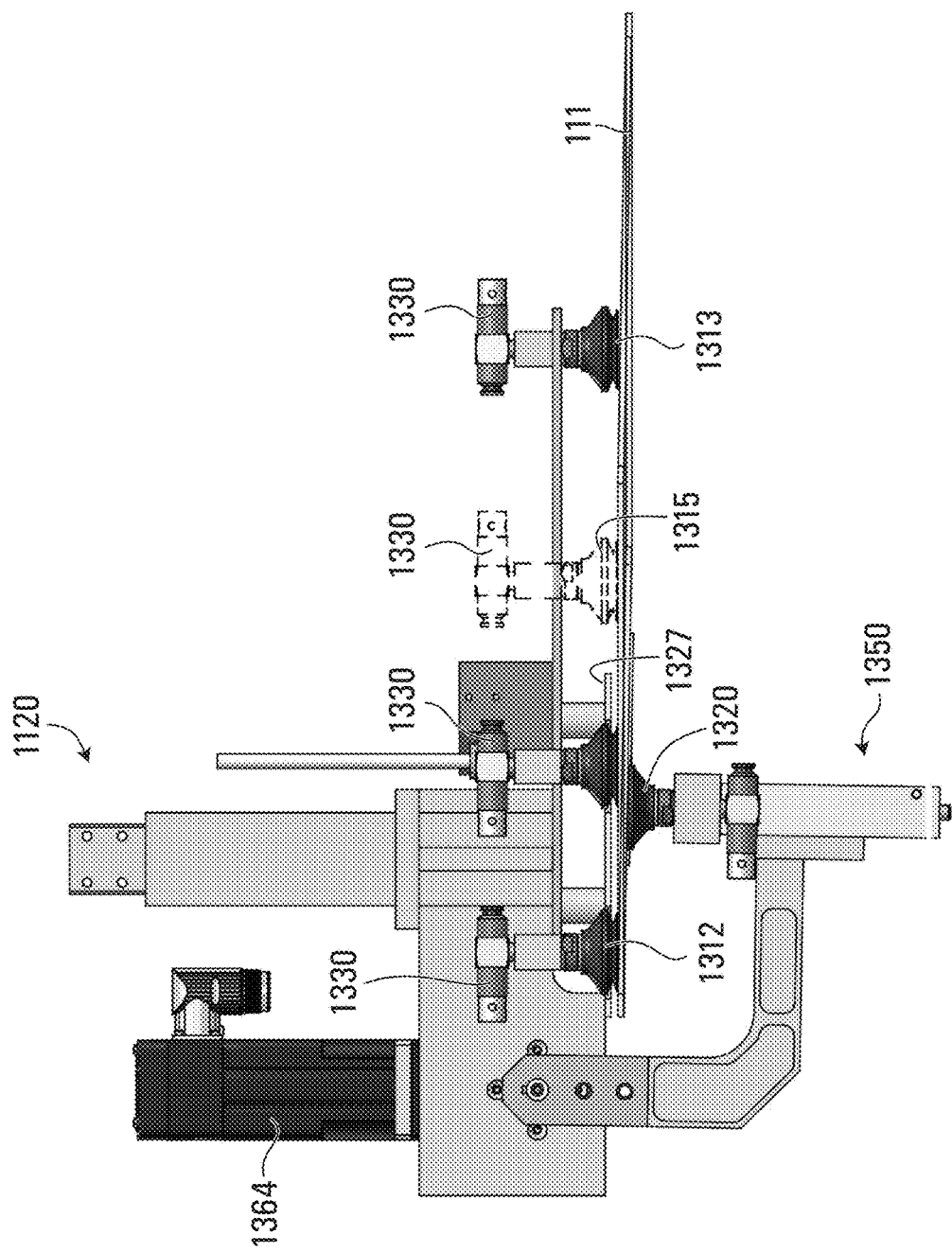
Figure 35C:
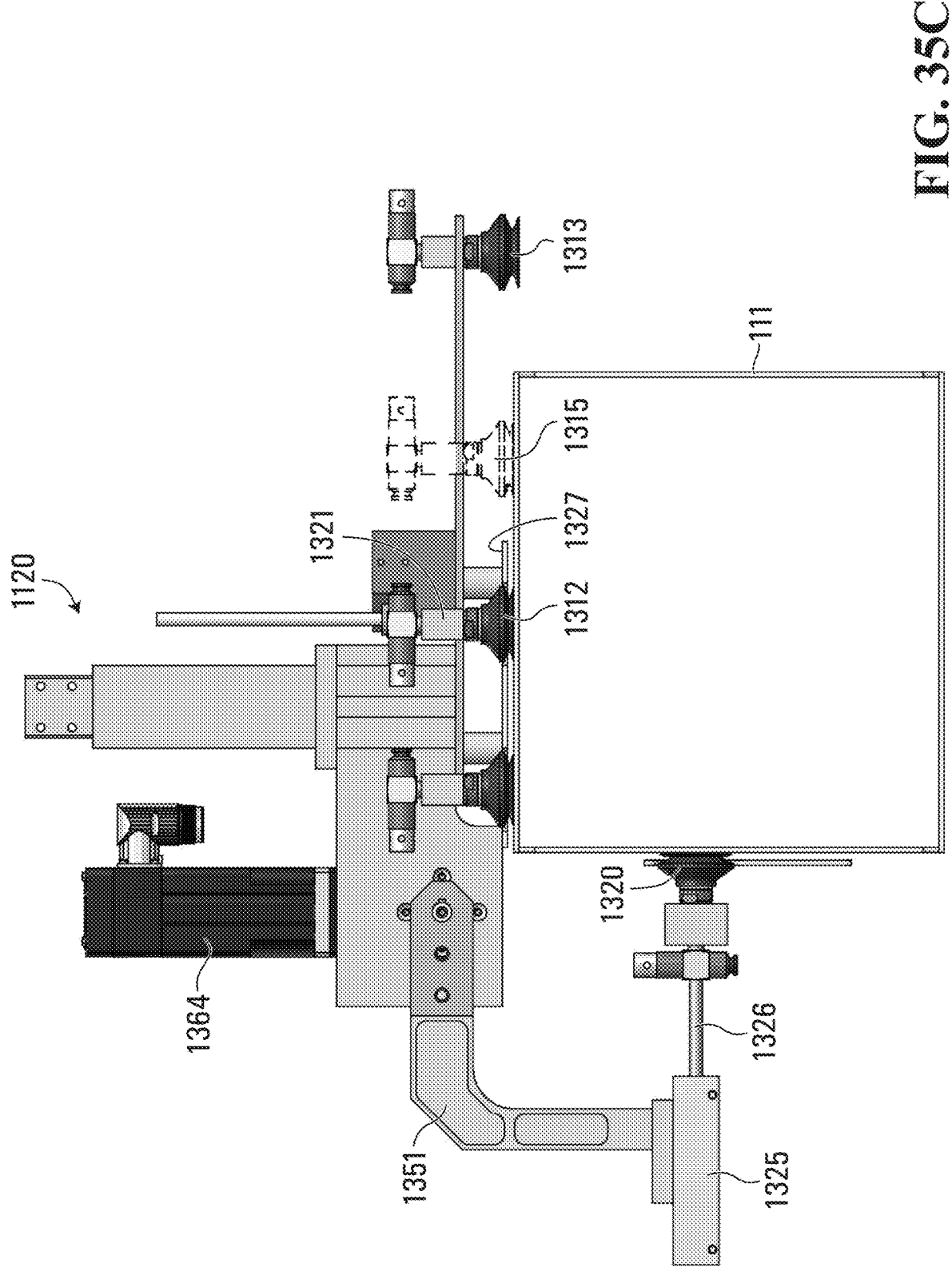

The sequence of opening a blank using erector head 1120 is shown in FIGS. 35*a*, 35*b*, and 35*c*. Actuator 1325 may be actuated to reciprocate piston arms 1326 between an extended position and a retracted position. PLC 132 may send a signal to valve device to operate actuator 1325 (like actuator 325) to extend piston arms 1326 at a particular angular position of arm 1351 and/or location of erector head 1120*b* that is provided by the encoder associated with servo motor 1364 (like servo motor 364). Similarly, PLC 132 may send a signal to valve device (not shown) to activate arms 1326 to be retracted at a particular shaft 1342 angular position, and to retract piston arms 1326 at a particular angular position, of arm 1351 and/or a particular location of erector head 1120. PLC may cause, acting through valve device, actuator 1325 to be actuated at approximately the same time as the cups 1320 have contacted the surface of downward facing panel D and/or when rotation of arm 1351 is just about to begin or has just commenced. Piston arms 1326 may be completely extended by the time arm 1351 has rotated about 45 degrees. At the same time or sometime before, rotary actuator 1350 is activated to start the rotation, the PLC may through the valve device cause suction to be released form suction cup 1313 to allow panel B of blank 111 to rotate relative to panel A.

By way of further explanation, the two erector heads of system 100 can each in turn be employed to engage and hold onto the top panel A of blank 111. Once a blank 111 is retrieved from the top of the stack of blanks, the rotator arm 1351 can be rotated approximately 180 degrees such that suction cups 1320 of rotator device 1350 can engage and hold onto the underside panel D of blank 111. Once suction cups 1320 have engaged panel D, suction at suction cup 1313 can be released and the arm 1351 can be rotated 90 degrees backwards in the opposite rotational direction and the opposing vacuum forces created by suction cups 1312 and possibly 1315 above, and suction cups 1320 below, can cause the tubular blank 111 to be moved from a flattened configuration to an open configuration as panel D is rotated substantially 90 degrees relative to panel A. The air suction force that may be developed at the outer surfaces of suction cups 1320 and 1312 and possibly 1315 will be sufficient so that when activated they can engage, hold top panel A in a stationary position relative to erector head 1120 and rotate panel D relative to panel A to open up the tubular blank to a generally rectangular configuration. The vacuum generated at suctions cups 1320, 1312, 1313 and possibly 1315, can also be de-activated by PLC 132 at appropriate times by sending signals to valve device, such as when it is appropriate to release the fully erected carton.

As with erector head 120, on erector head 1120, opening of the blank 111 may be assisted by the extension of piston arms 1326 of actuator device 1325 during rotation of the rotator arm 1351. Preferably when rotator arm 1351 has rotated somewhere in the range of about 30-60 degrees back to the 90 degree position, and preferably when it is at approximately 40-50 degrees, and most preferably when it is at about 45 degrees, then the piston arms 1326 may be fully extended. This extension of arms 1326 and thus of suction cups 1320 in a generally tangential direction relative to the rotation of arm 1351 compensates for the offset of the axis of rotation of the arm 1351 compared to the axis of rotation of the blank that extends along the fold line between panels A and D. The effect of the extension of piston arms 1326 once the arm is rotated such as to 90 degrees ensures that the panel D is also oriented at 90 degrees to panel A.

Another feature of erector head 1120 that can be noted is that a carton location sensor apparatus may be provided and may include a reciprocating sensor rod 1380 which, when not in contact with a blank, extends downwards through an aperture 1381 in plate 1327, below the level of the plane of suction cups 1312. In a manner similar to sensor rod 380 in erector head 120b, when the erector head 1120 is brought vertically downwards to retrieve a blank on a stack of blanks 111 in magazine 110, the erector head's movement just prior to suction cups 1312, 1313 and possibly 1315, contacting with the upper surface of the blank will be generally vertically downwards. Prior to the suction cups contacting the surface of a panel A of a blank, sensor rod 1380 will engage the surface of panel A which can cause the sensor rod to be pushed upwards. This movement upwards of sensor rod 1380 relative to plate 1327 will physically cause a sensor (not shown) to be activated and send a signal to PLC 132. Like in the previous embodiment, the sensor may be an inductive proximity sensor. The metal cylinder fixed on the rod is sensed by the sensor's circuitry because it changes the inductance of the induction loop inside the sensor. The sensor may be 871FM-D8NP25-P3 made by ALLEN BRADLEY. PLC 132 may respond to that signal by causing the movement apparatus (not shown but may be like apparatus 115b) to slow down so that the final few centimeters (e.g. 3.5 cm) of movement downwards towards contact between cups 1312 and the upper surface of panel A occurs at a much slower rate and also PLC knows how much further vertically downwards erector head 1120 must be lowered to establish proper contact between suction cups and panel A. It should also be that sensor rod 1380 and associated sensor device can also be used to ensure that PLC 132 is aware of whether once a blank has been engaged in the magazine 110, it stays engaged with erector head 1120 until the appropriate release location is reached, such as once erection of the carton has been completed.

With reference now to FIGS. 36 to 44, it will be observed that unlike with erector head 120, with erector head 1120, each opened blank is moved towards folding and sealing apparatus 1130 to fold both leading minor panel J and trailing minor panel K with the folding and sealing apparatus 1130.

Folding and sealing apparatus 1130 mounted to a plate 1175 forming part of frame 1109 may be constructed in the same manner as apparatus 130 mounted to frame 109, as described above. However, apparatus 1130 may be provided with an angled paddle device 1310 that is connected to a distal end of a paddle arm 1314, that may be mounted to frame 1109. Paddle arm 1314 may be connected to a shaft 1316 a rotary actuator 1399 for rotation therewith. The rotary actuator may be a double acting rotary pneumatic actuator manufactured by Festo under engineering part #DSM-32-270-CC-FW-A-B. Actuator 1399 can cause rotation of arm 1314 clockwise and counter-clockwise around its axis of up to 270 degrees. Rotary actuator 1399 may be supplied with pressurized air supplied by hoses (not shown) connected to ports 1395 and 1397. Those hoses may also be connected to a solenoid valve device (not shown) which may be controlled by the PLC 132. In this way the rotation clockwise and counter-clockwise of paddle 1310 may be controlled by PLC 132.

Figure 36:
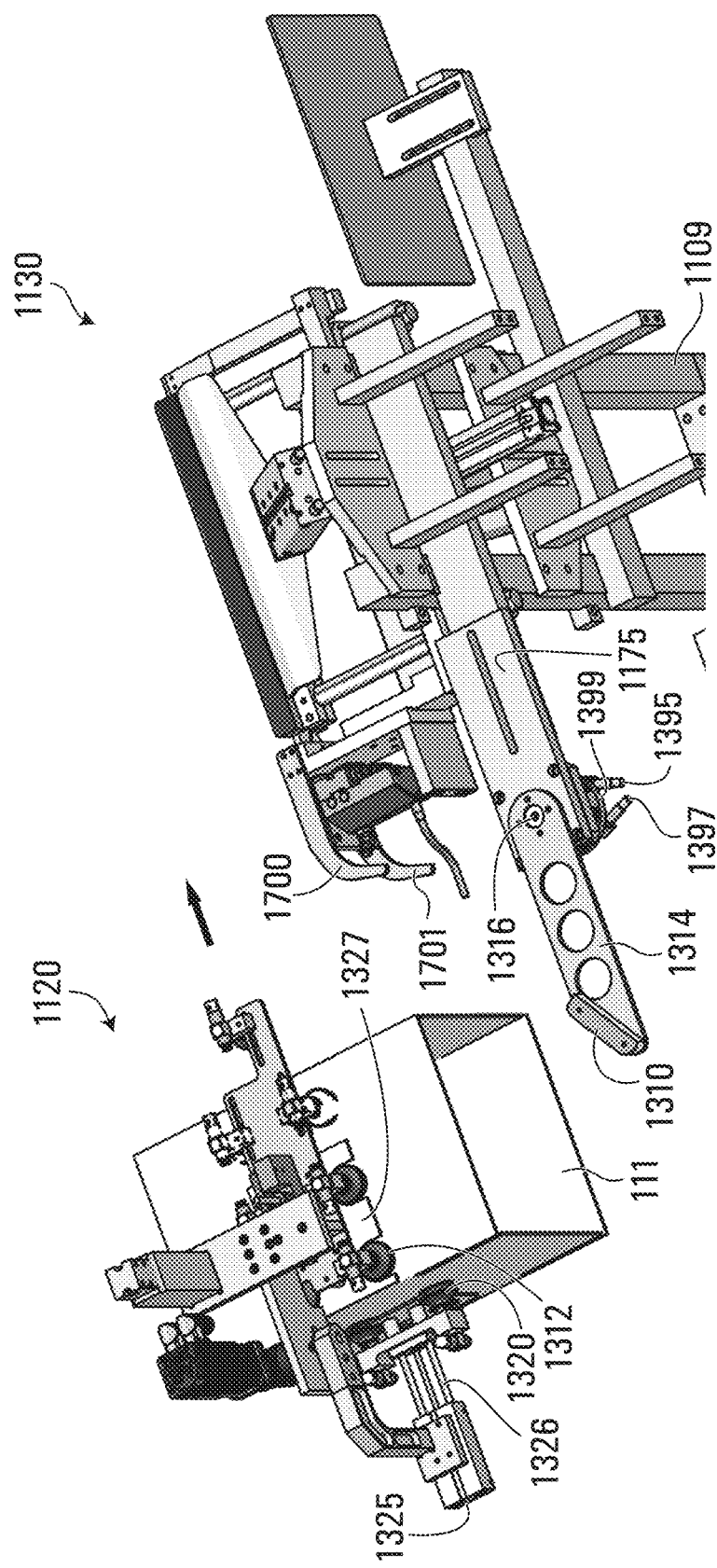
FIGS. 36-44 show the erector head of FIG. 34A and a sealing apparatus in various stages of erecting a blank and assembling it into a carton.
Figure 37:
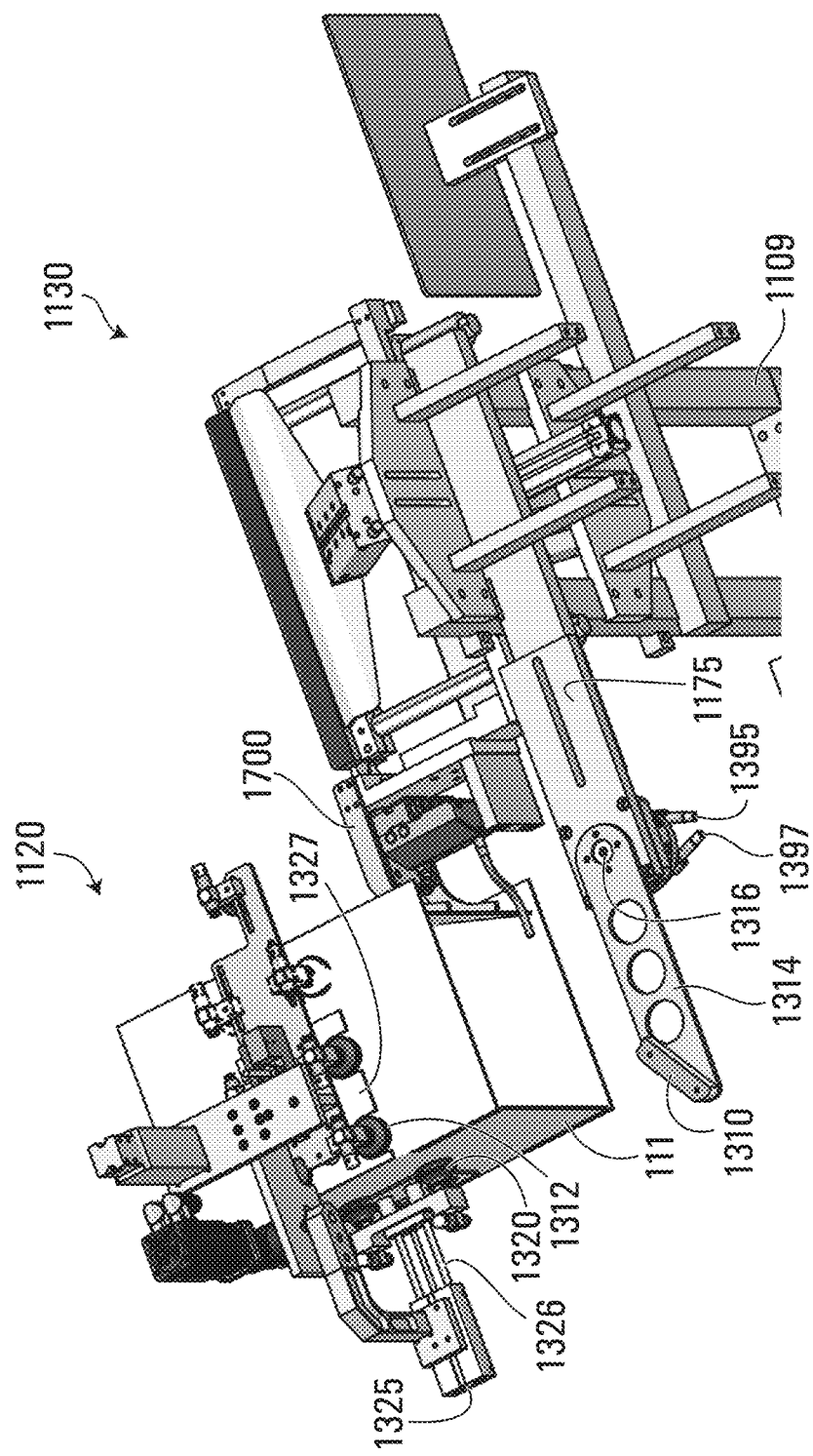
Figure 38:
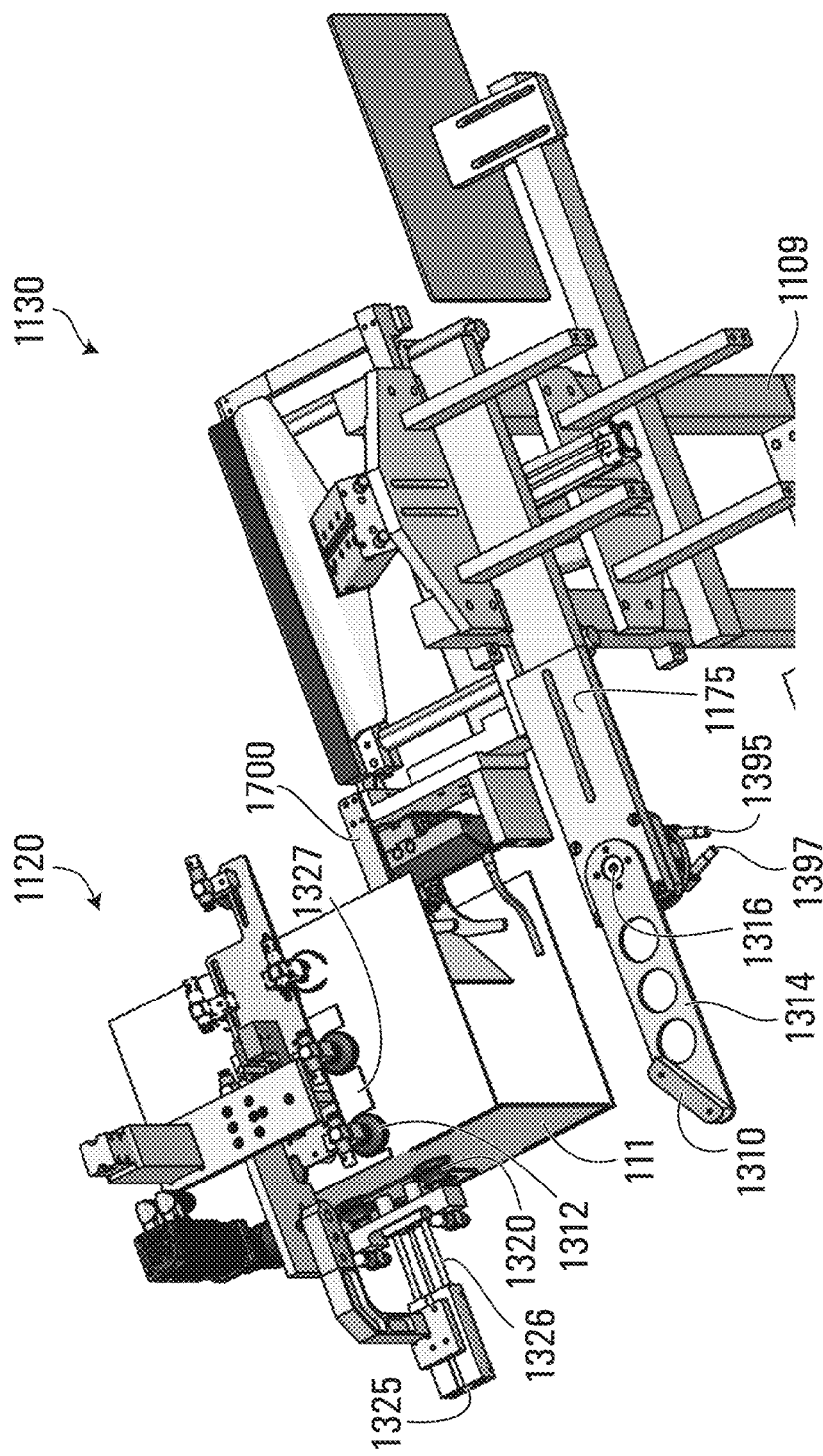
Figure 39:
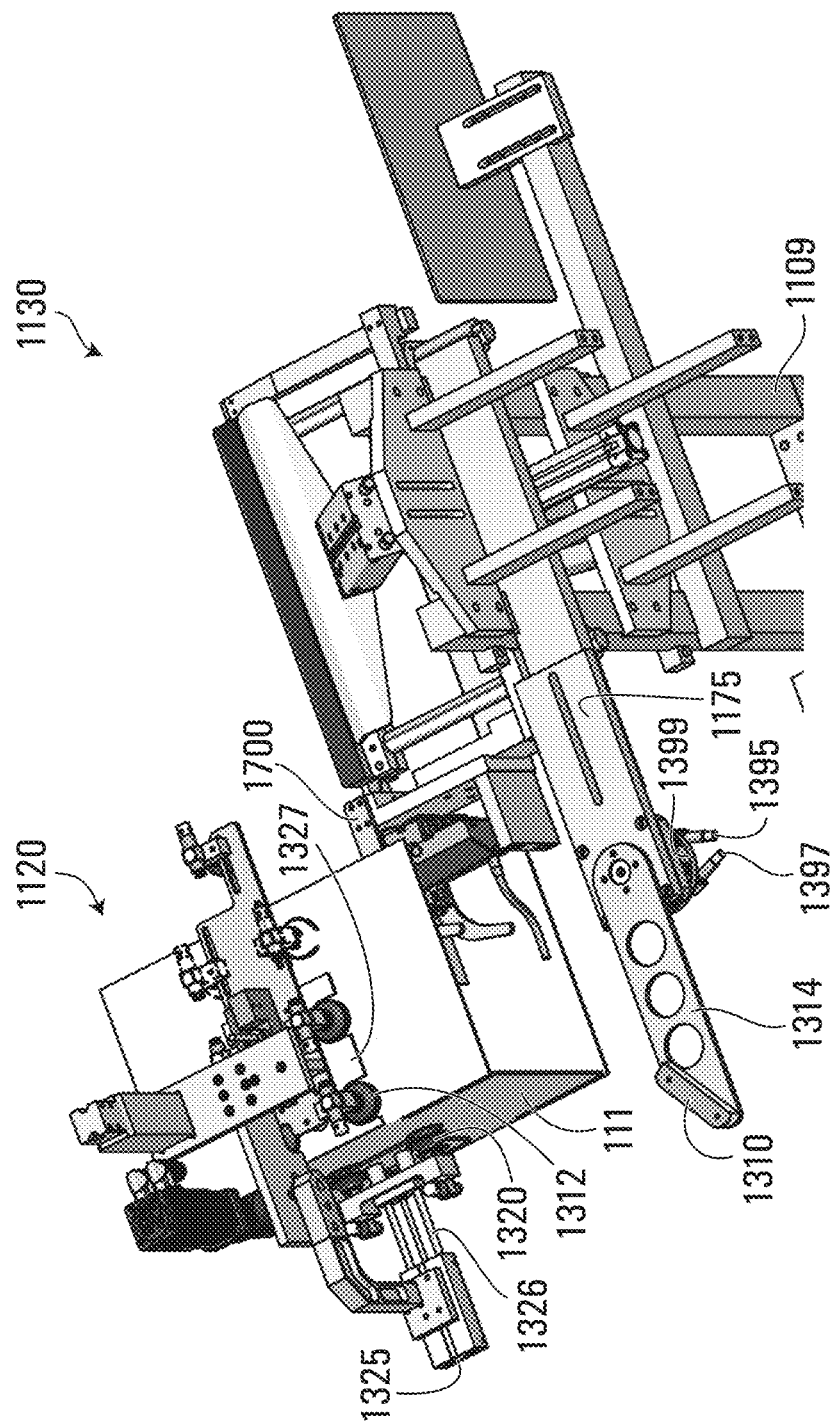
Figure 40:
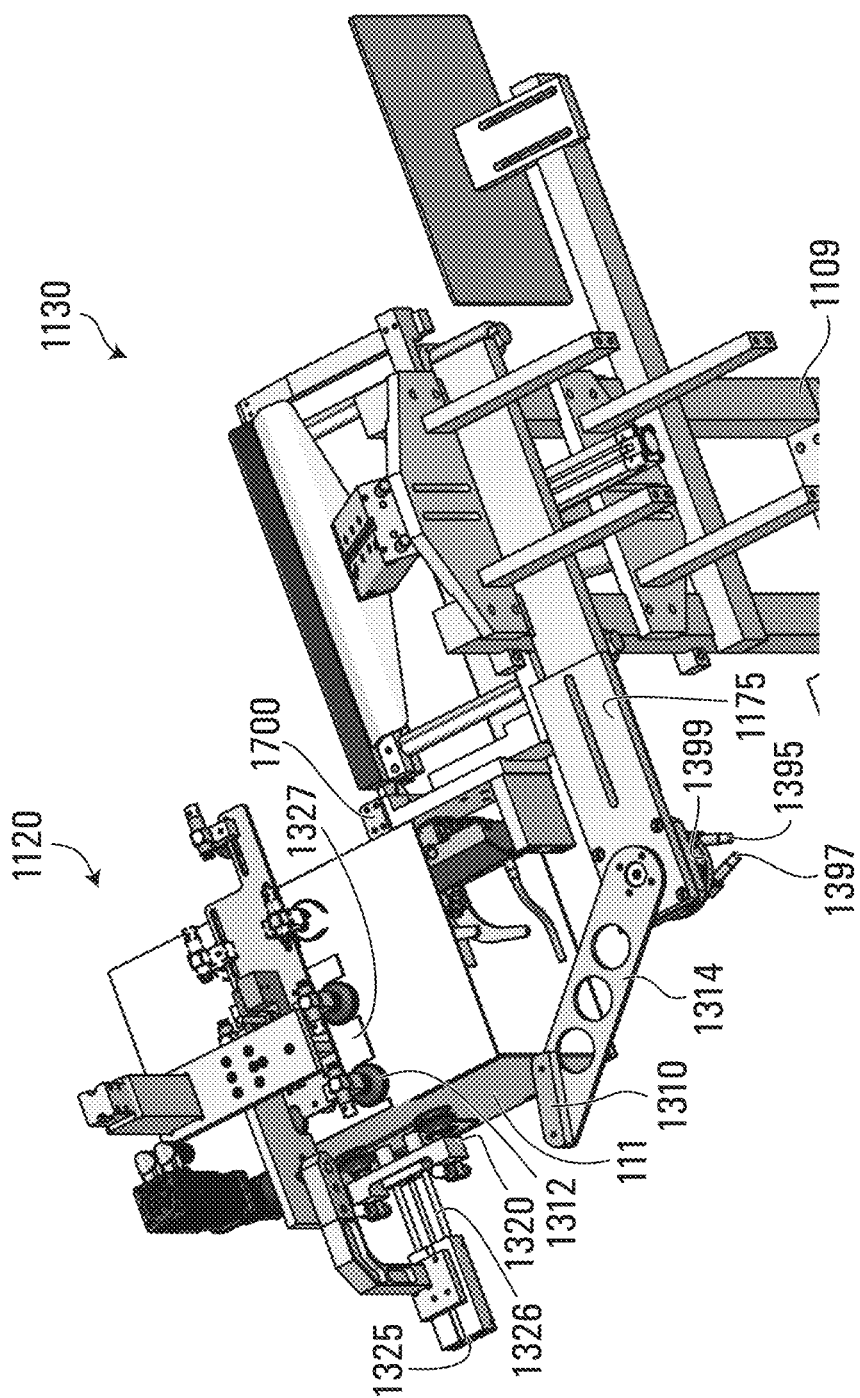
Figure 41:
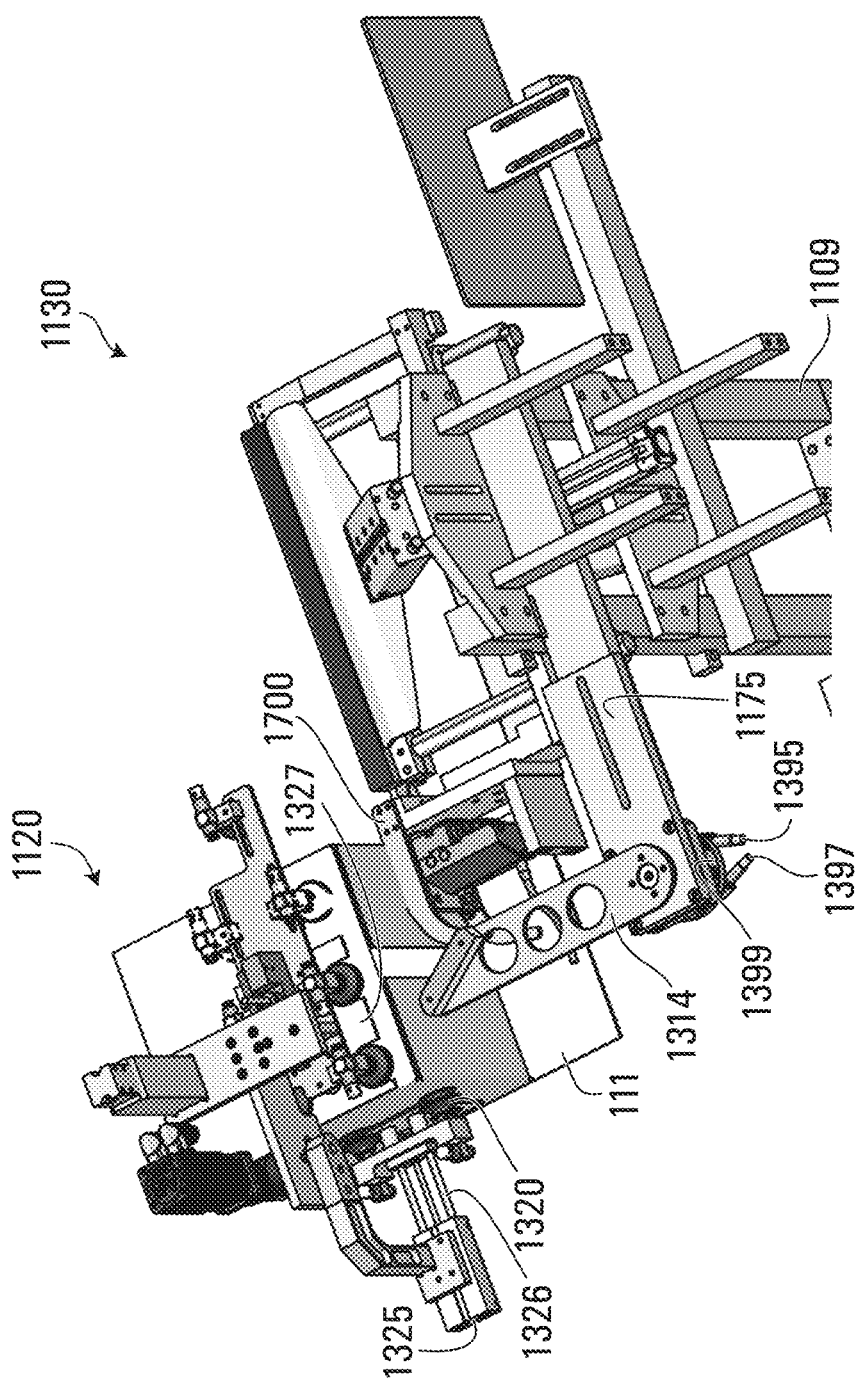
Figure 42:
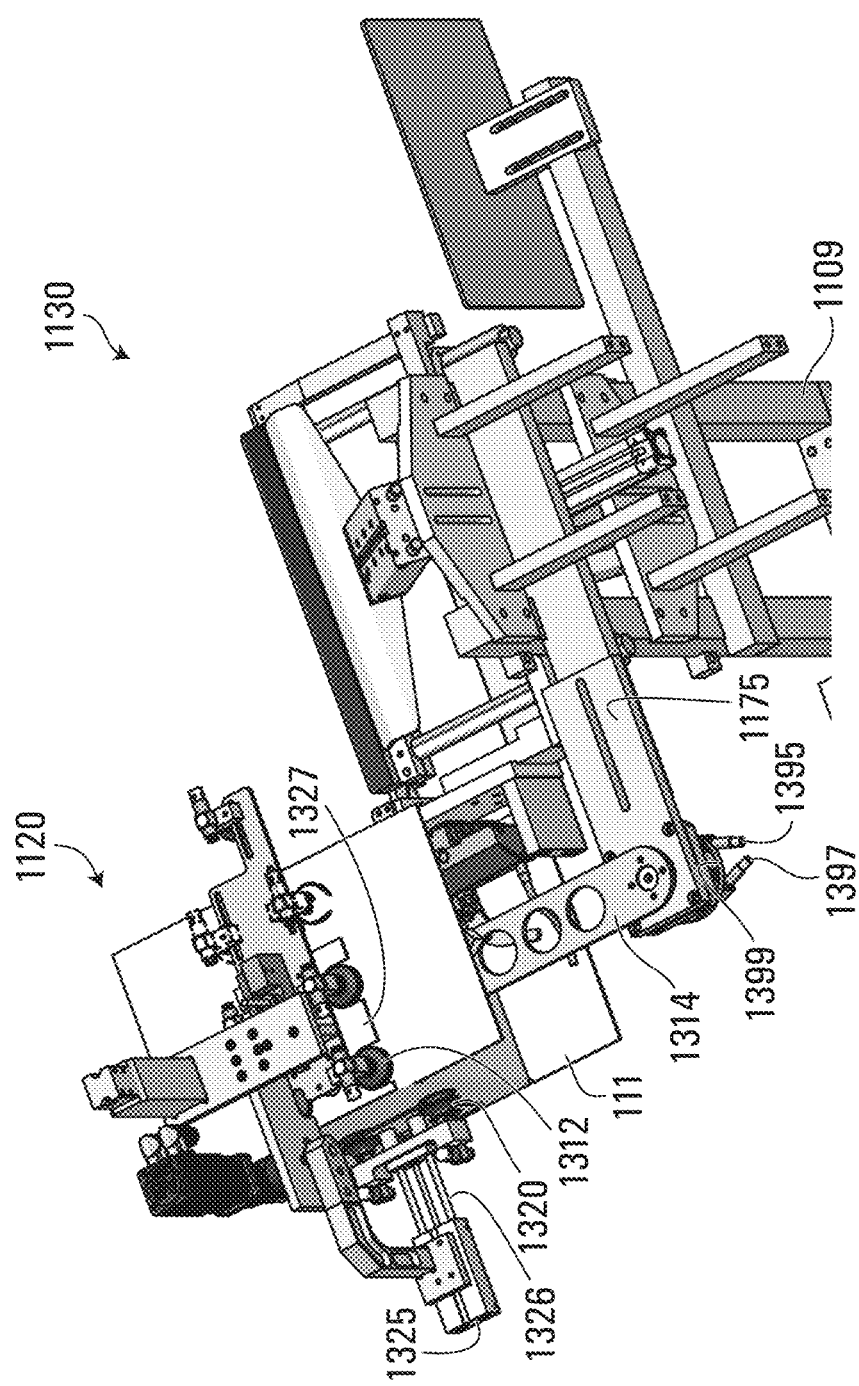
Figure 43:
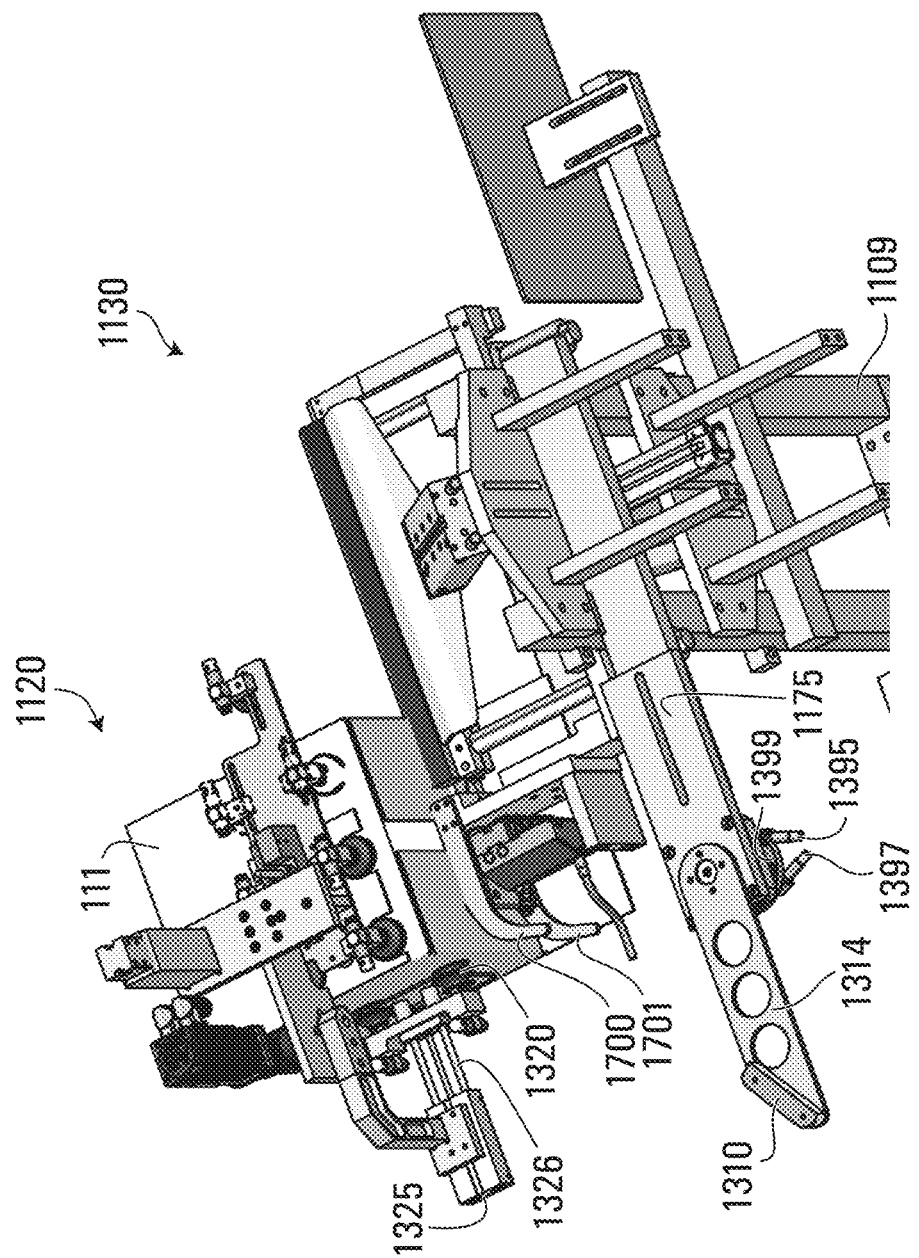
Figure 44:
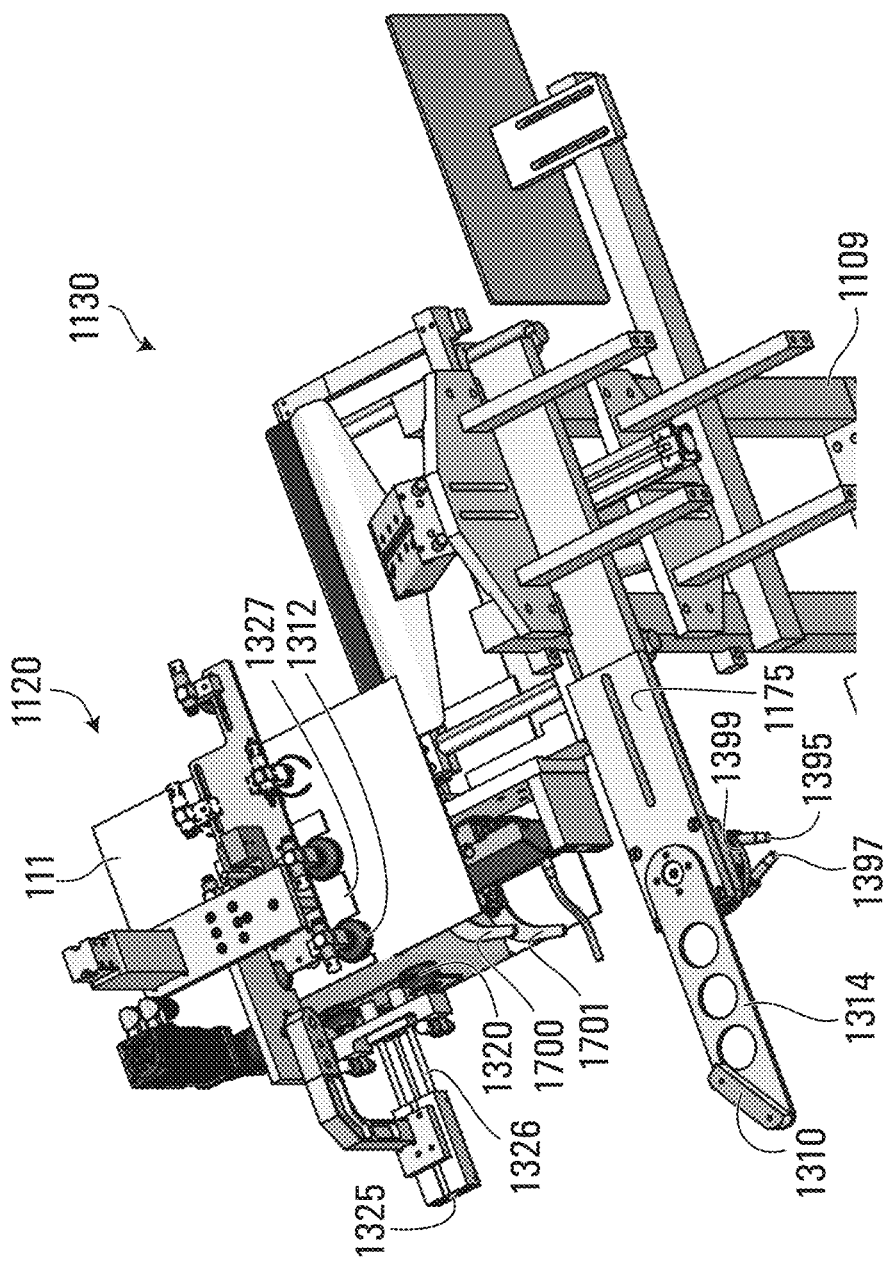

Once a blank 111 has been opened to the configuration shown in FIG. 36, then PLC 132 can send a signal to cause erector head 1120 to move towards apparatus 1130. As shown in the sequence of FIGS. 37 to 39, initially, leading minor flap J will be engaged by ploughs 1700 and 1701 to fold flap J inwards. While or after that is being completed, as shown in the sequence in FIGS. 40 to 42, next the valve device can cause actuator 1399 to rotate shaft 1316 and thus rotate arm 1314 with paddle 1310 attached thereto. Paddle 1310 can then engage trailing flap K of blank 111 and cause it to fold about its fold line where it joins to panel D. Thus flap K can be folded inwards towards the bottom opening of blank 111. Thereafter as shown partially in FIGS. 43 to 44, the carton blank 111 held by erector head 1120b can be moved longitudinally further downstream into the folding and sealing apparatus 130 where the minor flaps may be glued and the major top and bottom flaps F and G may be folded inwards and compressed, in substantially the same manner as described above in relation to erector head 120b and movement apparatus 115b.

The particular arrangement of suction cups and rotating paddle on erector heads 1120 can be designed based upon the configuration of the carton blank and the particular panels and flaps that need to be rotated. It will also be appreciated that on erector head 1120 that is illustrated, suction cups are used to apply a force to hold and/or rotate panels of a carton blank. However alternative engagement mechanisms to suction cups may be used.

Figure 50:
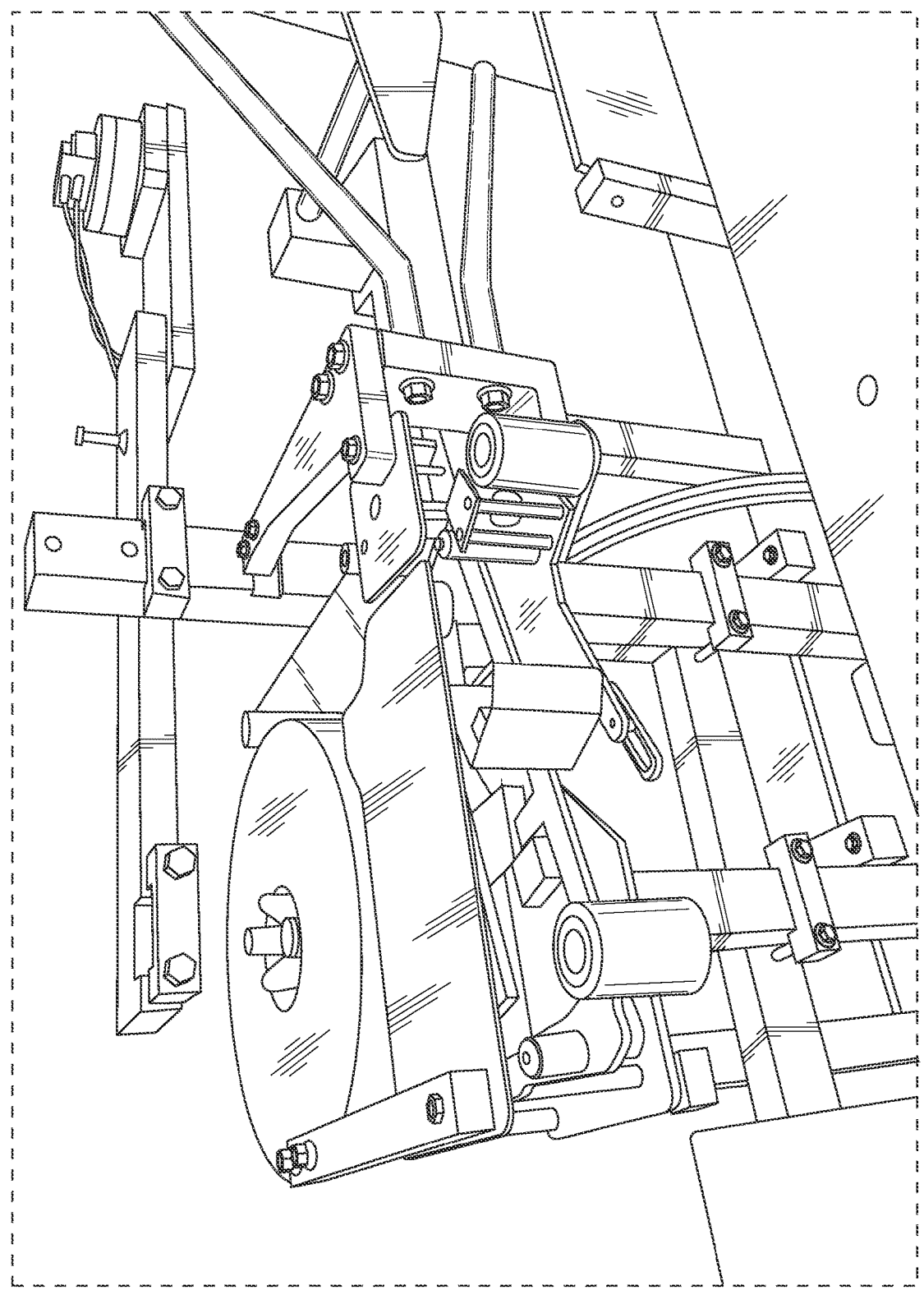
FIGS. 50-52 are perspective views of an alternate folding and sealing apparatus that may be used in some embodiments of the invention.
Figure 51:
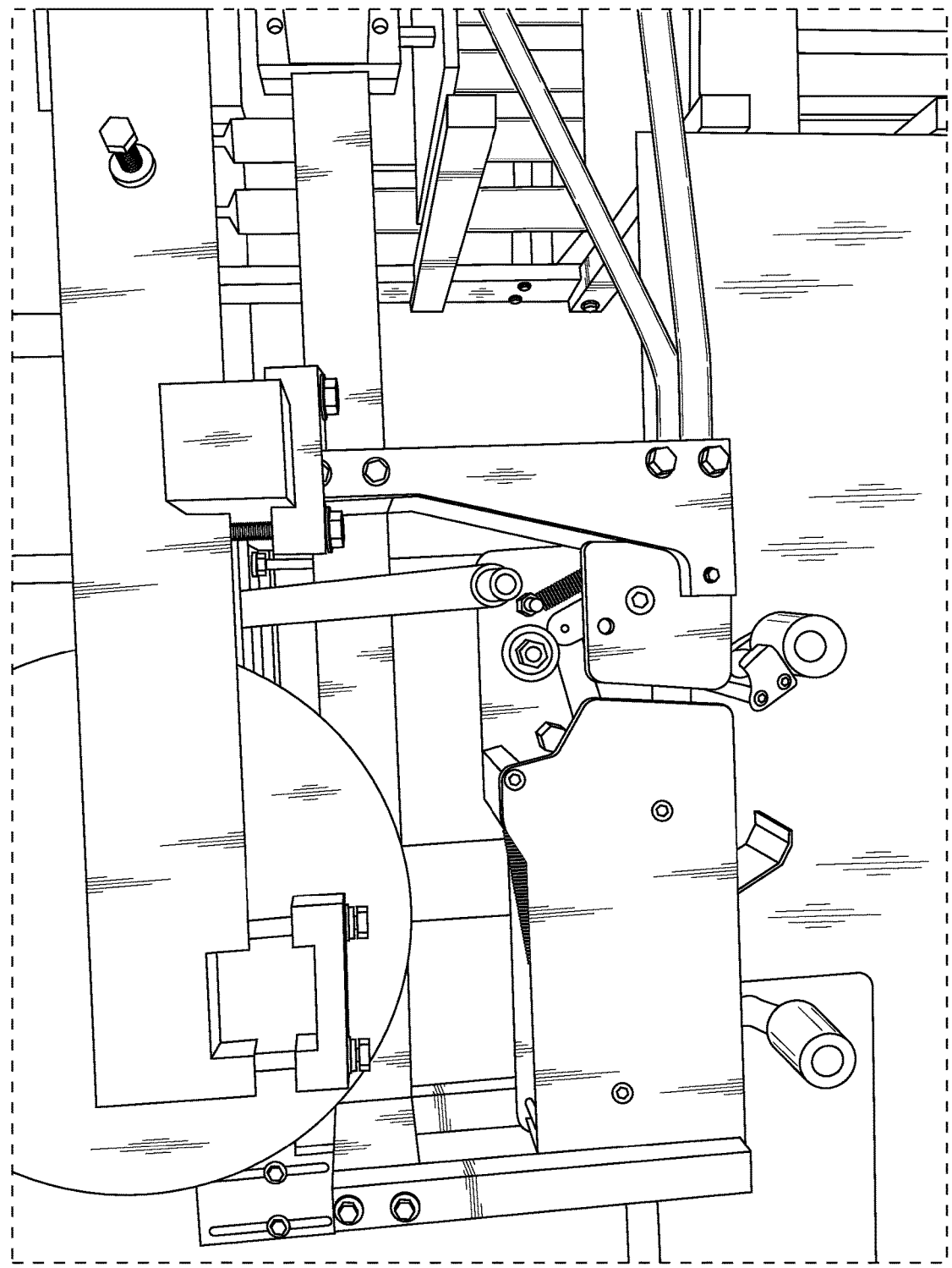
Figure 52:
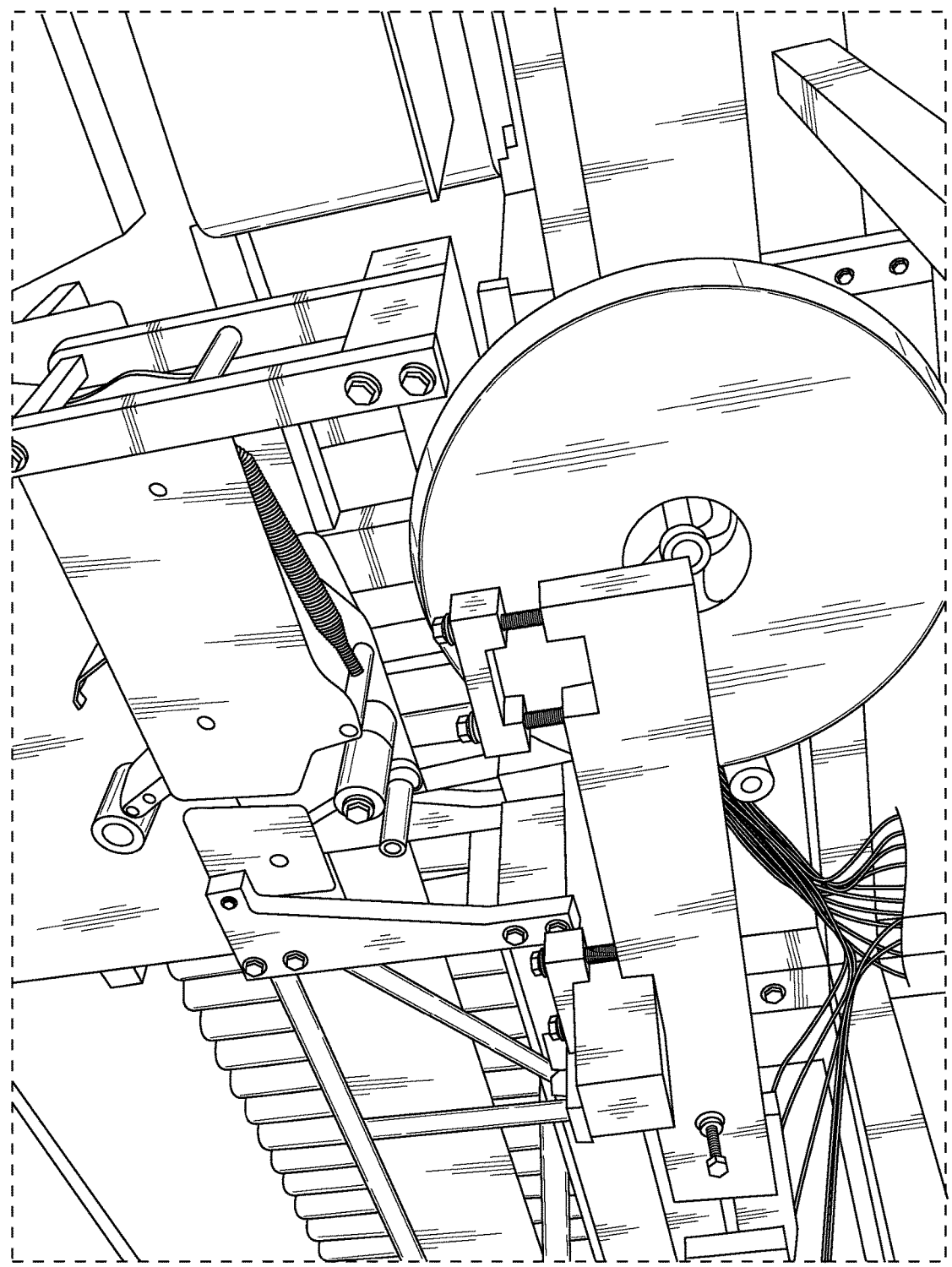
Figure 53:
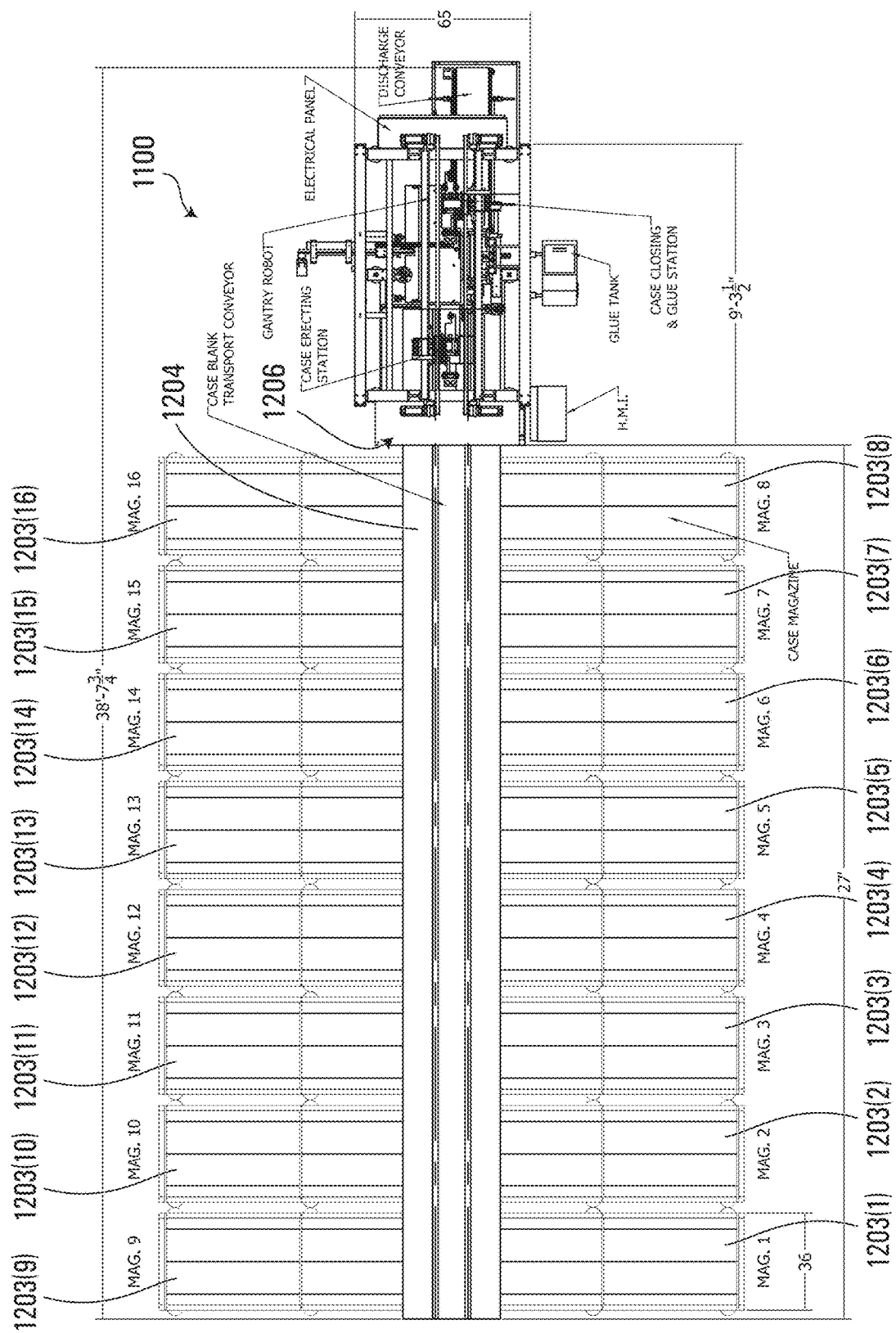
FIG. 53 is a plan view of case former that is an alternate embodiment to the carton/case forming system of FIGS. 1 to 44 with some components of the case magazines omitted for clarity

In some embodiments, the flaps of the blank may be sealed by means other than a glue applicator. For example, it is possible to configure folding and sealing apparatus with an adhesive tape applicator that may apply tape to the bottom of the box once all minor and major flaps have been folded. In such an embodiment, compression of the flaps at the bottom of the erected carton may not be necessary. An example of such a set up is illustrated in FIGS. 50 to 52. In this embodiment the folding and sealing stations like station 130 have been replaced by a folding and sealing station that includes a middle plough for folding a leading minor flap.

Thus both minor flaps can be closed by the middle plough for the leading minor flap and a paddle device like those described above for the trailing minor flaps. Upper and lower ploughs can be provided to fold over top of the minor flaps and then the moving apparatus can move an erector head 120 carrying an opened and flap folded blanks against the operational surface of an adhesive tape applicator. An example of a tape applicator that could be adapted for such use is a model Z59-557 supplied by Dekka Industries Inc. The folded bottom of the opened blank can then be moved longitudinally against the carton blank and tape could be started to be applied at a lower portion of panel B, over and along the middle join between flaps F and G, and the terminate at a lower portion of panel D.

Figure 45:
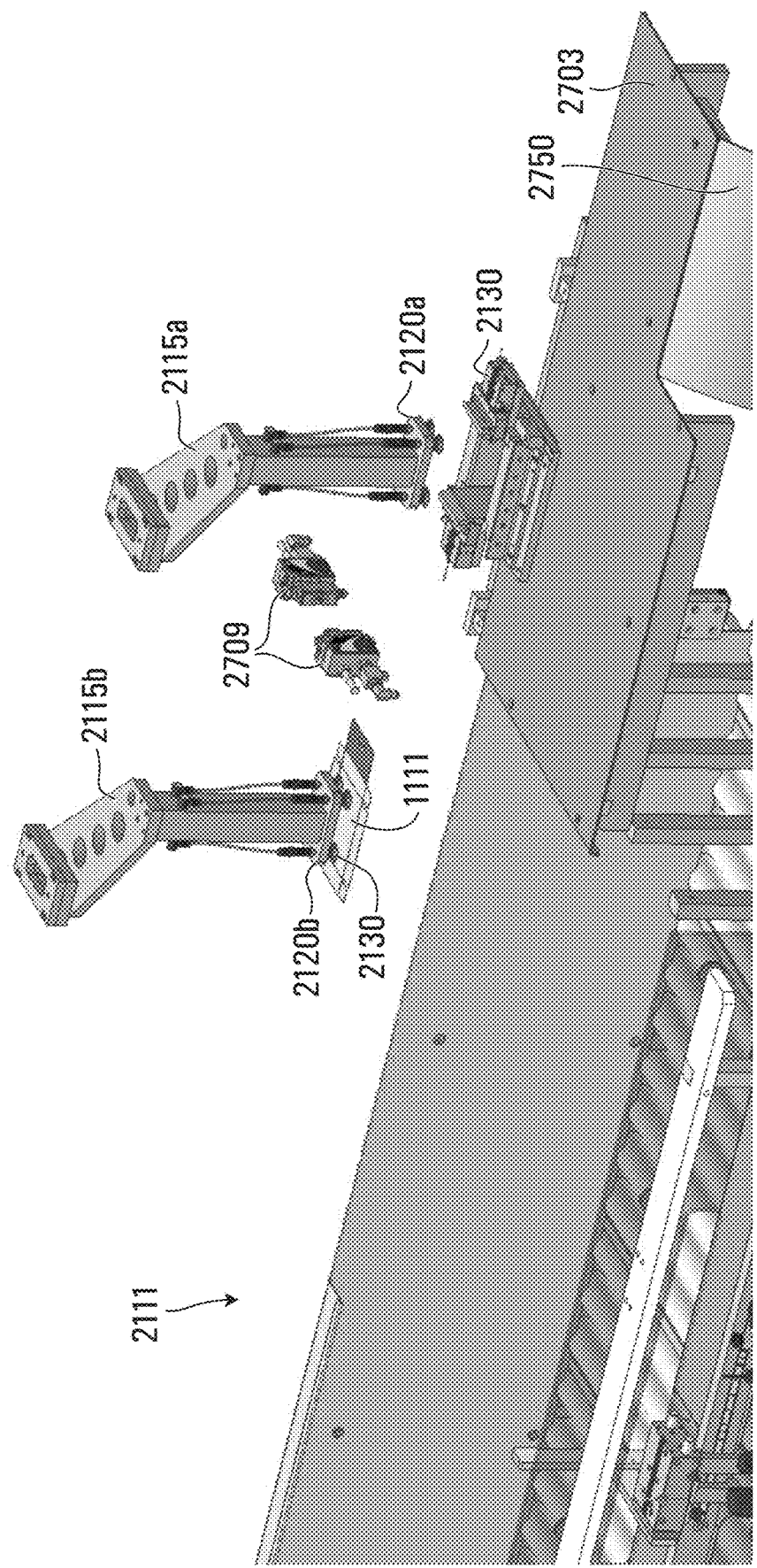
FIG. 45 is a schematic perspective view showing an alternative embodiment of a carton forming system; and in particular alternate erector heads, their corresponding moving apparatus and folding apparatus.
Figure 46:
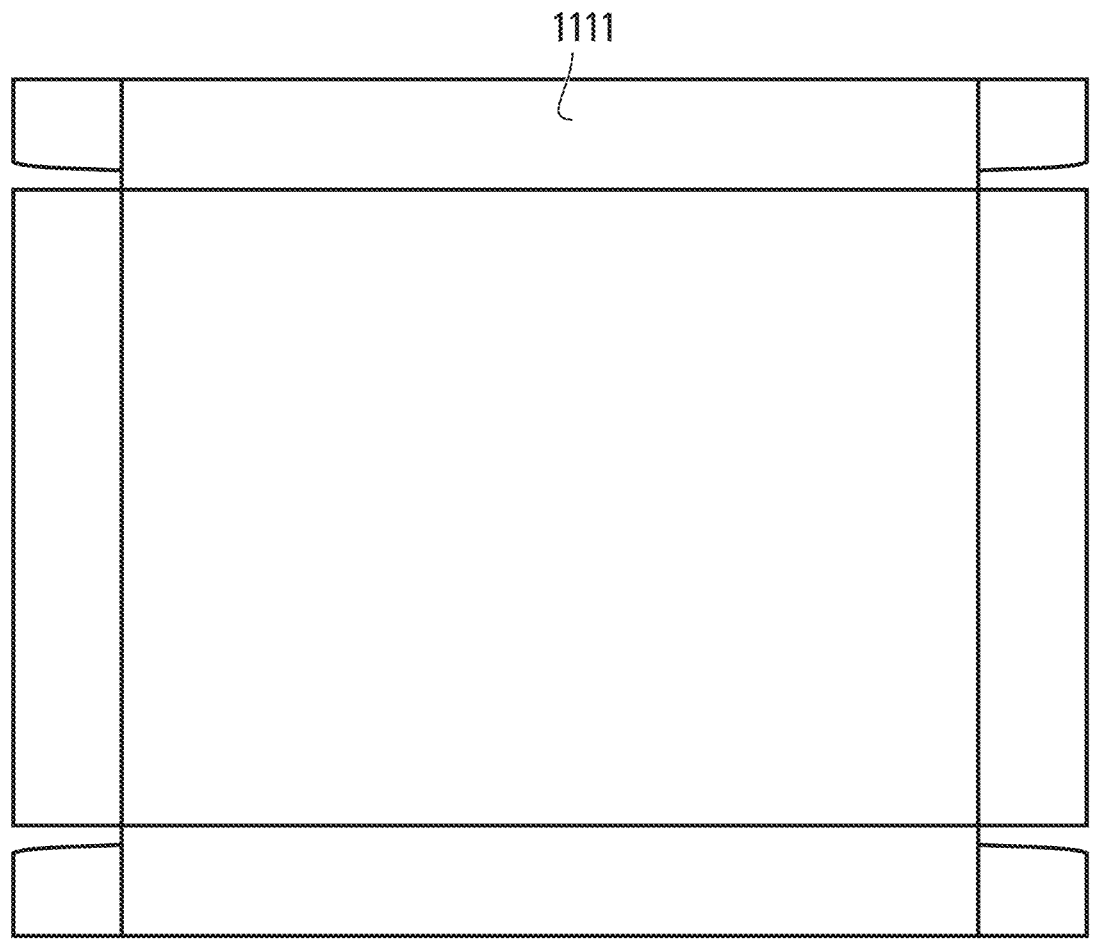
FIG. 46 is a plan view of a blank for a tray that may be processed according to some embodiments of the system.

In another embodiment, shown only schematically in FIG. 45, the system could be modified to employ one or more moving apparatuses 2115*a*, 2115*b* that may be substantially the same as moving apparatus 115*a*, 115*b*, and a magazine 2110 that may be substantially like magazine 110. However, folding and sealing apparatus 130 or 1130 could be replaced/ or another device could be inserted above a support plate 2703 that has a discharge chute 2750. A blank shoe device 2130 may be configured with interior guides. Erector head 2120*a*, 2120*b*, may be simplified devices controlled by PLC 132 which have only four suction cups 2130 that may be arranged in a generally rectangular configuration. Erector heads 2120*a*, 2120*b* may be readily interchanged in system 100 illustrated and described above for erector heads 120*a*, 120*b* and PLC 132 may operate another sequence of operations on erector heads 2120*a*, 2120*b* to process a blank 1111 (see FIG. 46) that may be used to form an open top tray. Suction cups 2130 may engage a blank 1111 that is configured to be formed into an open top tray. The moving apparatuses 2115*a/b* may move a blank secured to a head 2120*a/b* longitudinally from the magazine where it is retrieved from a stack of blanks, through opposed glue applicators 2709 which may apply a suitable adhesive to flaps and then move the blank above shoe device 2130. The moving apparatus may then move the blank downwards through the shoe device 2130 causing the flaps to be folded and they can be held within the shoe for a sufficient time to allow the glue to set. Thereafter continued movement downwards can push the blank clear of the shoe device 2130 and then suction cups can release the blank which can then fall onto support plate 2703. Thereafter the blank can be moved for example by a blow-off nozzle discharging high pressure air (under control of PLC 132 through a valve device interposed in pressurized air hoses) to discharge the blank to chute 2750 for transfer to a discharge conveyor.

Figure 47:
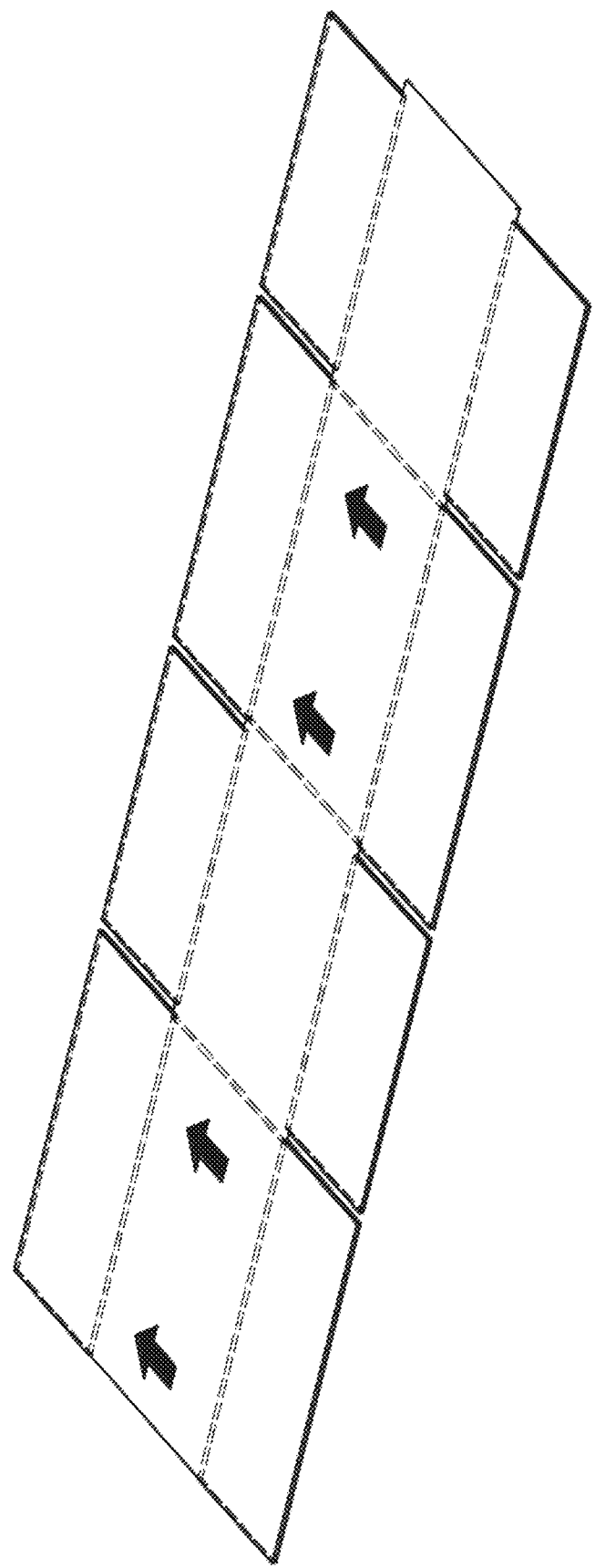
FIG. 47 is a perspective view of a blank for an overwrapping regular slotted case (RSC) that may be processed according to some embodiments of the system.
Figure 48:
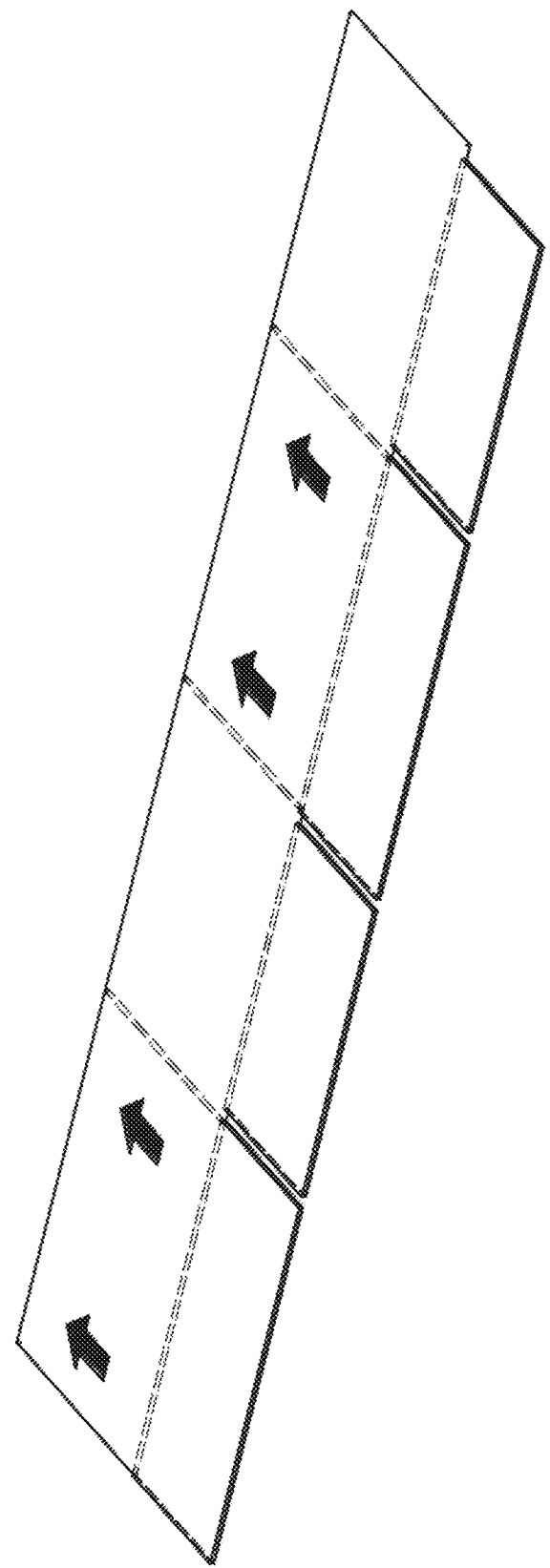
FIG. 48 is a perspective view of a blank for an overwrapping regular slotted case (RSC) that may be processed according to some embodiments of the system.
Figure 49:
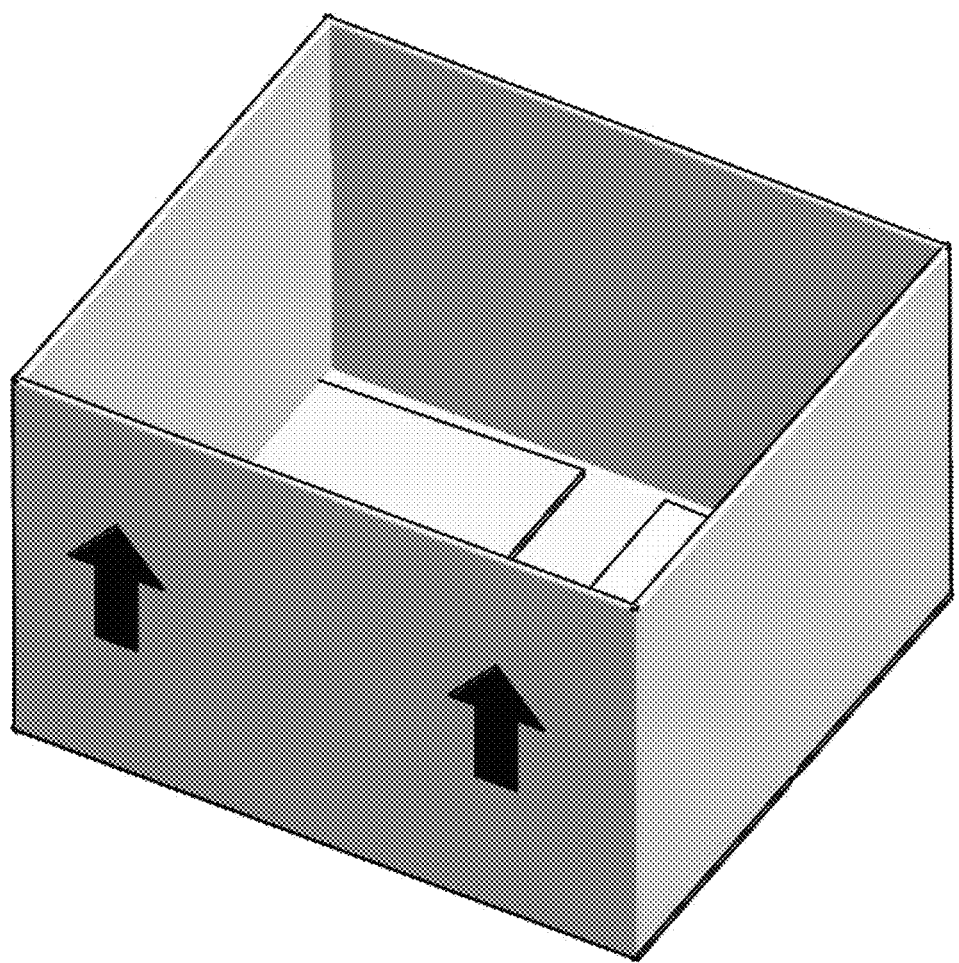
FIG. 49 is a perspective view of an HSC case that may be formed according to some embodiments of the system.

It will be appreciated that by making a relatively small number of changes to the components of the system, the system can be altered from being able to process blanks for open top cartons to being able to process blanks that can be turned into open top trays. Examples of other blanks that may be processed, cartons that may be formed are illustrated in FIGS. 47, 48 and 49 and include blanks for wrap around half slotted cases (HSC) and HSC blanks, as well as blanks for a wrap around RSC.

Figure 58:
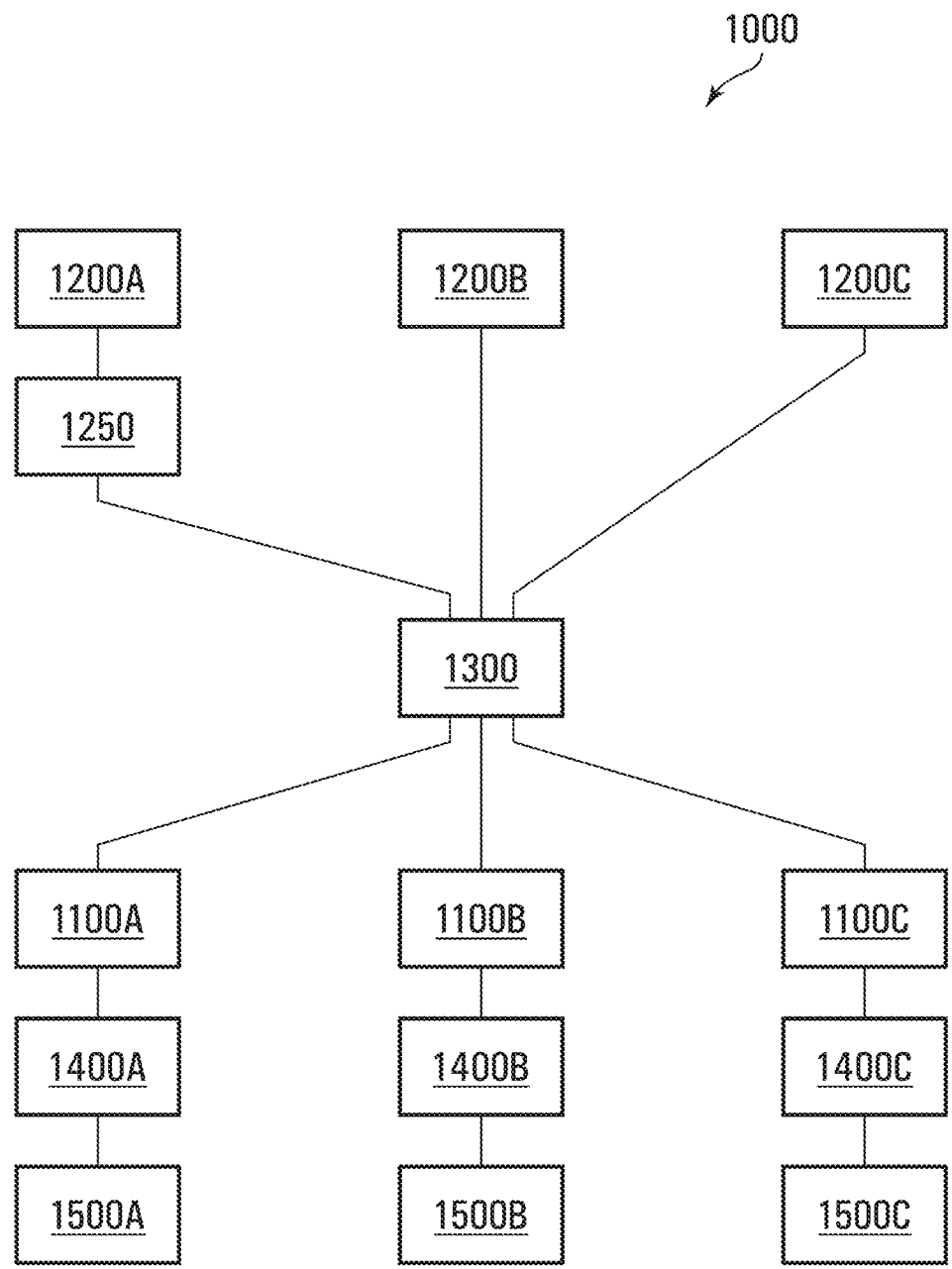
FIG. 58 is a schematic diagram illustrating an order fulfilment system.

Turning now to FIG. 58, an order fulfilment system generally designated 1000 may include several components including an order fulfilment processor 1300, and corresponding sets of case formers 1100A, 1100B and 1100C, case loaders 1400A, 1400B and 1400C and case sealers 1500A, 1500B and 1500C. A plurality of customer order devices 1200A, 1200B and 1200C may be provided that may be linked with order fulfilment processor 1300. Customer order device 1200A may for example be a telephone that may be capable of communication with a call center 1250. Call center 1250 may be adapted to receive orders from customer operating customer order device 1200A and then by virtue of call center software, a call center operator may input an order for one or more products that may be communicated by a communication link to order fulfilment processor 1300. Customer order devices 1200B and 1200C may for example be personal computing devices including mobile phones, personal computers, etc. that may be capable of direct communication such as by communication over a wireless and/or land-based communication network with order fulfilment processor 1300. This network may, for example, an IPv4, IPv6, X.25, IPX compliant or similar network. Thus, this network may be the public Internet. Through operation of appropriate software on the customer order devices 1200B, 1200C and order fulfilment processor 1300, the customer order devices 1200B, 1200C may be adapted to input an order for one or more products into order fulfilment processor 1300. For example, customer order devices 1200B and 1200C may be adapted to execute a suitable HyperText Transfer Protocol (HTTP)-enabled browser to access data and services provided by an HTTP server application executed by order fulfilment processor 1300, and thereby input orders for one or more products into order fulfilment processor 1300.

Order fulfilment processor 1300 may be a mainframe computer, a server, or other computing device capable of processing customer orders received directly or indirectly from customer order devices 1200A-C. Order fulfilment processor 1300 may include a database that includes information that may be stored in a suitable memory therein including information relating to: (a) information/details of all products that may be ordered by a customer through system 1000 including one or more characteristics of each product such as the physical volume occupied by the space and/or the actual physical dimensions (e.g. height, width, length, and/or diameter) of each product (such as the dimensions of the box in which one or more items is held), optionally the weight of each product, and further optionally product codes associated with each product, such as a Universal Product Codes (UPC) or, if the product is a book, an International Standard Book Number (ISBN); (b) information/details of each of a plurality of types/sizes/configurations of cases/case blanks that can or are being used in system 1000 to package one or more products ordered by a customer including the dimensions of each type of case/case blank; (c) information/details of each case former (e.g., case formers 1100A-C), including information/details of the cases that each case former is capable of forming (such as the type, size and/or configuration), and optionally when a case former includes multiple magazines, as detailed below, the type, size and/or configuration of case blank provided in each of those magazines and the corresponding type, size and/or configuration of case that can be formed from each type of case blank, and further optionally the quantity of case blanks provided in each of those magazines; (d) information/details about each customer including the name of the entity and shipping address to which an order fulfilled by system 1000 is to be shipped and (e) information/details about where each product is located in a product storage facility such as a warehouse building holding products that may be ordered.

As noted, order fulfilment processor 1300 may also include an HTTP server application adapted to provide database information to customer order devices 1200B and 1200C, and to receive orders from customer order devices 1200B and 1200C. Some or all of the aforementioned information/details may be input into order fulfilment processor 1300 manually by an operator of system 1000. Additionally or alternatively with respect to information/details of each available case may be updated periodically or on an ongoing basis. PLC 132 of each carton former 1100A-1100C may during operation, be adapted to monitor the status of the case blanks in its magazine(s) and provide information relating to that status to order fulfilment processor 1300. In this way, order fulfilment processor 1300 may be continually provided with up-to-date information on available case blanks that are in the magazines of each of the carton formers.

Order fulfilment processor 1300 may also include a product packaging utility/product packaging software module that identifies a suitable type of case (or types of cases) for packaging the products in an order placed by a customer from a plurality of available cases. An example of such a product packaging utility is disclosed in U.S. Pat. No. 6,876,958 to Chowdhury et al., issued to assignee New Breed Corporation on Apr. 5, 2005 (hereinafter, "Chowdhury"), the contents of which is hereby incorporated by reference herein in its entirety. In particular, Chowdhury's product packaging utility processes each order placed by a customer to automatically identify, from available case types/sizes/configurations, a type/size/configuration of suitable case (or cases) suitable for packaging the products in the order. Chowdhury's product packaging utility identifies/determine suitable case(s) according to an algorithm/function that accesses and uses one or more electronically-stored characteristics of each product in the order (e.g., dimensions, weight, etc.) and one or more electronically-stored characteristics of available case types (e.g., dimensions, size, configuration, type, maximum volume that can be held, maximum weight that can be held, etc.). This algorithm identifies suitable cases such that a minimum number of cases and the smallest size cases suitable for packaging the products in the order may be provided. Thus, identification of suitable case types/sizes/configurations can be optimized to provide an optimal case type/size/configuration which minimizes packaging material used and to minimize empty space in cases, and a case identified as suitable may be referred to as an "optimal" case. It will be appreciated that identification of suitable case types/sizes/configurations may also be identified or optimized according other pre-defined criteria. The case identification algorithm of Chowdhury's product packaging utility may also take into account other factors and constraints such as, e.g., the availability of each type/size/configuration of case, the maximum fill ratio of each type/size/configuration of case, the maximum number of products that can be placed into each type/size/configuration of case, and whether certain products are pre-packaged together and therefore must be placed in the same case. Thus, when order fulfilment processor 1300 includes a product packaging utility such as Chowhury's product packaging utility, order fulfilment processor 1300 may process a customer order for specific products by accessing information in it memory and utilizing an algorithm/function to identify a suitable case (or cases) for packaging those products from a plurality of available cases.

It should be noted that the size of the case may be the overall internal available volume of the case in which items may be held. The size may also be the specific dimensions of the case. The type of case may include the reference to what material the blanks is made from (e.g. paperboard or corrugated cardboard). Its configuration may an indication of it being a top opening case which is generally cuboid in shape when closed, or another configuration such as a regular slotted case, etc.

Chowdhury's product packaging utility may also generate, for each case of a particular type/size/configuration identified to fulfil an order, a packing list indicating the order in which each of the products is to be preferably placed into the case, as well as placement information indicating where each product is to be preferable placed in the case. For example, this placement information may be expressed using coordinates (e.g., 0, 0, 0) in a coordinates system defined for the case and/or descriptors of locations in the case (e.g., front, right hand side, second layer, etc.). Thus, when order fulfilment processor 1300 includes a product packaging utility such as Chowdhury's product packaging utility, order fulfilment processor 1300 may generate a packing list and/or placement information for each identified case. Order fulfilment processor 1300 may also generate a diagram illustrating a desired optimal physical arrangement of the products in each case. Such a diagram may be readily generated using placement coordinates for each product, as provided by Chowdhury's product packaging utility.

For each case of a particular type identified to fulfil an order, order fulfilment processor 1300 may also be configured to be able to select one of case formers 1100A, 1100B or 1100C to form a suitable case of the type/size/configuration identified by order fulfilment processor 1300. Order fulfilment processor 1300 may access and use information stored in its memory regarding the suitability of the case formers to handle an identified suitable case. For example, suitability of a case former may be determined by order fulfilment processor 1300 based on stored information regarding whether the case former includes magazines designated to hold the types/size/configuration of case blanks required forming the identified case. Suitability of a case former may also be determined based on stored information regarding the quantity of the required type/size/configuration of case blank in a magazine of the case former. Such quantities may be measured using suitable sensors placed at each case former, and updated during operation. Alternatively, order fulfilment processor 1300 may simply select a case former randomly or according to a pre-defined sequence.

Once a suitable case former (e.g., one of case formers 1100A, 1100B or 1100C) has been selected, order fulfilment processor 1300 may generate a Fulfilment Order data structure (e.g. a file, object, message or the like) containing information for/instructions to the case former to form and label a required case. A generated Fulfilment Order data structure may be communicated by a communication link to the PLC of one of the case formers 1100A, 1100B or 1100C.

The Fulfilment Order data structure may include indicators indicating (i) the type/size/configuration of case determined by the product packaging utility that is required to be formed and labelled by the case former 1100A, 1100B, 1100C; (ii) the particular magazine of the case former containing case blanks for forming the required suitable case; (iii) a list of the particular product(s) from the customer order being fulfilled that are required to be loaded into the required case once formed, optionally identified by associated product codes and optionally arranged in the order in which the products should be loaded into the case once formed; (iv) optionally information such as packing list or a diagram illustrating/specifying a desired optimal physical arrangement of the products in loading the case; (v) optionally the location in the storage facility/warehouse building of each particular product from the customer order being fulfilled; and (vi) customer shipping information for that case indicating the destination name and address for that case. In some cases, the Fulfilment Order data structure may include information for multiple cases to be handled by the selected case former.

A Fulfilment Order data structure may be received and processed by the PLC of the case former to which the data structure is sent. In particular, the PLC of the case former processes the Fulfilment Order data structure to identify a requested type/size/configuration of case (or cases) to be formed, the particular magazine of the case former containing case blanks for forming each required case, and the contents of the label (or labels) to be applied. Once a required suitable case and the particular magazine containing case blanks for forming the required suitable case have been identified, the PLC of the selected case former 1100A, 1100B or 1100C can then cause a suitable case blank to be formed into the requested type/size/configuration of case and labelled, as further described hereinafter.

Optionally, the data structure may be stored in memory of the PLC of the case former or in memory of order fulfilment processor 1300 for later retrieval when the order is picked and packed, as described below.

Figure 62A:
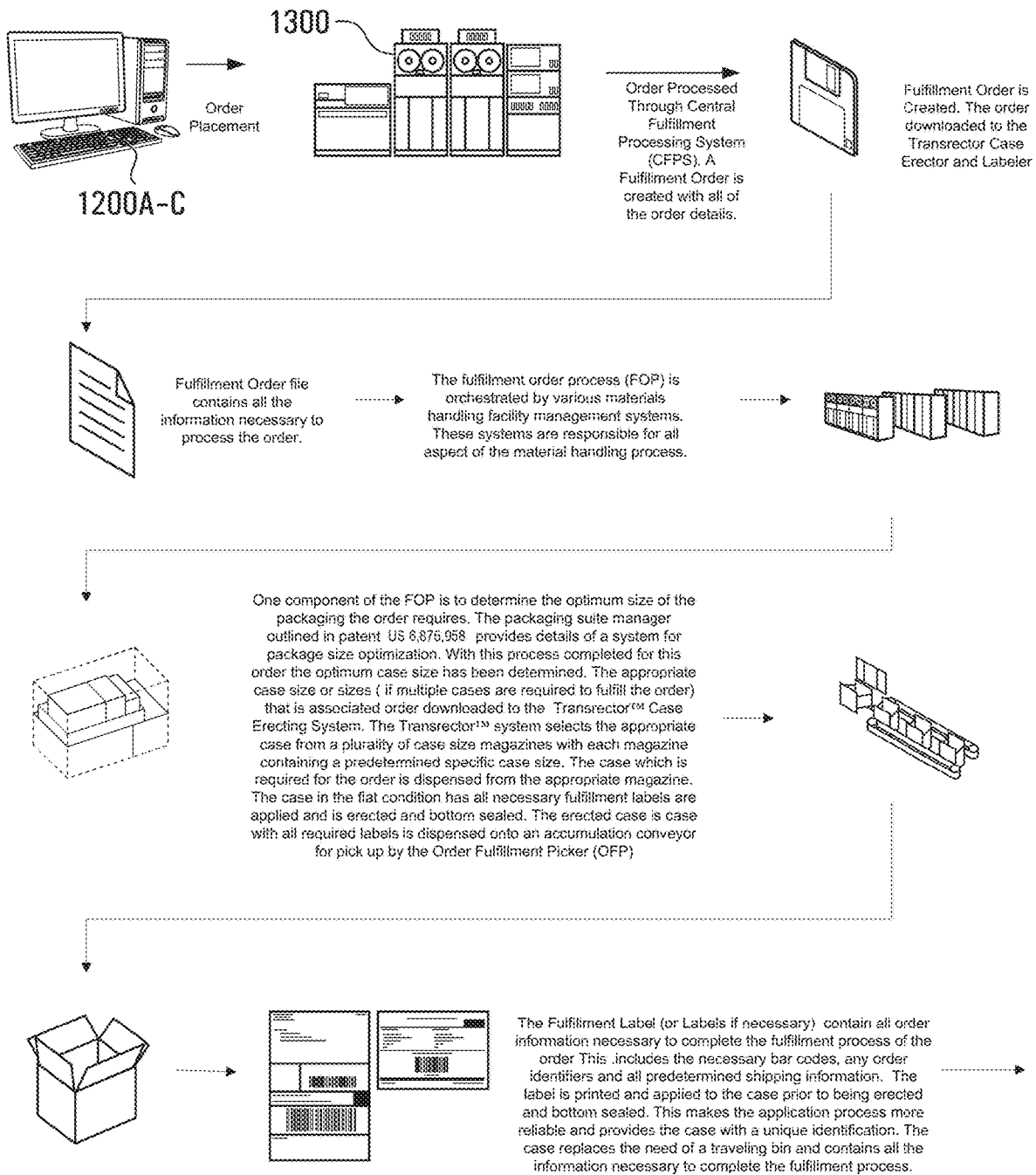
FIGS. 62A and 62B together form a schematic representation of the operation of a system of FIG. 58.
Figure 62B:
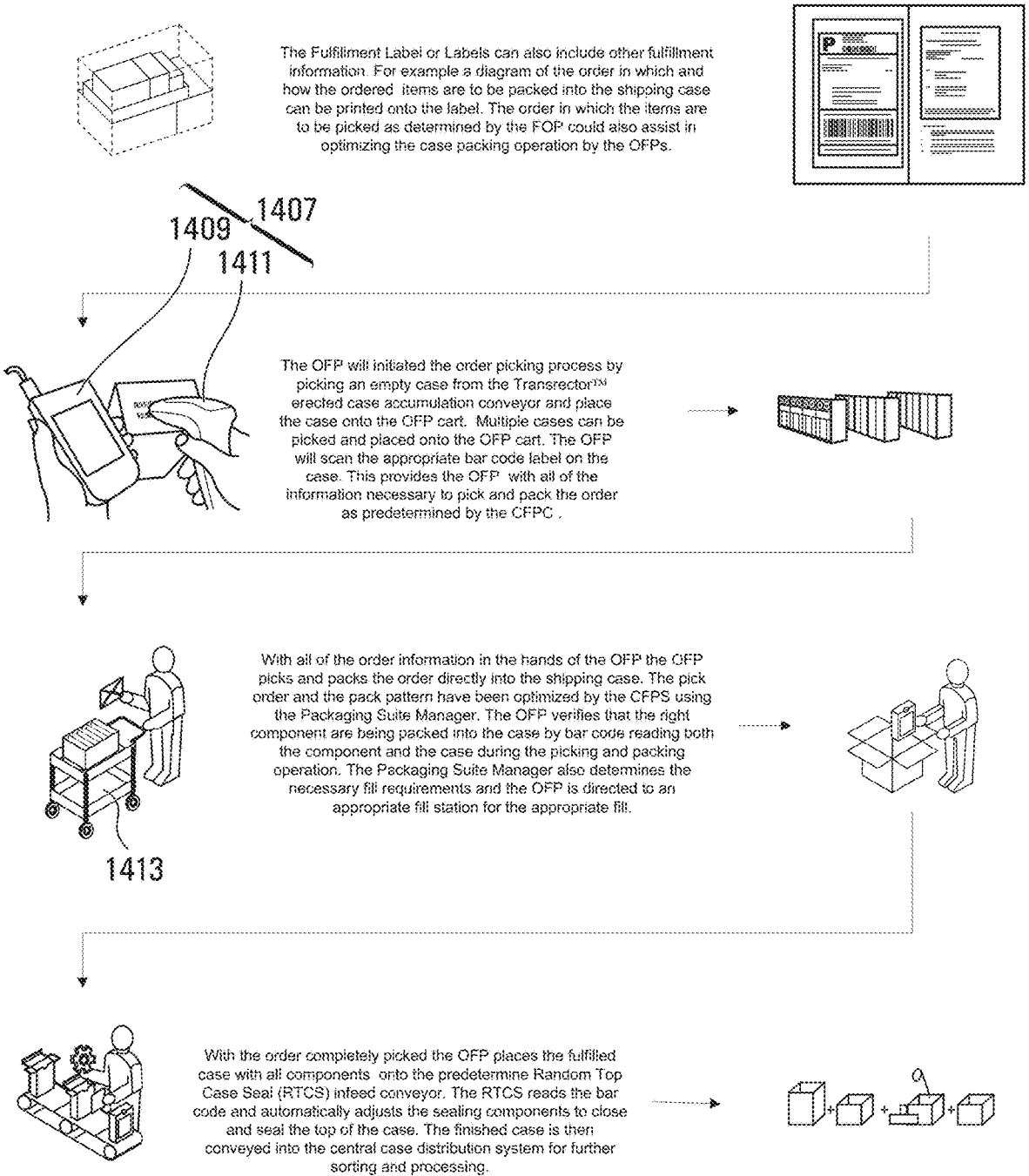

Once the case has been formed and labelled for a particular customer product order, it may then be physically transferred to a respective case loader generally designated 1400A, 1400B or 1400C. In some embodiments, the formed and labelled case can be picked up by a person (referred to herein as an Order Fulfilment Picker or "OFP") who may be in a product storage facility (e.g. a warehouse building) filled with the products handled by order fulfilment system 1000. OFP may have or carry a label scanner device 1407 (see FIG. 62B) which may include a scanner 1411 and an interconnected display device 1409. Examples of suitable label scanning devices that could be employed include the model LT5020H made by Worth Data Inc. (Santa Cruz, Calif., USA).

Label scanning device 1407 may be a bar code reader adapted to scan and derive information from the label or labels applied to the case. Optionally, label scanning device 1407 may be connected to one or other of the PLC of the case former or order fulfilment processor 1300 by a communication link. In such instance, some or all of the information for a case may retrieved by label scanning device 1407 from the PLC of the case former or from order fulfilment processor 1300 using a case identifier encoded in bar codes on the label(s) applied to the case.

Figure 61:
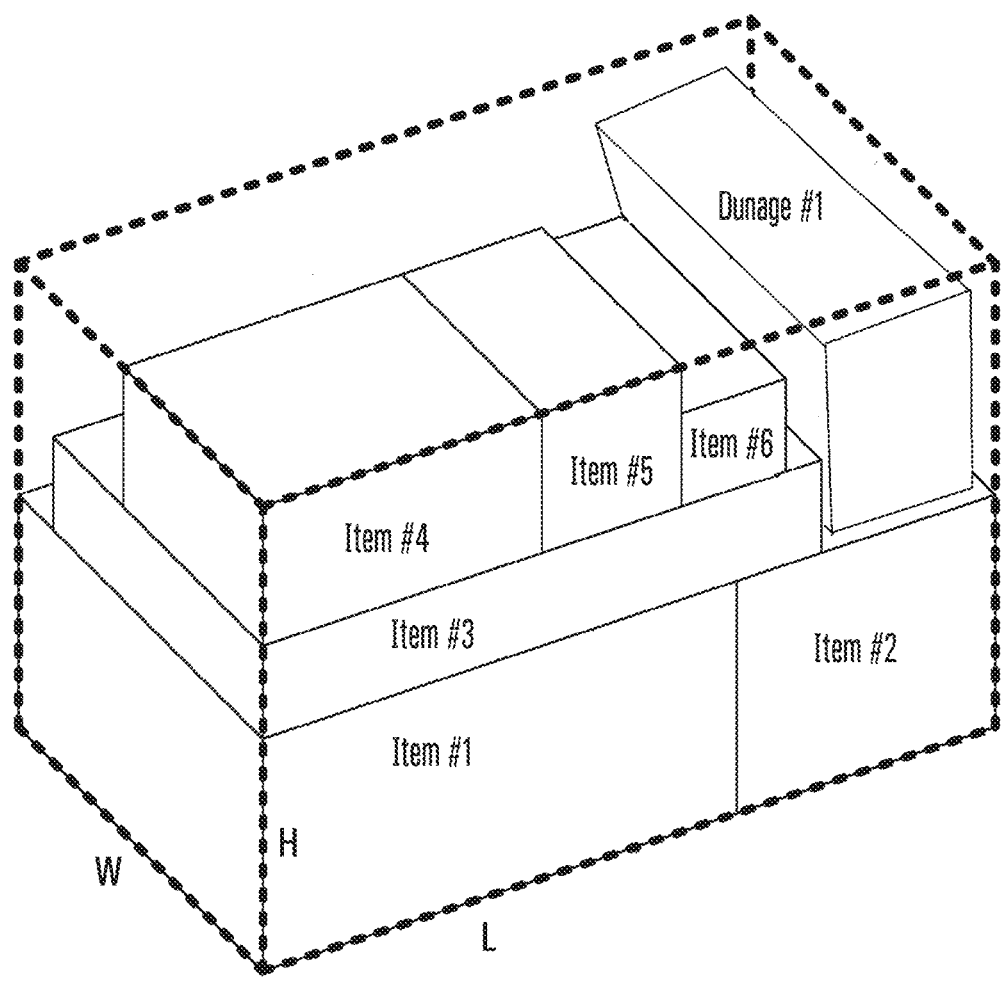
FIG. 61 is a sample of a case packing diagram that may be generated and used in the system of FIG. 28.

The OFP may for example scan the bar codes on the label(s) on the case which may enable the OFP to identify the particular products that are to be loaded into that case. Optionally, scanning these bar codes may also enable the OFP to identify where the particular products are located in the warehouse building. The OFP may then load the case into a cart 1413 (FIG. 62B) and then proceed to locate the products in the warehouse and fill the case with those products, possibly in the order listed by the scanning device 1407. Optionally, a packaging arrangement diagram (such as the diagram of FIG. 61) either illustrated on the label on the case, or optionally displayed on a device such as the label scanner, if available, may be provided to and used by the OFP to load the case in a desired optimal manner. An example of a packaging arrangement diagram that can be utilized to load a case is illustrated in FIG. 61. A case, formed from a blank, and having dimensions of width W, height H and Length L, can be loaded as shown with items (i.e. products) numbered 1 to 6 arranged in a particular arrangement and may also include some additional dunnage or packing material (e.g. bubble wrap type material) that may be inserted by an OFP to maintain the stability and integrity of the items in the packaging arrangement during shipping to the customer.

In other embodiments, one or more of the case loaders 1400A, 1400B, 1400C may include automated equipment such as one or more robotic systems instead or in addition to an OFP.

Turning now to FIGS. 53 to 57, case former 1100 (representative of each of case formers 1100A-C) may comprise the same or substantially the same components as carton forming system 100 as described above, except where differences are hereinafter described. Like in carton forming system 100, the structural/mechanical components of carton former 1100 may be made from any suitable materials. Case former 1100 is particularly useful as part of a customer order fulfilment system 1000 that may fulfil product orders placed or initiated by customers as described above. However, carton former 1100 may also be used in other applications.

As an alternate to a magazine like magazine 110 in carton forming system 100 as described above, case former 1100 may include or utilize a plurality of magazines such as magazines M1-M16. Magazines M1-M16 may each contain one or more stacks of product packaging, such as case blanks which each may generally be like blanks 111 processed by system 100, with at least some of the magazines M1-M16 containing different types/sizes and/or configurations of packaging/case blanks to other magazines. The size, configurations and types of case blanks (and the cases that can be formed therefrom) can vary to provide a range of case sizes, configurations and types that can be automatically processed by carton former 1100 without the need for any manual intervention to modify any components of the case former 1100. PLC 132 of case former 1100 may be programmed such that the particular dimensions/overall size/configuration (e.g. such as regular slotted carton or "RSC")/type of each of the blanks held in each one of the magazines M1-M16 is stored in the memory of the PLC 132.

It should also be noted that case former 1100A, 1100B, and 1100C may each be configured with magazines having a different set/selection of sizes/configurations/types of case blanks from that of the other magazines, so that each of the carton formers 1100A, 1100B, 1100C are operable to process different cases. Case formers 1100A, 100B, and 1100C may be configured with magazines such that they collectively process a pre-defined set of case blanks types that provides a range of case sizes, configurations and types.

Each magazine M1-M16 may have its own blank transfer apparatus that may each include a transversely oriented magazine conveyor 1203(1) to 1203(16) respectively. Each conveyor 1203(1) to 1203(16) (referred to generically as a magazine conveyor 1203) may be controlled by PLC 132 of its carton former 1100, such that a stack of blanks in each magazine M1-M16 may be moved to a position adjacent a longitudinally oriented, central case blank in-feed conveyor 1204. Each magazine M1-M16 may have a transfer apparatus under the control of PLC 132 that is operable to extract and move a blank from a stack in the magazine M1-M16 adjacent to in-feed conveyor 1204 and feed it onto central in-feed conveyor 1204 to that it may be transported to be labelled as described hereinafter, and also folded and sealed in a manner like that described above in connection with system 100.

Figure 54:
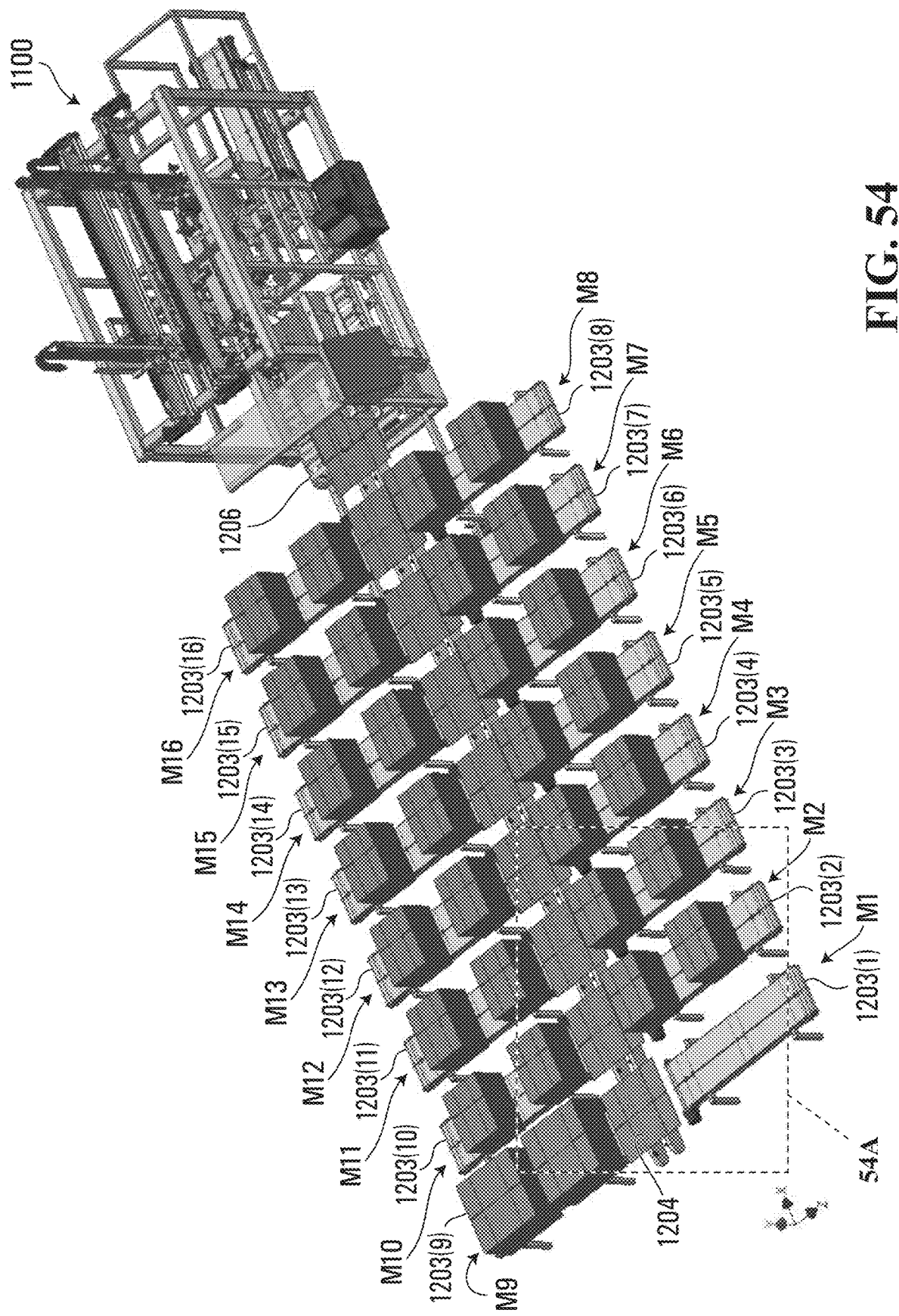
FIG. 54 is a rear right side perspective view of the case former of FIG. 53.
Figure 54A:
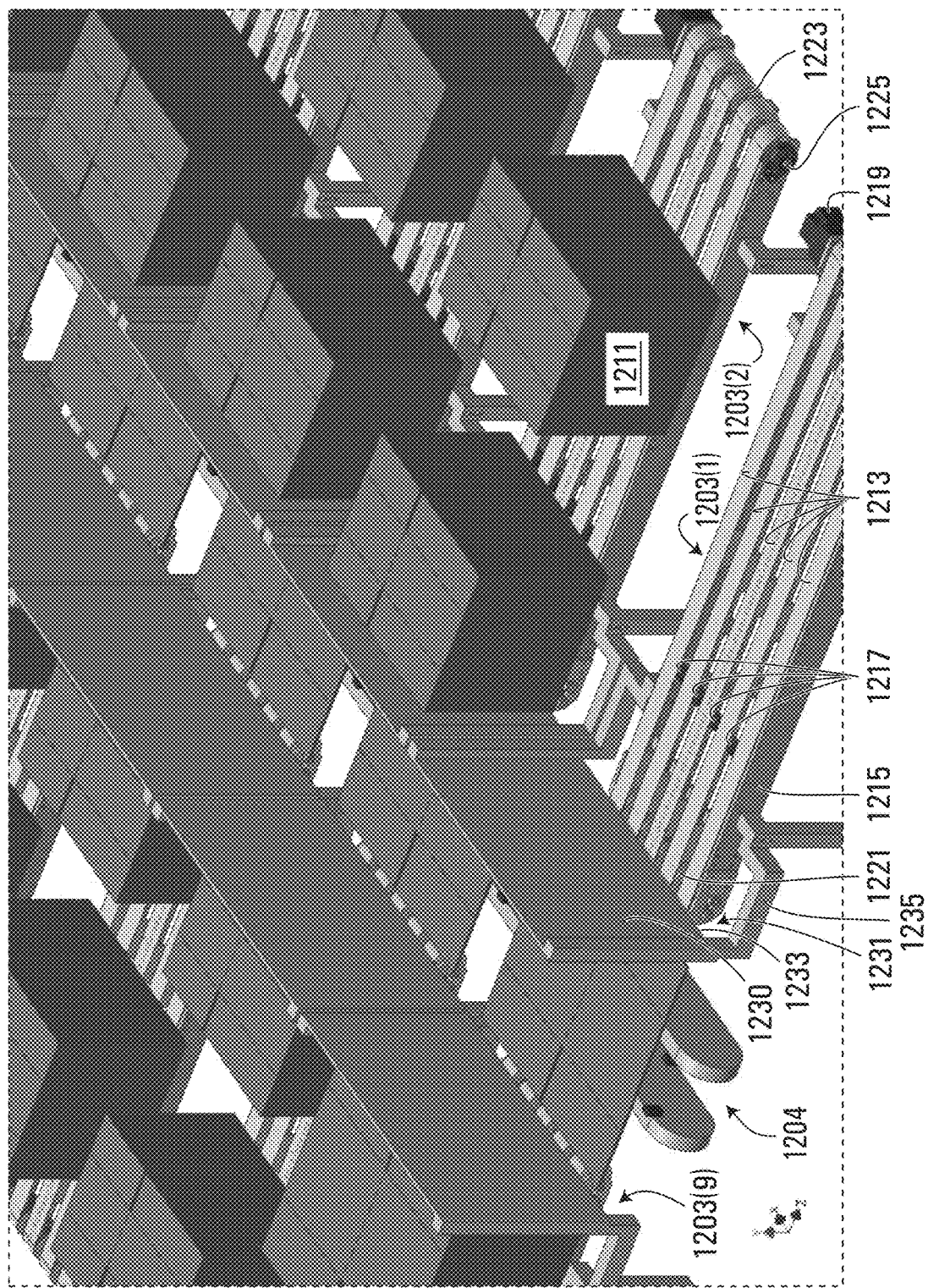
FIG. 54A is an enlarged view of portion 54A in FIG. 54 with additional components illustrated.
Figure 55:
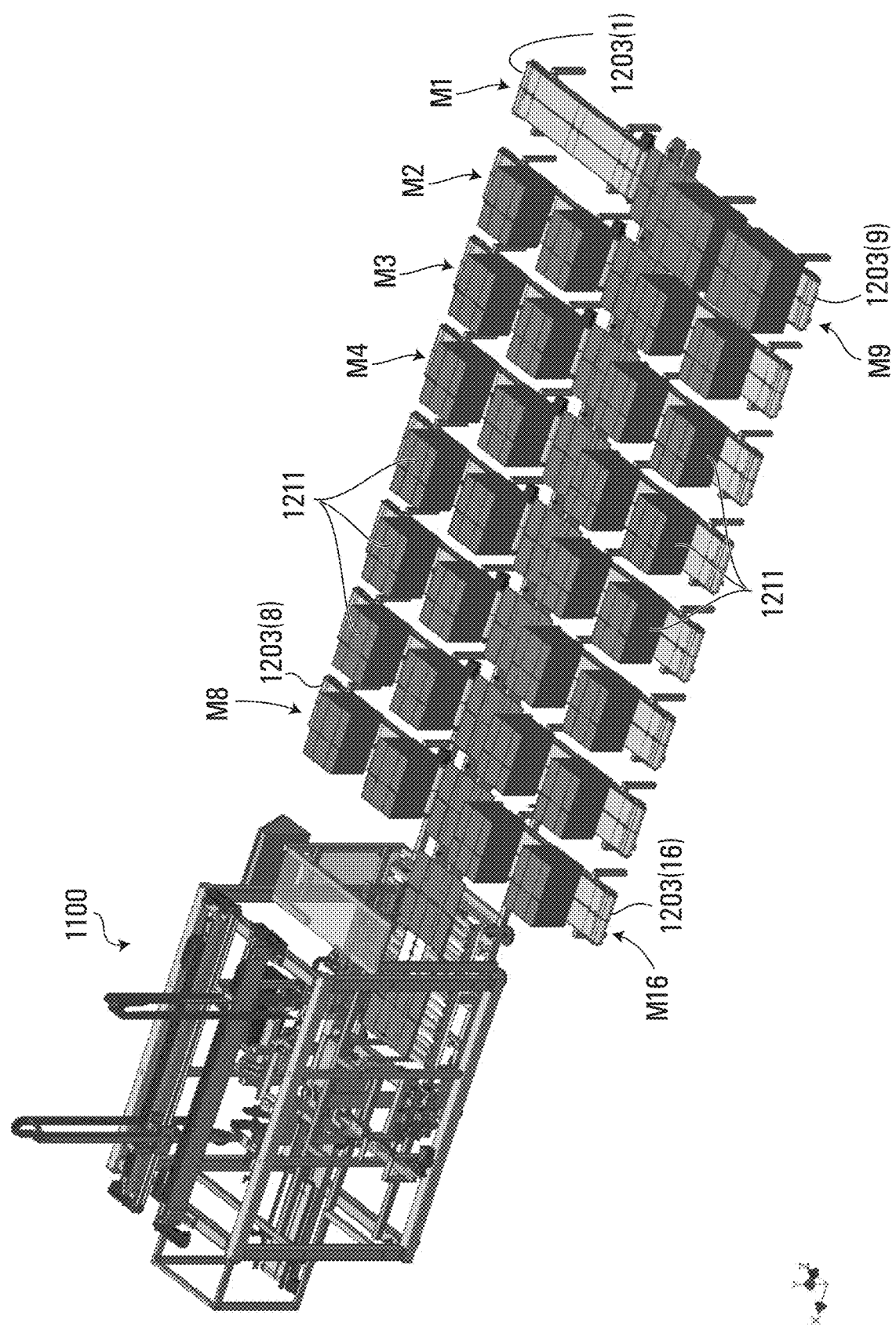
FIG. 55 is a rear left side perspective view of the case former of FIG. 53.
Figure 56:
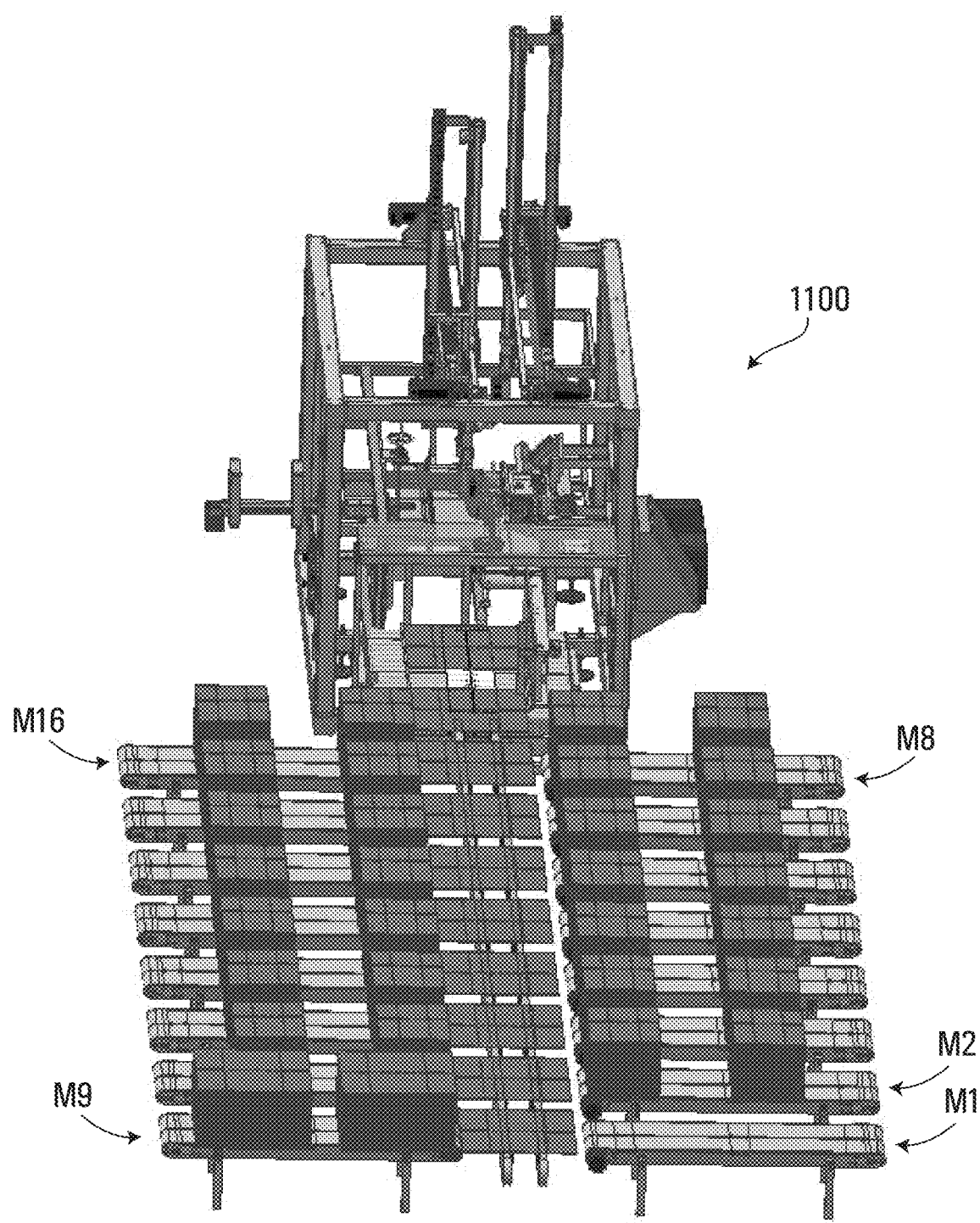
FIG. 56 is rear perspective view of the case former of FIG. 53.
Figure 57:
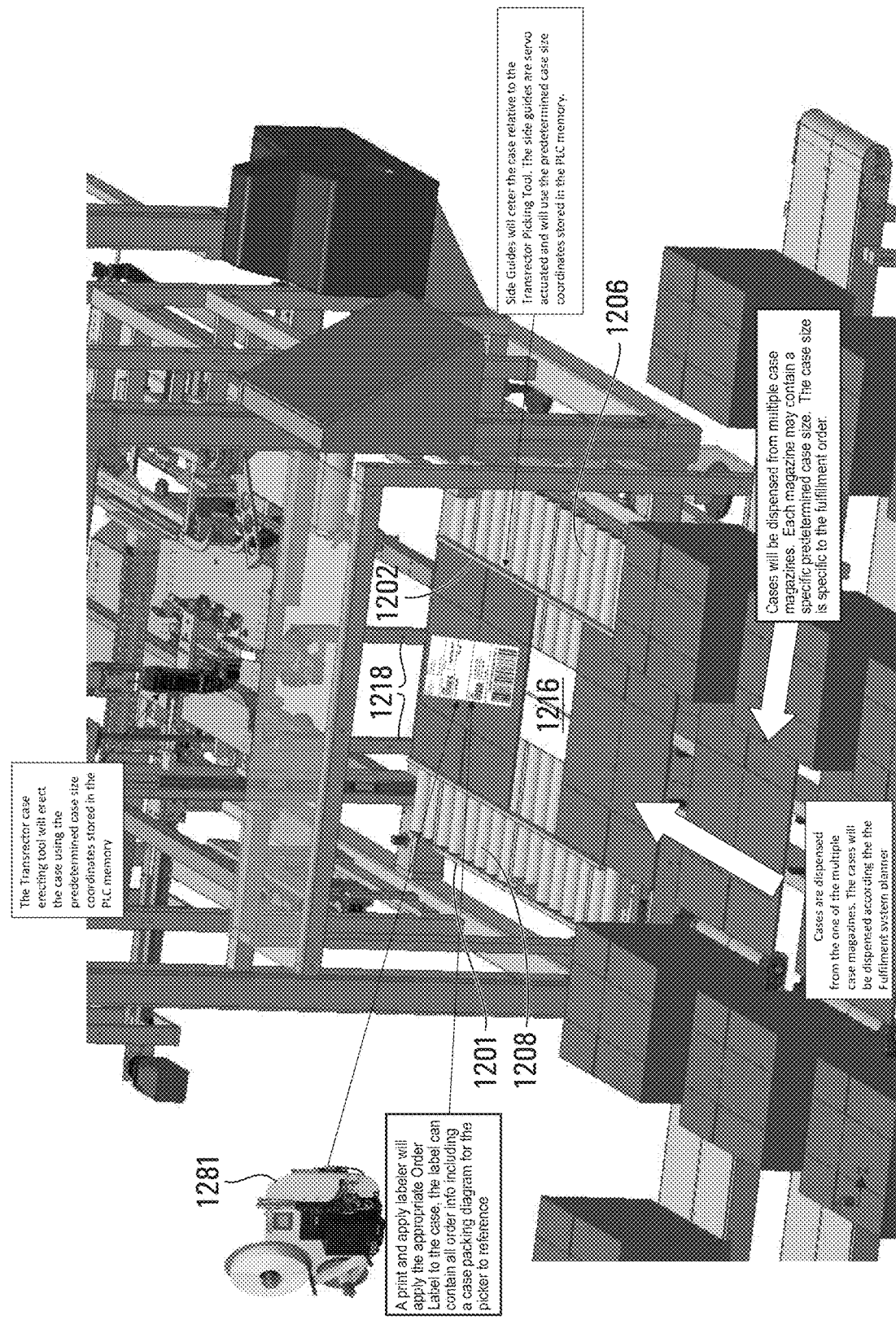
FIG. 57 is a rear perspective view of part of the case former of FIG. 53.

With reference now to FIG. 54A, by way of representative example of the construction of a magazine, magazine conveyor 1203(1) may include a frame 1215 that supports five, generally parallel, and spaced continuous belts 1213 that may be made of any suitable flexible material such as Ropanyl. The belts 1213 may each extend between rotatable idler wheels 1221 mounted on a freely rotatable shaft and rotatable drive wheels 1223. Drive wheels 1223 may be mounted for rotation with and to a common drive shaft 1225 of a servo motor 1219 that may be interconnected via and in communication with a servo drive to the PLC 132 of the case former 1100. Conveyor belts 1213 may each have an upper belt portion that together may support one or more stacks of blanks 1211 thereon. PLC 132 may give an instruction (such as by order fulfilment processor 1300) to form a case, and if required, PLC 132 may cause upper belt portion of belt 214 to move towards in-feed conveyor 1204 by operation of servo motor 1219 rotating drive wheels 1223. In this way belt 214 can, if necessary, move a stack of blanks 1211 to a position adjacent to the in-feed conveyor 1204.

Positioned proximate the end of each magazine conveyor 1203 adjacent in-feed conveyor 1204 may be a vertically and longitudinally oriented plate 1230. Each plate 1230 may be supported by a plurality of plate support members 1235 that may be part of frame 1215. A lower longitudinally extending edge 1233 of plate 1230 may be positioned so that only the bottom blank in a stack of blanks (i.e. the blank that is immediately above the upper portions of the belts) can pass through a slot provided beneath lower edge 1233 of plate 1230 and the horizontal plane formed by the upper surface of the upper portions of the belts 1213. In this way, a slot 1231 can be provided that can permit a single blank at a time from the bottom of the stack to be pushed transversely through the slot and onto the in-feed conveyor 1204.

A pushing mechanism may be provided to respond to signals from PLC 132 of the case former to push a blank in a magazine from the bottom of the stack though the slot 1204 and onto in-feed conveyor 1204. The pushing mechanism may be any suitable type of device and may for example include a plurality of lugs 1217 located in the spaces between belts 1213. The lugs may be driven in a cyclical path by a common type crank mechanism (not shown) that may include a common pneumatic or hydraulic cylinder with a piston controlled by PLC 132 by activating appropriate valves to suitably control the flow of pressurized air/hydraulic fluid to the cylinder. The cylinder may have a piston arm attached to a longitudinally oriented bar member that may be mounted for rotation. The crank mechanism may be configured to provide a path for the lugs 1217 that commences in a position behind the bottom blank in a stack; then moves transversely between the belts 1213 while engaging the rear side edge of the bottom blank thereby pushing the bottom blank through the slot 1231. Once the crank mechanism reaches the end of the stroke, the lugs 1271 will descend downwards beneath the stack of blanks and move transversely in an opposite direction back to the starting position, while at the same time not engaging the next bottom blank on the stack and passing beneath the stack. The path returns the lugs 1217 back to the start position so that when signalled by PLC 132 to load another blank onto conveyor 1204, the operation can be repeated.

In summary, PLC 132 can thus control motor 1219 and thus the movement of each conveyor 1203 as well as the movement of the lugs 1281, and thus is able to selectively move and transfer a single blank at a time onto in-feed conveyor 1204 from any one of magazines M1 to M16

Therefore, unlike in system 100 where a stack of case blanks may be fed to the alignment conveyor 206 by in-feed conveyor 204, in system 1000 separate individual case blanks may be fed in series and longitudinally by in-feed conveyor 1204 to alignment conveyor 1206. The particular sequence/order of case blanks that are placed onto in-feed conveyor 1204 of each case former 1100A-C may be determined and selected by PLC 132 such that case blanks may arrive at alignment conveyor 1206 in such a desired manner in which it is desired to process the blanks at least within case former 1100.

Further, each PLC 132 may maintain in its memory records of case blanks that have been placed onto in-feed conveyor 1204, to be formed and labelled. Each record may include information received by PLC 132 from order fulfilment processor 1300 (e.g., by way of the Fulfilment Order data structure) for a particular case blank to be formed and labelled. For example, this information may include the type/size/configuration of the case blank and the label information to be applied to the case blank. A new record can be added each time a request for a new case is received from order fulfilment processor 1300 and optionally records can be removed once a case has been formed and labelled. Thus, such records may be organized and maintained in sequence in the memory of PLC 132 using a conventional shift registering technique. In this way, the record for the next case blank scheduled to arrive at alignment conveyor 1206 may be provided at the output of the shift registers as that case blank arrives, and the type/configuration/size of that case blank and the label information for that case blank may be determined from the provided output.

Once transferred from in-feed conveyor 1204 to alignment conveyor 1206, the alignment conveyor 1206 may then under the control of PLC 132 move each blank sequentially to the pick up location. The pick up location may in part be determined by the front edge of each blank abutting the surfaces of a pair of spaced vertical plates 1218 (FIG. 57) as they are moved longitudinally downstream by alignment conveyor 1206.

Conveyor 1204 may be constructed substantially like conveyor 204 may include a pair of spaced conveyor belt 214 that may be driven by a suitable motor such as a DC motor or a variable frequency drive motor. The motor may be DC motor and may be controlled through a DC motor drive (such as are all sold by Oriental under model AXH-5100-KC-30) by PLC 132.

Conveyor belts 214 may have an upper belt portion supported on rollers (not shown). PLC 132 can as required cause upper portions of belts 214 to move longitudinally downstream towards alignment conveyor 1206. In this way belts 214 can move a series of spaced apart case blanks longitudinally downstream. PLC 132 can control the motor driving conveyor 1204 through the motor drive and thus conveyor 1204 can be operated to move and transfer a series of blanks obtained from multiple magazine of magazines M1 to M16 towards and for transfer to the alignment conveyor 1206.

Blank alignment conveyor 1206, like alignment conveyor 206, may also include a series of transversely oriented rollers 1208 that may be mounted for free rotating movement to a lower portion of the magazine frame 202. A conveyor belt 1216 may be driven by a motor that and have a corresponding motor drive. This motor and motor drive for conveyor 1206 may also be controlled by PLC 132. Belt 1216 may be provided with an upper belt portion supported on rollers 1208 and upon which one or more case blanks may be supported. Conveyor belt 1216 may be operated to move each case blank in turn further longitudinally until the front face of the blank abuts with a generally planar, vertically and transversely oriented inward facing surface of upstanding spaced plates 1218 so that each case blank is in turn placed into the pick up position.

Conveyor belt 1214 of conveyor 1204 and conveyor belt 1216 of conveyor 1206 may be made from any suitable material such as for example Ropanyl.

A sensor (not shown) such as an electronic eye model 42KL-D1LB-F4 made by ALLEN BRADLEY, may be located within the horizontal gap between belt 1214 and belt 1216. The sensor may be positioned and operable to detect the presence of the front edge of a blank as each blank in turn begins to move over the gap between conveyor belt 1214 and conveyor belt 1216. Upon detecting the front edge, sensor may send a digital signal to PLC 132 signalling that a particular blank (the size/configuration/type of which PLC 132 is aware) has moved to a position where conveyor 1206 can start to move. PLC 132 can then cause the motor for conveyor 1206 to be activated such that the top portion of belt 1216 starts to move the blank downstream. In this way, there can be a "hand-off" of each blank from in-feed conveyor 1204 to alignment conveyor 1206.

Once the rear edge of each blank passes the sensor, a signal may be sent to PLC 132 which can then respond by sending a signal to shut down the motor driving belt 1214 of conveyor 1204. Conveyor 1204 is then in a condition to await a further signal thereafter to feed the next blank in the series of blanks on the conveyor 1204 to alignment conveyor 1206. Meanwhile alignment conveyor 1206 can be operated to move the blank placed thereon to the pick up location.

The presence of a blank on alignment conveyor 1206 at the pick up location may be detected by another sensor that may be the same type of sensor as sensors 240 and 242. The sensor may detect the presence of the front edge of a blank at the pick up position and may send a digital signal to PLC 132 signalling that a blank is at the pick up position. At the pick up position, the blank may also be centred longitudinally by a pair of moveable longitudinally oriented side wall guides 1201 and 1202.

Each blank may be suitably longitudinally and transversely positioned and oriented in a pick up position for proper engagement by both a labelling device and by one of the erector heads like erector heads 120a, 120b of system 100. Side guide walls 1201 and 1202 may be mounted to on tracks to a lower portion of a lower frame and both may be oriented generally vertically and may extend longitudinally for substantially the full length of alignment conveyor 1206. The side guide walls 1201, 1202 may be mounted in a similar manner as side walls 200, 201 in system 100.

A drive mechanism may be provided to drive each of side walls 1201 and 1202 on respective tracks. For side walls 1201 and 1202, one or more drive mechanisms that are in electronic communication with PLC 132 can be provided. By way of example, a servo motor 258 (FIG. 1B) with gear head may be provided and be in electronic communication with PLC 132 through a servo drive. Examples that could be used are servo motor MPL-B1530U-VJ42AA made by ALLEN BRADLEY, in combination with servo drive 2094-BC01-MP5-S also made by ALLEN BRADLEY and gear head AE050-010 FOR MPL-A1520 made by Apex.

Like in carton forming system 100, in case former 1100 lead screw rods may be inter-connected to servo motor/gear heads. Lead screw rods may pass through nuts, which may be fixedly secured to plates. Plates may be interconnected to spaced, generally vertically oriented bar members. Bar members may be interconnected to support frame (not shown) forming part of side walls. By activating servo motor/gear heads, the rotation of the servo may rotate the screw rods. As rods passes through nuts, the nuts can be moved laterally either inwards or outwards, thereby causing walls 1201, 1202 to slide on tracks inwards or outwards depending upon the direction of rotation of screw rods. Encoders may be provided within or in association with servo drive motors and the encoders may rotate in relation to the rotation of the respective drive shaft of the servo drives. The encoders may be in communication with, and provide signals to the servo drives which can then pass on the information to PLC 132. Thus, PLC 132 may be able to determine the longitudinal position of the screw rods in real time and thus the transverse position of side walls 1201, 1202 and can operate the servo drives to adjust the position of the side walls 1201, 1202. The particular type of encoder that may be used is known as an "absolute" encoder. Thus once the encoders are calibrated so that a position of each the screw rod is "zeroed", then even if power is lost to system 1000, the encoders can maintain their zero position calibrations. With the transverse alignment mechanism of side guides walls 1201, 1202 in abutment with the left and right side edges of the blank, guide walls can ensure he proper positioning of the datum line when the blanks are flattened is properly transversely aligned to be labelled by labelling device 1281 (only shown in FIG. 57) and to be picked up by erector heads 120 of system 1100 and moved through folding and sealing apparatus 130, as described above to achieve proper folding and sealing of the carton/case blank.

Optionally, PLC 132 may verify that the type/size/configuration of the case blank at the pick up location matches the expected case blank. For example, the top surface of each case blank may include a bar code identifying its type/size/configuration, and this bar code may be read at the pick up location by a suitably positioned bar code reader. The type/size/configuration of the case blank read from this bar code may be compared to the expected type/size/configuration of case blank, which may be determined from a record of the next scheduled case blank stored in memory of the PLC, as described above. Verification is successful when there is a match. When there is not a match, PLC 132 may issue a signal requesting manual operator intervention.

As indicated above, each case blank in each magazine may be generally initially formed and provided in a flattened tubular configuration such as by way of example is shown in FIGS. 10A-10E. Each case blank has a height dimension "H"; a length dimension "L"; and a major panel length "Q" (see FIG. 10B). The PLC of each case former 1100 may maintain in its memory each of these three dimensions for a case blank to be processed by case former 1100, and using these stored dimensions, the PLC can determine the necessary positions and/or movements of at least some of the components forming system 100, including the path of movement of erector heads 120a, 120b as the erector heads move and cycle through their processing sequences.

In this regard, for each case blank in each of magazines M1 to M16, PLC 132 may have the information necessary to adequately process each case blank selected.

As was indicated above in relation to a representative case blank as shown in FIG. 11, each case blank in each magazine may be designated with a first datum line "W1" that passes through the mid-point of the fold line between panel D and flap K, and the mid-point of the fold line between panel B and flap J. This datum line W1 may be determined by PLC for blank to be processed, based on the dimensions H, L and Q of the blanks stored by the PLC or obtained by the PLC. Blank 111 may also be designated with a second datum line "W2" that may be determined by PLC 132 and which passes along and is generally parallel to the fold line between panel D and flap K, and the mid-point of the fold line between panel A and flap F. Datum W1 will be parallel to Datum W2. PLC 132 may also determine the relative position of the bottom of the erected case for the cases in each magazine as this will be aligned with a vertical datum plane passing through Datum W1 and Datum W2. Aligning the position datum W2 and of the datum plane with other components in case former 1100 will ensure that the case is properly positioned during processing. Also, the vertical distance R between datum W1 and the datum line W2 may be calculated by PLC. This can ensure that PLC knows where it needs to position the erector head so that top panel A, and accordingly, datum W1 are properly positioned throughout the processing of the blank by case former 1100.

Case former 1100 is able to track and modify the position of each case blank as it is being processed, and in particular the vertical position of the datum line W1 of the case blank as the case blank moves longitudinally through case former 1100 and as various components of case former 1100 engage the case blank during its movements. This will ensure that the case blank being processed is appropriately positioned relative to the system components so that the system components engage the case blank at the correct position on the blank during processing of the blank. For blanks that may be configured differently than blank 111, suitable adjustments may possibly be required to the dimensions and datums maintained by PLC 132 in order for carton former 1100 to be able to process a particular size/configuration/type of blank.

Labelling device 1281 may be mounted to the frame of carton/case former 1100 in the vicinity of alignment conveyor 1206. For example (although not depicted as such in the FIG. 57 for simplicity) labelling device 1281 may be mounted to a frame portion of carton former 1100 generally above where a case blank is located when the case blank is in the pick up location. Labelling device 1281 may be operable to print and apply one or more labels to one or more panels, preferably upward facing panels, of a blank located at the pick up location. Labelling device 1281 may be any suitable device such as the PLS-500 label application system made by Paragon Labeling Systems Inc. (White Bear Lake, Minn., USA) in conjunction with an integral print engine, such as a Lt408 print engine or a S84 Series print engine (e.g., model nos. S8408, S8412, or S8424) made by SATO America, Inc. (Charlotte, N.C., USA). While in some embodiments a labelling device may apply a physically separate label to the case or case blank, in other embodiments the labelling device may apply printing to the case or case blank without providing the printing on a physically separate label.

As noted above, the label or labels applied to an upward facing panel(s) of each blank by labelling device 1281 may be specifically configured for that particular blank and may contain various types of information relating to an order of products to be fulfilled for the case to be formed from that particular blank. The label or labels may contain information providing certain order information including types of products to be loaded into the case to be formed from that blank, optionally including product codes of those products, the customer to whom the case is to be shipped and the customer's address, as well as a case packing diagram that may be used by a product picker or filler in packing the case in a desired configuration with the products, and the locations in the warehouse building of the products. The label or labels may also contain a unique case identifier. Some or all of the information may be provided in bar code format, which a bar code reading device handled by an OFP may use to access the information form the label(s) once applied to the case blank.

The label is thus preferably printed and applied to the case blank while it is in a flattened configuration at the pick up location and prior to being erected and bottom sealed. This may make the label application process more reliable and provides the case with a unique identification.

Figure 59:
FIG. 59 is a sample label that may be generated and used in the system of FIG. 58.
Figure 60:
FIG. 60 is another sample label that may be generated and used in the system of FIG. 58.

Examples of the format of labels 1283*a*, 1283*b* that might be applied by labelling device 1281 are illustrated in FIGS. 59 and 60 respectively.

Once the label has been applied by labelling device 1281, case former 1100 may then proceed to erect and seal the case from the case blank in a manner like system 100 described above. It will be appreciated that PLC 132 may be in communication with the labelling device 1281 and can provide instructions for the printing and application of a suitable label or label(s) for the particular blank that is at the pick up location.

Figure 16:
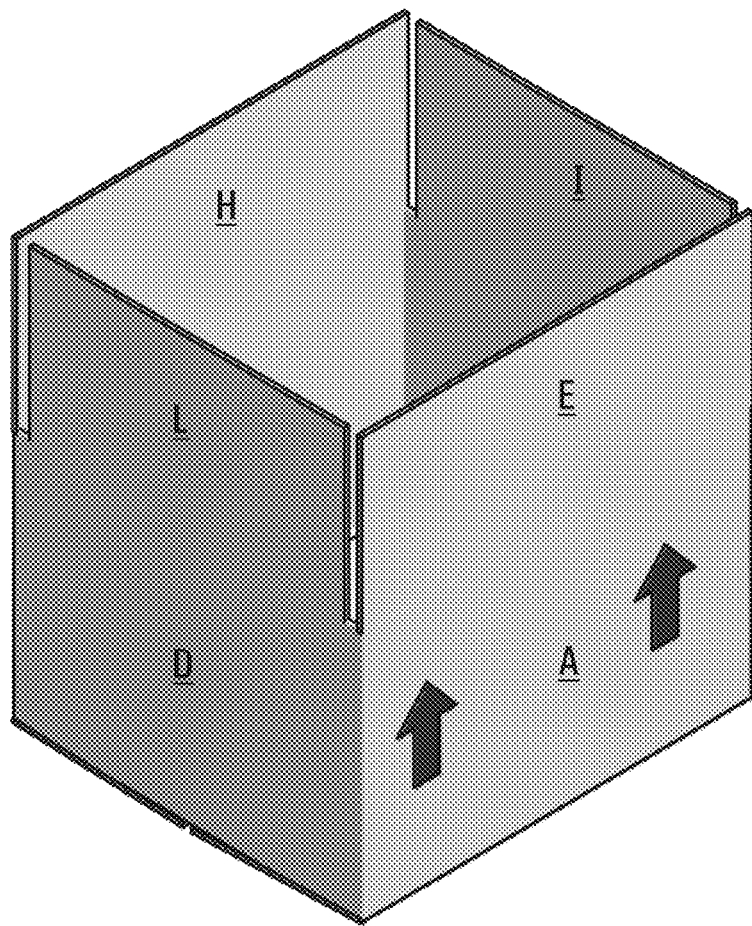

Once the case has been formed and sealed to form an erected case that is partially sealed and may be in a configuration such as shown in FIG. 16, the case may then be delivered from the discharge conveyor 117 (see for example FIG. 8) and be placed onto an accumulation conveyor that may be part of the respective case loader such as case loader 1400A, 1400B or 1400C associated with the particular carton former 1100A-C which formed the case.

The OFP may initiate the order picking process by picking an empty case from an accumulation conveyor and place the case onto an OFP cart 1413 (FIG. 62B) that can be moved around the warehouse where the products handled by system 1100 are located. Multiple cases may be picked and placed onto the OFP cart at the same time. The OFP will scan the appropriate bar code label on each case. This provides the OFP with all of the information necessary to pick and pack the order as predetermined by order fulfilment processor 1300. In some instances, some of all of this information may be retrieved by the OFP from the PLC 132 of the case former or from order fulfilment processor 1300 using a unique case identifier encoded in the bar code label.

With all of the order information available to the OFP the OFP picks and packs the order of products directly into the case. The OFP may verify that the correct products are being packed into the case by bar code reading both the product and the case during the picking and packing operation, e.g., by comparing the UPC/ISBN provided by the bar code on the label(s) applied to the case with the UPC/ISBN on the product being packed.

Once the order (or part order for a particular case) has been completed by the OFP, such that all products for that case are loaded into the case, the case is directed to a final case sealing apparatus 1500A-C. For example the OFP may place the loaded case with all products loaded therein onto a predetermined Random Top Case Seal (RTCS) in-feed conveyor that may feed the case to a suitable top sealing device. The RTCS may be adapted to read a label on the case placed by labelling device 1281 or otherwise located on the case, and as a result of information provided by the bar code the RTCS may automatically adjust the sealing components of the device so that it may close and seal the top of the case. The finished case may then be conveyed into the central case distribution system for further sorting and processing. An example of the type of suitable RTSC apparatus that could be employed as part of system 1000 is the random case sealer made by Marq Packaging Systems.

In operation of system 1000, each one of a plurality of customers may use a customer order device such as devices 1200A, 1200B and 1200C, including possibly accessing call center 1250. Through operation of appropriate software on the order placement devices 1200A-C, the order placement devices 1200A-C may communicate directly or indirectly with order placement processor 1300 to so that multiple orders may be placed by customers, each orders being for one or more products, into order fulfilment processor 1300.

Order fulfilment processor 1300 may process the customer orders received directly or indirectly from customer order devices 1200A-C. Order fulfilment processor 1300 may for each order utilize its database that includes information that may be stored therein including information relating to: (a) details of all products that may be ordered by a customer through system 1000 including the actual physical dimensions of each product (such as the dimensions of the item package in which an item is packaged), optionally the weight of each product, and further optionally product codes associated with each product; (b) details of each of a plurality of types/sizes/configurations of cases/case blanks that can be used in system 1000 to package one or more products ordered by a customer including the dimensions of each case/case blank; (c) details of each case former (e.g., case formers 1100A-C), including the types of cases that each case former is capable of forming, and optionally when a case former includes multiple magazines, the type of case blank provided in each of those magazines and the corresponding type of case that can be formed from each type of case blank, and further optionally the quantity of case blanks provided in each of those magazines; (d) information about each customer including the name of the entity and shipping address to which an order fulfilled by system 1000 is to be shipped; and (e) information about where each product is located in a warehouse building housing products that may be ordered.

Order fulfilment processor 1300 may also for each order use the product packaging utility to identify a suitable case and possibly an optimum case (e.g. having particular type/size/configuration) from the packaging suite of a limited and predetermined number of types/sizes/configurations of cases. Thus, when each order for specific products is input into order fulfilment processor 1300, the product packaging utility can determine the optimal case or cases that can be used to package the products for each order (e.g. determine the least number or cases and/or the smallest size of cases that are required to package all the products in the customer order).

Order fulfilment processor 1300 may then for each order, generate a Fulfilment Order data structure that may be communicated by a communication link to the PLC of one of the case formers 1100A, 1100B or 1100C. The order fulfilment processor 1300 may have determined to which of the case formers to send each Fulfilment Order data structure either randomly, or based on availability and/or suitability to handle the case type/size/configuration determined for a particular customer order. The Fulfilment Order data structure may include information including (i) the type/size/configuration of case determined by the product packaging utility that is required to be formed and labelled by the case former 1100A, 1100B, 1100C; (ii) the particular magazine of the case former containing case blanks for forming the required type/size/configuration of case; (iii) a list of the particular product(s) from the customer order being fulfilled that are required to be loaded into the required case once formed, optionally arranged in the order in which the products should be loaded into the case once formed; (iv) optionally a diagram illustrating a desired optimal physical arrangement of the product(s) in loading the case; (v) optionally the location in the warehouse building of each particular product from the customer order being fulfilled; and (vi) customer shipping information for that case indicating the destination name and address for that case.

Each Fulfilment Order data structure may then be received and processed by the PLC 132 of the case former to which the data structure is sent. In particular, the PLC of the case former processes the Fulfilment Order data structure to identify the type/size/configuration of case (or cases) required, the particular magazine of the case former containing case blanks for forming each required type/size/configuration of case, and the contents of the label (or labels) to be applied. Once a required type/size/configuration of case and the particular magazine containing case blanks for forming the required type/size/configuration of case have been identified, the PLC of the case former causes a case blank from the identified magazine to be formed and labelled, generally as outlined above.

In particular, the PLC activates the appropriate conveyor of magazine conveyors 1203(1) to 1203(16), corresponding to the identified magazine, if required to move a stack of case blanks of the identified type adjacent to in-feed conveyor 1204. The transfer apparatus may, under the control of PLC 132, then transfer the desired case blank from the identified magazine to the in-feed conveyor 1204. The in-feed conveyor 1204 will then under the control of PLC 132 move that case blank longitudinally and then when signalled by PLC 132 to do so, transfer it to the alignment conveyor 1206.

Alignment conveyor 1206 also under the control of PLC 132 may then move the case blank to the pick up location and PLC 132 may then also cause the side walls 1201, 1202, to transversely align the case blank so that it is at the correct pick up position. PLC 132 may then cause labelling device 1281 to apply one or more labels like labels 1283a, 1283b to one or more upward facing surfaces of the panels of the case blank. PLC 132 may then cause the carton forming components of the carton former including an erecting head 120, to be moved by the movement sub-system to pick up the case blank from the pick up position and erect and partially seal the case from the case blank. PLC 132 may on an going basis, as each case blank is being processed, cause any adjustments in components of folding and sealing apparatus 130 to be made to accommodate each case blank at they are processed.

Once the case has been formed and labelled for a particular customer product order, it may then be physically transferred to a respective case loader generally designated 1400A, 1400B or 1400C. The formed and labelled case can be picked up by the OFP in a warehouse building filled with the products. The OFP can scan and derive information from the label or labels applied to the case to identify the particular products that are to be loaded into that case and the OFP may then proceed to locate the products in the warehouse and fill the case with those products, possibly in the order listed by the scanning device. A packaging arrangement diagram either illustrated on the label on the case, or optionally displayed on a device such as the label scanner, if available, may be used by the OFP to load the case in the desired optimal manner.

Once the order (or part order for a particular case) has been completed by the OFP, such that all products for that case are loaded into the case, the case is directed to a final case sealing apparatus 1500A-C. The OFP may place the loaded case with all products loaded therein onto a predetermined Random Top Case Seal (RTCS) in-feed conveyor that may feed the case to a suitable top sealing device. The RTCS may read a label on the case placed by labelling device 1281 or otherwise located on the case, and as a result of information provided by the bar code the RTCS may automatically adjust the sealing components of the device so that it may close and seal the top of the case. The finished case may then be conveyed into the central case distribution system for further sorting and processing.

Various modifications are also possible in some embodiments. By way of example only, instead of providing for magazine conveyors 1203(1) to 1203(N) for magazines M1 to M(N), it may be possible to provide for a robotic system which could extract case blanks as demanded by PLC 132 from any one of a stack of case blanks in each of the magazines. The robotic system could either place a particular case blank that may be required on an in-feed conveyor. In other embodiments, the in-feed conveyor could be eliminated and the robotic system may place each case blanks that is required at the pick up position.

Of course, the above described embodiments are intended to be illustrative only and in no way limiting. The described embodiments of carrying out the invention are susceptible to many modifications of form, arrangement of parts, details and order of operation. The invention, rather, is intended to encompass all such modification within its scope, as defined by the claims.

When introducing elements of the present invention or the embodiments thereof, the articles "a," "an," "the," and "said" are intended to mean that there are one or more of the elements. The terms "comprising," "including," and "having" are intended to be inclusive and mean that there may be additional elements other than the listed elements.

The invention claimed is:

1. A method to facilitate fulfilling product orders, comprising:
   (a) queuing requests for cases of various sizes in a queue stored in an electronic memory;
   (b) accessing a next request from said queue;
   (c) determining a size for a case from said next request;
   (d) based on said size, automatically adjusting components of a case forming apparatus to adapt said case forming apparatus to form said case of said size;
   (e) transferring a case blank for said case of said size from a particular repository to said case forming apparatus, said particular repository holding case blanks for cases of said size;
   (f) operating said case forming apparatus to form said case from said case blank;
   (g) until said queue is empty, repeating (b) to (f) for a request in said queue next following said next request.

2. The method of claim 1 wherein (d) comprises, based on said size of said case, setting a position of an alignment component of a case blank alignment device so that when said case blank abuts said alignment component, said case blank has a predetermined position.

3. The method of claim 2 wherein said alignment component is a first alignment component and wherein (d) further comprises, based on said size of said case, adjusting a stroke of a second alignment component opposed to said first alignment component.

4. The method of claim 3 wherein said first alignment component is a laterally moveable first side guide for abutting a first side of said case blank in order to set a predetermined lateral position of said case blank and wherein said second alignment component is a laterally moveable second side guide for urging said case blank into abutment with said first side guide.

5. The method of claim 1 further comprising, prior to (e), based on said size of said case, identifying from amongst a plurality of repositories of case blanks, each having case blanks of a different size such that any given repository has case blanks for cases of a single size, said particular repository.

6. The method of claim 5 further comprising automatically adjusting a position of sealing components of a case sealing device to adapt said case sealing device to seal said case of said size.

7. The method of claim 6 wherein said case is labelled with a label indicating said size and further comprising reading said label to identify said size and wherein said adjusting said position of sealing components of said case sealing device is based on said case size read from said label.

8. The method of claim 1 wherein each said next request comprises a data structure, said data structure storing an indication of said size for said case.

9. The method of claim 8 further comprising, based on said size, adjusting a movement profile of a case erecting component of said case forming apparatus.

10. The method of claim 9 further comprising referencing said data structure and labeling said case or said case blank with a label having information from said data structure.

11. The method of claim 10 wherein said data structure stores an identification of products to be loaded into said case and an arrangement and packing order of said products to be loaded into said case, and wherein said labeling comprises labeling such that said label identifies said size of said case, said products to be loaded into said case, and said arrangement and packing order.

12. A system for use in fulfilling product orders, comprising:
   an electronic memory for holding a queue of requests, each request indicating a particular size of a case;
   a case former having a plurality of adjustable components each adjusted by a drive mechanism;
   a plurality of repositories for case blanks, each repository holding case blanks of a different size such that any given repository has case blanks for cases of a single size;
   a controller operatively associated with said electronic memory and electronically communicating with said case former and each of said plurality of repositories, said controller operable to:
   (i) access said electronic memory to access a next request from said queue;
   (ii) determine a size for a case from said next request;
   (iii) based on said size, control each said drive mechanism to adapt said adjustable components of said case former to operate on a case blank for a case of a size indicted by said next request;
   (iv) based on said size, control a particular repository to transfer said case blank for said case of said size from said particular repository;
   (v) control said case former to form said case from said case blank; and
   (vi) until said queue is empty, repeat (i) to (v) for a request in said queue next following said next request.

13. The system of claim 12 wherein said controller is further operable to, based on said size of said case, adjust a movement profile of a case erecting component.

14. The system of claim 12 further comprising a case sealing device having a reader and adjustable sealing components, said case sealing device operable to read said size of said case and automatically adjust a position of said adjustable sealing components to adapt said case sealing device to seal said case of said size.

15. The system of claim 12 wherein said components comprise an alignment component of a case blank alignment device and said controller is operable to control said drive mechanism for said alignment component so that when said case blank abuts said alignment component, said case blank has a predetermined position.

16. The system of claim 15 wherein each said next request comprises a data structure, said data structure storing an indication of said size for said case.

17. The system of claim 16 wherein said alignment component is a first alignment component and further comprising a second alignment component opposed to said first alignment component and wherein said controller is operable to control said drive mechanism for said second alignment component to adjust a stroke of said second alignment component.

18. The system of claim 17 wherein said first alignment component is a laterally moveable first side guide for abutting a first side of said case blank in order to set a predetermined lateral position of said case blank and wherein said second alignment component is a laterally moveable second side guide for urging said case blank into abutment with said first side guide.

19. The system of claim 18 further comprising a labeller, wherein said controller is operably associated with said labeller and wherein said controller is further operable to reference said data structure and control said labeller to label said case or said case blank with a label including information from said data structure.

20. The system of claim 18 wherein said data structure stores an identification of said products to be loaded into said case and an arrangement and packing order of said products to be loaded into said case and wherein said controller controls said labeller to label said case such that said label identifies said size of said case, said products, and said arrangement and packing order.

* * * * *